US012601296B2

(12) United States Patent
Schimmels et al.

(10) Patent No.: US 12,601,296 B2
(45) Date of Patent: Apr. 14, 2026

(54) GAS TURBINE ENGINE HAVING A HEAT EXCHANGER LOCATED IN AN ANNULAR DUCT

(71) Applicant: General Electric Company, Schenectady, NY (US)

(72) Inventors: Scott Alan Schimmels, Miamisburg, OH (US); Jeffrey Douglas Rambo, Mason, OH (US); Timothy Richard DePuy, Liberty Township, OH (US); Steven B. Morris, Mason, OH (US)

(73) Assignee: General Electric Company, Evendale, OH (US)

( * ) Notice: Subject to any disclaimer, the term of this patent is extended or adjusted under 35 U.S.C. 154(b) by 65 days.

(21) Appl. No.: 18/434,933

(22) Filed: Feb. 7, 2024

(65) Prior Publication Data

US 2025/0075660 A1 Mar. 6, 2025

Related U.S. Application Data

(63) Continuation-in-part of application No. 18/430,907, filed on Feb. 2, 2024, which is a continuation-in-part
(Continued)

(51) Int. Cl.
*F02C 7/14* (2006.01)
*F02C 9/18* (2006.01)

(52) U.S. Cl.
CPC ................. *F02C 7/14* (2013.01); *F02C 9/18* (2013.01); *F05D 2260/213* (2013.01); *F05D 2260/96* (2013.01)

(58) Field of Classification Search
CPC .. F01N 3/0205; F02C 3/04; F02C 3/12; F02C 3/24; F02C 3/045; F05D 2240/14; F05D 2260/213; F05D 2220/323; F05D 2220/32
See application file for complete search history.

(56) References Cited

U.S. PATENT DOCUMENTS 3,981,466 A 9/1976 Shah
5,386,689 A 2/1995 Bozich et al.
(Continued)

FOREIGN PATENT DOCUMENTS

CN 108603442 B * 9/2020 ............. F02C 7/045
EP 2615275 B1 * 3/2015 ............. F01D 25/12
(Continued)

OTHER PUBLICATIONS

Allam, Effect of Ambient Gradients on Sound Transmission in Narrow Permeable Rectangular Pipes with Application to Heat Exchangers, Advances in Powertrains and Automotives, vol. 1, No. 1, pp. 24-33, 2015.
(Continued)

*Primary Examiner* — Craig Kim
(74) *Attorney, Agent, or Firm* — Dority & Manning, P.A.

(57) ABSTRACT

A heat exchanger positioned within an annular duct of a gas turbine engine is provided. The heat exchanger extends substantially continuously along the circumferential direction and defining a heat exchanger height equal to at least 10% of a duct height. An effective transmission loss (ETL) for the heat exchanger positioned within the annular duct is between 5 decibels and 1 decibels for an operating condition of the gas turbine engine. The heat exchanger includes a heat transfer section defining an acoustic length ($L_i$), and wherein an Operational Acoustic Reduction Ratio (OARR) is greater than or equal to 0.75 to achieve the ETL at the operating condition.

19 Claims, 21 Drawing Sheets

Related U.S. Application Data of application No. 18/160,375, filed on Jan. 27, 2023, now Pat. No. 11,927,134.

(56) References Cited

U.S. PATENT DOCUMENTS

| | | | |
|---|---|---|---|
| 7,607,308 | B2 | 10/2009 | Kraft et al. |
| 8,702,378 | B2 | 4/2014 | Foster |
| 8,844,264 | B2 | 9/2014 | Khalid |
| 9,410,482 | B2 * | 8/2016 | Krautheim ................ F02K 3/06 |
| 9,677,501 | B2 | 6/2017 | Pierluissi et al. |
| 9,845,768 | B2 | 12/2017 | Pesyna et al. |
| 10,036,329 | B2 | 7/2018 | Suciu |
| 10,227,950 | B1 | 3/2019 | Dyson, Jr. |
| 10,364,750 | B2 | 7/2019 | Rambo |
| 10,507,934 | B1 | 12/2019 | Dyson, Jr. |
| 10,544,737 | B2 | 1/2020 | Bowden et al. |
| 10,677,166 | B2 * | 6/2020 | Pesyna ...................... F02K 3/06 |
| 10,774,745 | B2 | 9/2020 | Regnard et al. |
| 11,378,009 | B2 * | 7/2022 | Roberge .................. F02K 3/115 |
| 11,492,918 | B1 * | 11/2022 | Ostdiek ..................... F01D 7/00 |
| 11,614,037 | B2 * | 3/2023 | Rambo ..................... F02C 6/14 |
| | | | 60/782 |
| 2010/0155016 | A1 * | 6/2010 | Wood ...................... F01D 25/12 |
| | | | 165/181 |
| 2012/0216506 | A1 * | 8/2012 | Eleftheriou ........... F28D 21/001 |
| | | | 29/401.1 |
| 2014/0208768 | A1 | 7/2014 | Bacic |
| 2016/0017810 | A1 * | 1/2016 | Lord ......................... E04B 1/84 |
| | | | 60/725 |
| 2016/0146025 | A1 | 5/2016 | Miller et al. |
| 2016/0312702 | A1 * | 10/2016 | Thomas .................. F28F 27/02 |
| 2017/0284303 | A1 | 10/2017 | Johnson et al. |
| 2017/0328279 | A1 | 11/2017 | Sennoun et al. |
| 2018/0094583 | A1 | 4/2018 | Carretero Benignos et al. |
| 2018/0230911 | A1 * | 8/2018 | Pastouchenko ......... F01D 25/24 |
| 2018/0231027 | A1 | 8/2018 | Pastouchenko et al. |
| 2019/0003390 | A1 | 1/2019 | Ramos et al. |
| 2019/0040795 | A1 * | 2/2019 | Regnard .................. F02C 7/14 |
| 2019/0128189 | A1 * | 5/2019 | Rambo ................... F02K 3/115 |
| 2020/0122843 | A1 | 4/2020 | Porte et al. |
| 2020/0123921 | A1 | 4/2020 | Kray et al. |
| 2023/0043809 | A1 | 2/2023 | Schimmels et al. |

FOREIGN PATENT DOCUMENTS

| | | | |
|---|---|---|---|
| EP | 3130539 | A1 | 2/2017 |
| EP | 3735518 | A1 | 11/2020 |

OTHER PUBLICATIONS

Munjal, Acoustics of Ducts and Mufflers with Application to Exhaust and Ventilation System Design, ISBN 0471847380, Wiley, 1987, pp. 58-60. Obtained from WIKIPEDIA Transmission Loss (Duct Acoustics) acknowledged in References.

Wikipedia, Thermal Conductivity, 2019, 20 pages.

* cited by examiner

350

352

| L | FLOW RATE | POROSITY | UA | TL |
|---|---|---|---|---|
| 3.00 | 30 | 0.23 | 14637 | 3.00 |
| 3.00 | 30 | 0.24 | 14583 | 2.76 |
| 3.00 | 30 | 0.25 | 14530 | 2.54 |
| 3.00 | 30 | 0.32 | 11862 | 1.59 |
| 3.00 | 30 | 0.33 | 11813 | 1.49 |
| 3.00 | 30 | 0.34 | 11756 | 1.40 |
| 6.00 | 30 | 0.23 | 24476 | 4.99 |
| 6.00 | 30 | 0.24 | 24400 | 4.65 |
| 6.00 | 30 | 0.32 | 20226 | 2.92 |
| 6.00 | 30 | 0.33 | 20154 | 2.75 |
| 6.00 | 30 | 0.42 | 20699 | 1.73 |
| 6.00 | 30 | 0.43 | 20552 | 1.59 |
| 6.00 | 30 | 0.49 | 13611 | 1.11 |
| 6.00 | 30 | 0.50 | 13526 | 1.06 |
| 6.00 | 30 | 0.51 | 13419 | 1.02 |
| 9.00 | 30 | 0.23 | 32677 | 3.70 |
| 9.00 | 30 | 0.24 | 32586 | 3.41 |
| 9.00 | 30 | 0.32 | 27292 | 2.04 |
| 9.00 | 30 | 0.33 | 27204 | 1.91 |
| 9.00 | 30 | 0.42 | 27543 | 1.16 |
| 9.00 | 30 | 0.43 | 27367 | 1.06 |

MED FLOW (50<W<150)

| L | FLOW RATE | POROSITY | UA | TL |
|---|---|---|---|---|
| 3.00 | 100 | 0.23 | 18524 | 3.00 |
| 3.00 | 100 | 0.24 | 18477 | 2.76 |
| 3.00 | 100 | 0.25 | 18428 | 2.54 |
| 3.00 | 100 | 0.32 | 15773 | 1.59 |
| 3.00 | 100 | 0.33 | 15721 | 1.49 |
| 3.00 | 100 | 0.34 | 15659 | 1.40 |
| 6.00 | 100 | 0.23 | 29917 | 4.99 |
| 6.00 | 100 | 0.24 | 29854 | 4.65 |
| 6.00 | 100 | 0.32 | 25802 | 2.92 |
| 6.00 | 100 | 0.33 | 25732 | 2.75 |
| 6.00 | 100 | 0.42 | 24910 | 1.73 |
| 6.00 | 100 | 0.43 | 24776 | 1.59 |
| 6.00 | 100 | 0.49 | 18694 | 1.11 |
| 6.00 | 100 | 0.50 | 18586 | 1.06 |
| 6.00 | 100 | 0.51 | 18446 | 1.02 |
| 9.00 | 100 | 0.23 | 39184 | 3.70 |
| 9.00 | 100 | 0.24 | 39112 | 3.41 |
| 9.00 | 100 | 0.32 | 34066 | 2.04 |
| 9.00 | 100 | 0.33 | 33983 | 1.91 |
| 9.00 | 100 | 0.42 | 32559 | 1.16 |
| 9.00 | 100 | 0.43 | 32404 | 1.06 |

| L | FLOW RATE | POROSITY | UA | TL |
|---|---|---|---|---|
| 3.00 | 250 | 0.23 | 20884 | 3.00 |
| 3.00 | 250 | 0.24 | 20844 | 2.76 |
| 3.00 | 250 | 0.25 | 20799 | 2.54 |
| 3.00 | 250 | 0.32 | 18288 | 1.59 |
| 3.00 | 250 | 0.33 | 18237 | 1.49 |
| 3.00 | 250 | 0.34 | 18174 | 1.40 |
| 6.00 | 250 | 0.23 | 33073 | 4.99 |
| 6.00 | 250 | 0.25 | 32963 | 4.34 |
| 6.00 | 250 | 0.32 | 29237 | 2.92 |
| 6.00 | 250 | 0.33 | 29170 | 2.75 |
| 6.00 | 250 | 0.42 | 27341 | 1.73 |
| 6.00 | 250 | 0.43 | 27218 | 1.59 |
| 6.00 | 250 | 0.49 | 22160 | 1.11 |
| 6.00 | 250 | 0.50 | 22042 | 1.06 |
| 6.00 | 250 | 0.51 | 21888 | 1.02 |
| 9.00 | 250 | 0.23 | 42808 | 3.70 |
| 9.00 | 250 | 0.24 | 42749 | 3.41 |
| 9.00 | 250 | 0.32 | 38076 | 2.04 |
| 9.00 | 250 | 0.33 | 38000 | 1.91 |
| 9.00 | 250 | 0.42 | 35361 | 1.16 |
| 9.00 | 250 | 0.43 | 35223 | 1.06 |

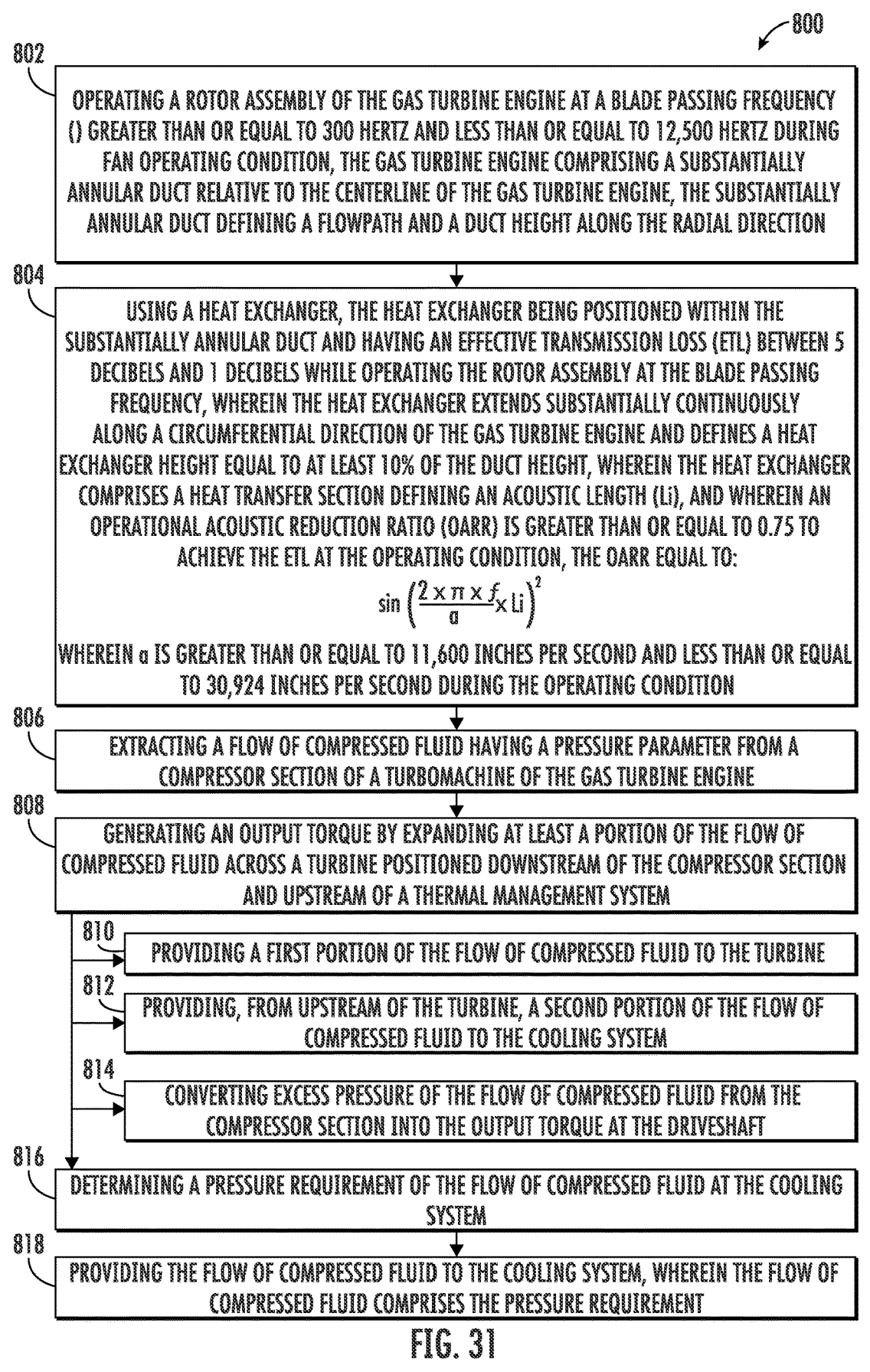

800

802

OPERATING A ROTOR ASSEMBLY OF THE GAS TURBINE ENGINE AT A BLADE PASSING FREQUENCY () GREATER THAN OR EQUAL TO 300 HERTZ AND LESS THAN OR EQUAL TO 12,500 HERTZ DURING FAN OPERATING CONDITION, THE GAS TURBINE ENGINE COMPRISING A SUBSTANTIALLY ANNULAR DUCT RELATIVE TO THE CENTERLINE OF THE GAS TURBINE ENGINE, THE SUBSTANTIALLY ANNULAR DUCT DEFINING A FLOWPATH AND A DUCT HEIGHT ALONG THE RADIAL DIRECTION

804

USING A HEAT EXCHANGER, THE HEAT EXCHANGER BEING POSITIONED WITHIN THE SUBSTANTIALLY ANNULAR DUCT AND HAVING AN EFFECTIVE TRANSMISSION LOSS (ETL) BETWEEN 5 DECIBELS AND 1 DECIBELS WHILE OPERATING THE ROTOR ASSEMBLY AT THE BLADE PASSING FREQUENCY, WHEREIN THE HEAT EXCHANGER EXTENDS SUBSTANTIALLY CONTINUOUSLY ALONG A CIRCUMFERENTIAL DIRECTION OF THE GAS TURBINE ENGINE AND DEFINES A HEAT EXCHANGER HEIGHT EQUAL TO AT LEAST 10% OF THE DUCT HEIGHT, WHEREIN THE HEAT EXCHANGER COMPRISES A HEAT TRANSFER SECTION DEFINING AN ACOUSTIC LENGTH (Li), AND WHEREIN AN OPERATIONAL ACOUSTIC REDUCTION RATIO (OARR) IS GREATER THAN OR EQUAL TO 0.75 TO ACHIEVE THE ETL AT THE OPERATING CONDITION, THE OARR EQUAL TO:

$$\sin\left(\frac{2 \times \pi \times f}{a} \times Li\right)^2$$

WHEREIN a IS GREATER THAN OR EQUAL TO 11,600 INCHES PER SECOND AND LESS THAN OR EQUAL TO 30,924 INCHES PER SECOND DURING THE OPERATING CONDITION

806

EXTRACTING A FLOW OF COMPRESSED FLUID HAVING A PRESSURE PARAMETER FROM A COMPRESSOR SECTION OF A TURBOMACHINE OF THE GAS TURBINE ENGINE

808

GENERATING AN OUTPUT TORQUE BY EXPANDING AT LEAST A PORTION OF THE FLOW OF COMPRESSED FLUID ACROSS A TURBINE POSITIONED DOWNSTREAM OF THE COMPRESSOR SECTION AND UPSTREAM OF A THERMAL MANAGEMENT SYSTEM

810

PROVIDING A FIRST PORTION OF THE FLOW OF COMPRESSED FLUID TO THE TURBINE

812

PROVIDING, FROM UPSTREAM OF THE TURBINE, A SECOND PORTION OF THE FLOW OF COMPRESSED FLUID TO THE COOLING SYSTEM

814

CONVERTING EXCESS PRESSURE OF THE FLOW OF COMPRESSED FLUID FROM THE COMPRESSOR SECTION INTO THE OUTPUT TORQUE AT THE DRIVESHAFT

816

DETERMINING A PRESSURE REQUIREMENT OF THE FLOW OF COMPRESSED FLUID AT THE COOLING SYSTEM

818

PROVIDING THE FLOW OF COMPRESSED FLUID TO THE COOLING SYSTEM, WHEREIN THE FLOW OF COMPRESSED FLUID COMPRISES THE PRESSURE REQUIREMENT

FIG. 31

GAS TURBINE ENGINE HAVING A HEAT EXCHANGER LOCATED IN AN ANNULAR DUCT

CROSS-REFERENCE TO RELATED APPLICATIONS

This application is a continuation-in-part application of U.S. patent application Ser. No. 18/430,907 filed Feb. 2, 2024, which is a continuation-in-part application of U.S. patent application Ser. No. 18/160,375 filed Jan. 27, 2023, and each of which are hereby incorporated by reference in their entirety.

FIELD

The present subject matter relates generally to a heat exchanger for a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator.

During operation of the gas turbine engine various systems may generate a relatively large amount of heat. For example, a substantial amount of heat may be generated during operation of the thrust generating systems, lubrication systems, electric motors and/or generators, hydraulic systems or other systems. Accordingly, a means for dissipating the heat generated by the various systems would be advantageous in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 31 is flow diagram of a method for operating a gas turbine engine in accordance with an exemplary aspect of the present disclosure.

DETAILED DESCRIPTION

Figure 1:
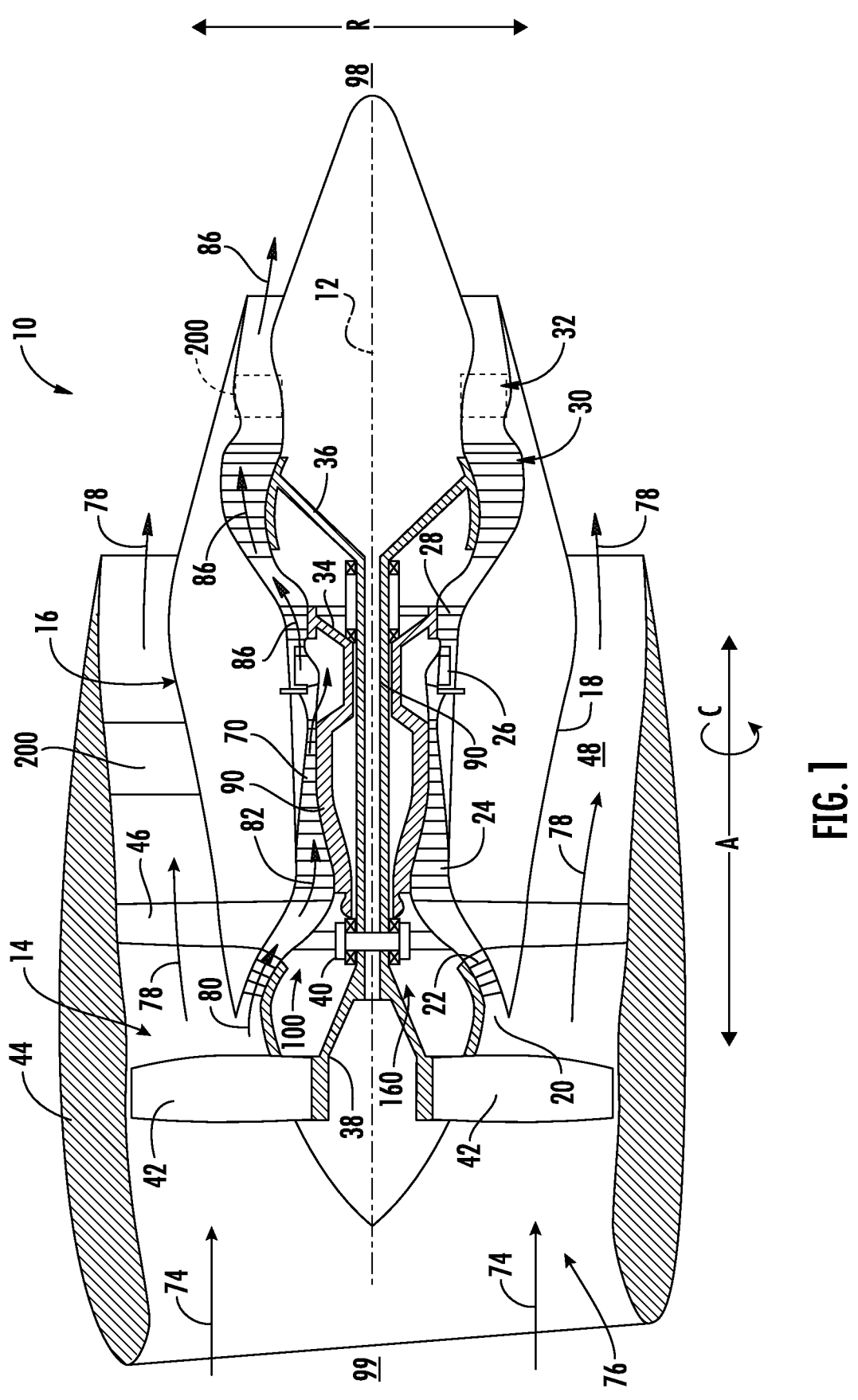
FIG. 1 is a schematic cross-sectional view of a gas turbine engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The term "fluid" may be a gas or a liquid. The term "fluid communication" means that a fluid is capable of making the connection between the areas specified.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Substantially annular" with respect to a duct or flowpath, such as a duct or flowpath with a heat exchanger positioned therein, refers to a duct or flowpath that is fully annular (i.e., extends continuously and uninterrupted in a circumferential direction with the exception of only the heat exchanger), or partially annular with at least 50% volume percent of void with the exception of the heat exchanger (such as at least 60%, such as at least 70%, such as at least 80%, such as at least 90% volume percent of void with the exception of the heat exchanger). For example, in certain embodiments, "substantially annular" describes a duct or flowpath that includes struts or other similar structure extending therethrough to occupy 30% of the annular space (with 70% of the annular space being void in the absence of the heat exchanger) resulting in a partially annular duct.

"Transmission Loss" or "TL" as used herein means a measurement of a reduction in sound level as sound from a sound source passes through an acoustic barrier. TL is expressed in units of decibels (dB) and indicates a reduction in sound intensity (at given frequencies) as sound-producing pressure waves encounter structure, or an acoustic barrier, such as a heat exchanger located within an annular flow path.

"Effective Transmission Loss" or "ETL" for a component of a gas turbine engine refers to an amount of TL that is expected for the component of the gas turbine engine during specified operating conditions. ETL is defined in more detail below. The ETL and TL for embodiments disclosed are more specifically expressed as an average ETL or TL, respectively, over a frequency bandwidth, such as between 300 Hertz ("Hz") and 12,500 Hz, or if the text indicates, as ETL or TL, respectively, at a particular frequency. According to the disclosure a range for ETL and TL is at least 1 dB and less than 5 dB.

"UA" as used herein means the product of an overall heat transfer coefficient (U) of the portion of a heat exchanger exposed to a fluid (e.g., air) passing through a flowpath in which the heat exchanger is positioned and the total surface area (A) of the heat exchanger positioned within the flowpath. The units may be expressed in British thermal units per hour per degrees Fahrenheit (Btu/(hr-° F.)). The ability of the portion of the heat exchanger to reject or accept heat to or from the fluid relates to the heat transfer characteristics of the material forming the portion exposed to the fluid (e.g., aluminum, steel, metal alloys, etc.), or more particularly to an overall heat transfer coefficient (CTE) of the portion of the heat exchanger exposed to the fluid, and the surface area of this portion. The parameter "UA" represents the effect of both the CTE and the surface area exposed to the fluid.

"Porosity" as used herein refers to a void fraction of the heat exchanger positioned within a flowpath. For example, the heat exchanger may define a flow area at a location and the flowpath may define a flow area at the same location (i.e., a flow area without the heat exchanger). Porosity of the heat exchanger is the ratio of the flow area of the heat exchanger to the flow area of the flowpath at the location.

"Blade passing frequency" of a stage of rotor blades, as used herein, means the product of a rotation rate (in revolutions per minute or RPM) and the number of rotor blades of the stage of rotor blades. As will be discussed in more detail below, when described relative to a heat exchanger of the present disclosure in a substantially annular duct or flowpath, the blade passing frequency refers to the blade passing frequency of an upstream rotor (located immediately upstream of the heat exchanger) calculated using the number of rotor blades of the rotor located immediately upstream of the heat exchanger. The units for blade passing frequency is hertz (Hz) or kilohertz (kHz), as indicated. For example, with reference to a fan of a turbofan or open rotor engine, the blade passing frequency refers to a product of a rotation rate (in RPM) of the fan rotor and the number of fan blades in the fan. The fan may refer to a fan exterior to a turbomachine (e.g., a fan located within a duct of a turbofan, e.g., fan assembly 14 of FIG. 1, or in a flowpath of an open rotor engine, e.g., fan assembly 150 of FIG. 2), or internal, such as a fan that is located downstream of an inlet to the turbomachine and upstream of at least one compressor of the turbomachine (e.g., fan 184 of FIG. 2). The rotor, rotation rate and rotor blades can also refer to a stage of a low pressure compressor or low pressure turbine (e.g., LP compressor 22, 126 and LP turbine 30, 134 respectively) when the stage is the respective rotor immediately upstream of the heat exchanger contained within the substantially annular duct.

"Rotor assembly" refers to a plurality of rotating airfoils at a given axial location within the gas turbine engine, such as the rotating airfoils within a given stage of a gas turbine engine. For example, the term rotor assembly may refer to a primary fan of a fan assembly of a turbofan or open rotor engine (e.g., an upstream-most fan located within a duct of a turbofan engine, e.g., fan assembly 14 of FIG. 1, or located within a flowpath of an open rotor engine, e.g., fan assembly 150 of FIG. 2); or a ducted fan of an open rotor engine (e.g., ducted fan 184 in FIG. 2). Additionally or alternatively, the term rotor assembly may refer to the rotating airfoils within a stage of a turbomachine of a gas turbine engine, such as the LP turbine rotor blades within a stage of an LP turbine (e.g., LP turbine 30 in FIG. 1 or LP turbine 134 in FIG. 2).

"Mass flow" or "mass flow rate" as used herein means the rate of mass flow of a fluid through a heat exchanger, mass flow through a duct upstream or downstream of the heat exchanger, or mass flow through a closed area volume. The units are pounds mass per second (lbm/sec.).

"Pressure drop" across an obstacle refers to the change in fluid pressure that occurs when the fluid passes through the obstacle. A pressure drop means the fluid's static pressure immediately upstream of the obstacle minus the fluid's static pressure immediately downstream of the obstacle divided by the fluid's static pressure immediately upstream of the obstacle, and is expressed as a percentage.

The disclosure provides examples of a variety of heat exchangers, examples of which include a "plate fin" heat exchanger, a "tube" heat exchanger, a "counter-flow" heat exchanger, an "onion" style heat exchanger, and "any dedicated channels" for heat exchange.

As used herein, the term "fin-based" heat exchanger refers to a heat exchanger that uses one or more fins extending into a cooling fluid flow or a heating fluid flow to increase a surface area exposed to the cooling or heating fluid flow to increase an efficiency of the heat exchanger. Examples of fin-based heat exchangers include a plate fin heat exchanger and a pin-fin heat exchanger.

A "plate fin" heat exchanger as used herein refers to a heat exchanger having a surface with fins extending therefrom configured to increase a heat transfer between the surface and a fluid passing over the fins. An example of this type of heat exchanger is described below with reference to FIG. 5.

A "pin-fin" heat exchanger as used herein refers to a heat exchanger having a first surface and a second surface. Fins and pins extend from the first surface, the second surface, or both surfaces to increase a heat transfer between the first and/or second surfaces and a fluid passing over the fins and pins.

A "tube" heat exchanger as used herein means a heat exchanger that includes one or more tubes or other conduit extending through a fluid flowpath. Such a heat exchanger may facilitate heat transfer from a fluid through the tube or other conduit and a fluid through the fluid flowpath. An example of this type of heat exchanger is described in reference to FIG. 4.

A "tube-sheet" heat exchanger as used herein means a heat exchanger having a plurality of tubes and a sheet with a plurality of holes through which the plurality of tubes extend.

A "shell-and-tube" heat exchanger refers to a heat exchanger that includes an outer shell housing a large number of tubes. Examples of this type of heat exchanger are described in reference to FIGS. 8 through 11.

A "counter-flow" heat exchanger as used herein means a heat exchanger wherein a direction of a flow of one of the working fluids is opposite a direction of a flow of another of the working fluids.

An "onion" style heat exchangers as used herein means a heat exchanger having a diverging section and a converging section with heat exchange features extending through these sections. An example of this type of heat exchanger is provided in FIGS. 11 through 13 and 20 through 23.

The term "heat transfer section" of a heat exchanger refers to a portion of the heat exchanger having unique heat transfer structural profile relative to an adjacent portion of the heat exchanger along a length of the heat exchanger, as well as a change in a cross-sectional area relative to the adjacent portion of the heat exchanger or an adjacent portion of a duct within which the heat exchanger is positioned. This term is explained in more detail with reference to the exemplary embodiment of FIG. 11.

The term "any dedicated channel" heat exchangers as used herein means any channel created specifically to transport fluid for the purpose of exchanging thermal energy.

The term "length," as used herein with respect to a heat exchanger, refers to a measurement along a centerline through the heat exchanger from an upstream-most edge of the heat exchanger to a downstream-most edge of the heat exchanger positioned within a fluid flowpath. The centerline is a geometric centerline and takes into account a swirl of the fluid flow through the heat exchanger, if present (e.g., a circumferential swirl in the embodiment of FIG. 11). The term "length" in the context of a heat exchanger generally refers to a combined length of each of the one or more heat transfer sections. In such a manner, the length refers to the average distance a flow stream follows through the heat exchanger. In some embodiments, the heat exchanger may include multiple channels, in which case the centerline is the geometric mean of the plurality of channels.

The term "acoustic length" as used herein with respect to a heat transfer section of a heat exchanger refers to a measurement along a centerline through the heat transfer section of the heat exchanger. The centerline is a geometric centerline and takes into account any swirl of the fluid flow through the heat transfer section of the heat exchanger, if present (e.g., a circumferential swirl in the embodiment of FIG. 11). For a heat exchanger including a single heat transfer section, such as the exemplary heat exchangers depicted in FIGS. 4 through 10, the acoustic length of the heat transfer section is equal to the length of the heat exchanger. For a heat exchanger including a plurality of heat transfer sections, the length of the heat exchanger is equal to a sum of the acoustic lengths of the respective heat transfer sections. In such a manner, the acoustic length of a heat transfer section refers to the average distance a flow stream follows through the heat transfer section of the heat exchanger. In some embodiments, the heat exchanger may include multiple channels through a heat transfer section, in which case, the centerline of the heat transfer section is the geometric mean of the plurality of channels through the heat transfer section.

For example, in embodiments wherein the heat transfer sections of the heat exchanger are symmetrical about a reference line extending from a center of an inlet to a center of an outlet (see, e.g., FIG. 11), the centerlines used to determine the acoustic lengths are each straight lines (assuming no swirl in a circumferential direction). By contrast, in embodiments wherein the heat transfer sections of the heat exchanger are asymmetrical about a reference line extending from a center of an inlet to a center of an outlet (see, e.g., FIG. 23), the centerlines used to determine the acoustic lengths will have a curve, such as an arc, extending through the respective heat transfer sections. In the case where a centerline is an arc, the arc length may be calculated to determine the desired length for tuning to the blade passing frequency, as disclosed herein.

The term "medium power operating condition" refers to an operating condition of an engine for a flight phase that occurs when the aircraft levels after a climb to a set altitude and before it begins to descend (i.e., a cruise operating condition). Additionally, medium power operating condition may refer to a descent operating condition.

The phrase "low power operating condition" refers to an operating condition of an engine at a power level less than a cruise power level during a cruise operating condition. For example, low power operating condition may refer to a flight idle operating condition, a ground idle operating condition, an approach idle operating condition, etc., where the engine is operating at a power level less than about 85% of a rated power of the engine, such as less than about 80% of a rated power of the engine.

The phrase "high power operating condition" refers to an operating condition of an engine at a power level greater than a cruise power level during a cruise operating condition. For example, high power operating condition may refer to a takeoff operating condition, a climb operating condition, etc.

The term "bypass ratio" of a turbofan engine or open rotor engine refers to a ratio bypass airflow to engine airflow, each measured as a mass flowrate. The engine airflow refers to an airflow provided through an upstream-most engine inlet downstream of a primary fan of the turbofan engine (e.g., annular inlet 20 in FIG. 1) or of the open rotor engine (e.g., engine inlet 182 in FIG. 2). The bypass airflow refers to a remainder of an airflow from the primary fan not considered engine airflow.

The terms "first stream" and "second stream" as used herein mean a working gas flowpath of a turbomachine that passes through a core of a turbomachine (high pressure compressor, combustor, and high pressure turbine) and a fan stream or bypass stream, respectively.

A "third stream" as used herein means a non-primary air stream capable of increasing fluid energy to produce a minority of total propulsion system thrust. A pressure ratio of the third stream is higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

References to "noise", "noise level", or "perceived noise", or variations thereof, are understood to include sound pressure levels (SPL) outside a fuselage, fuselage exterior noise levels, perceived noise levels, effective perceived noise levels (EPNL), instantaneous perceived noise levels (PNL(k)), or tone-corrected perceived noise levels (PNLT(k)), or one or more duration correction factors, tone correction factors, or other applicable factors, as defined by the Federal Aviation Administration (FAA), the European Union Aviation Safety Agency (EASA), the International Civil Aviation Organization (ICAO), Swiss Federal Office of Civil Aviation (FOCA), or committees thereof, or other equivalent regulatory or governing bodies. Where certain ranges of noise levels (e.g., in decibels, or dB) are provided herein, it will be appreciated that one skilled in the art will understand methods for measuring and ascertaining of such levels without ambiguity or undue experimentation. Methods for measuring and ascertaining one or more noise levels as provided herein by one skilled in the art, with reasonable certainty and without undue experimentation, include, but are not limited to, understanding of measurement systems, frames of reference (including, but not limited to, distances, positions, angles, etc.) between the engine and/or aircraft relative to the measurement system or other perceiving body, or atmospheric conditions (including, but not limited to, temperature, humidity, dew point, wind velocity and vector, and points of reference for measurement thereof), as may be defined by the FAA, EASA, ICAO, FOCA, or other regulatory or governing body.

As used herein, the term "community noise" refers to an amount of noise produced by an engine and/or aircraft that is observed on the ground, typically in the community around an airport during a takeoff or landing.

As provided herein, embodiments of the engine included herein define noise levels between 5 decibels (dB) and 10 dB below ICAO's Annex 16 Volume 1 Chapter 14 noise standards applicable on or after 31 Dec. 2017 for airplanes with a maximum takeoff weight of at least 55 tons. Additionally, or alternatively, embodiments of the engine provided herein may attenuate low frequency noise, such as those that may propagate to the ground while an engine is at cruise altitude, or as may be referred to as en-route noise or community noise.

In certain exemplary embodiments of the present disclosure, a gas turbine engine defining a centerline and a circumferential direction is provided. The gas turbine engine may generally include a turbomachine and a fan assembly. The fan assembly may be driven by the turbomachine. The turbomachine, the fan assembly, or both may define a substantially annular flowpath relative to the centerline of the gas turbine engine. The gas turbine engine includes a heat exchanger positioned within the flow path and extending along the circumferential direction, such as substantially continuously along the circumferential direction. The heat exchanger may be fully annular, meaning completing an annulus, or partially annular such that a portion of the fluid traveling through the duct will not pass through a flow area of the heat exchanger flow while other portions will pass through the heat exchanger flow area.

A heat exchanger design for the gas turbine engine may be designed for flight idle conditions, such during a descent of an aircraft including the gas turbine engine. The objective, when designing the heat exchanger, may be generally stated as satisfying a minimum heat transfer capability from a hot fluid to a cold fluid for an acceptable amount of pressure drop across the heat exchanger. Key factors to consider include a mass flow rate through the duct at flight idle conditions and the type or characteristics of the selected heat exchanger.

A heat exchanger optimized for flight idle conditions however may turn out to be unacceptable during other flight conditions, such as during high power operating conditions where maximum thrust may be needed (e.g., takeoff, climb, turnaround during descent, etc.). During such periods a heat exchanger optimized for flight idle, it may become necessary to modify heat exchanger properties to improve its noise attenuation capability to meet community and/or cabin noise requirements. Given the complex nature of sound transmission through a fluid, heretofore a standard engineering practice has been to evaluate the acoustic environment for different flight conditions for a selected heat exchanger, or heat exchanger optimized for maximum heat transfer with acceptable pressure drop. And if it is expected that a chosen heat exchanger, that is, a heat exchanger optimized for pressure drop and heat transfer between fluids, does not provide a desired amount of noise reduction when air passes through the duct and internal surfaces of the heat exchanger, then the heat exchanger may need a re-design so that less noise is produced during the flight condition, e.g., takeoff. Thus, standard practice has been to optimize a heat exchanger for flight idle, evaluate whether that heat exchanger produces acceptable noise levels across a flight envelope (or rather permits an acceptable amount of noise to attenuate across the heat exchanger), and if it does not, re-design, that is, essentially start over and re-optimize the heat exchanger to reduce the amount of noise produced during the affected flight condition while still satisfying the heat transfer and/or maximum pressure drop requirements. It would be desirable to have an initial design or design requirements established for a heat exchanger at the beginning in order to avoid this iterative process; that is, establish the conditions or limitations on a heat exchanger satisfying engine architecture requirements accounting for acceptable pressure drop, desired transmission loss for air traveling through an annular duct, and heat transfer requirements at flight idle.

Figure 2:
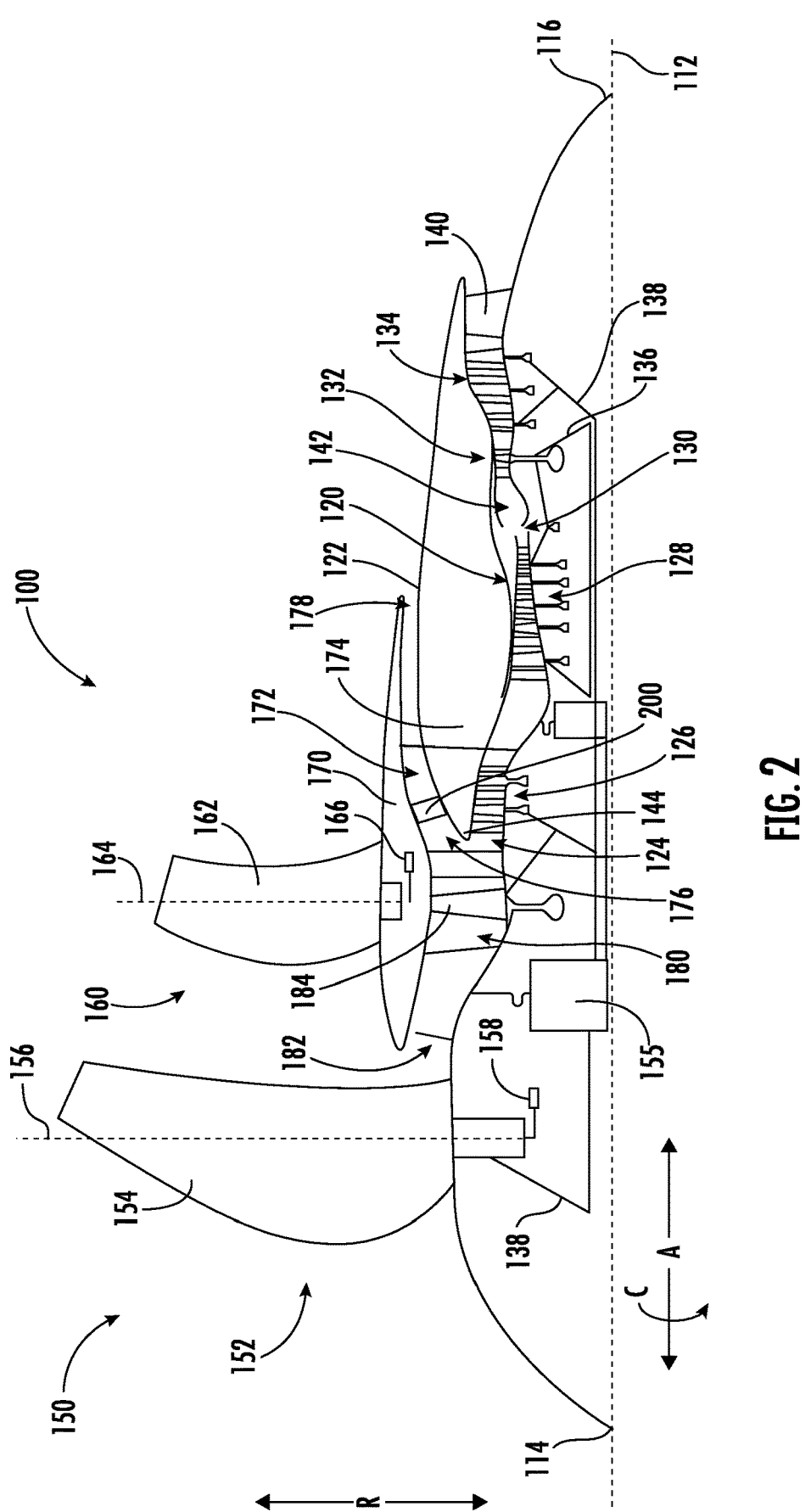
FIG. 2 is a schematic cross-sectional view of a three-stream engine in accordance with an exemplary embodiment of the present disclosure.

The inventors' practice has proceeded in the manner of designing a heat exchanger, modifying the heat exchanger, and redesigning the heat exchanger to meet acoustic requirements, then checking acoustic response again, etc. during the design of several different types of turbomachines, such as those shown in FIGS. 1 and 2. The types of heat exchangers considered in these designs iterations (i.e., heat exchanger optimization vs. resulting acoustic environment) include heat exchanger designs that utilized one or more of a "fin-based" heat exchanger, "plate fin" heat exchanger, "shell and tube" heat exchanger, "counter-flow" heat exchanger, "onion" style heat exchanger, "any dedicated channel" heat exchanger, or the like. Examples of the turbomachine engines and heat exchanger types developed by the inventors follows.

Referring now to the drawings, FIG. 1 is a schematic partially cross-sectioned side view of an exemplary gas turbine engine 10 as may incorporate various embodiments of the present disclosure. The engine 10 may be configured as a gas turbine engine for an aircraft. Although further described herein as a turbofan engine or open rotor engine (FIG. 2), the principles set forth in this description, with reference to the several examples, including engines 10 and 100, may alternatively be adapted for a turboshaft, turboprop, or turbojet gas turbine engine in light of this disclosure.

As shown in FIG. 1, the engine 10 has a longitudinal or axial centerline 12 that extends therethrough for reference purposes. An axial direction A is extended co-directional to the axial centerline 12 for reference. The engine 10 further defines an upstream end 99 (or forward end) and a downstream end 98 (or aft end) for reference. In general, the engine 10 includes a fan assembly 14 and a turbomachine 16 disposed downstream from the fan assembly 14. For reference, the engine 10 defines an axial direction A, a radial direction R, and a circumferential direction C. In general, the axial direction A extends parallel to the axial centerline 12, the radial direction R extends outward from and inward to the axial centerline 12 in a direction orthogonal to the axial direction A, and the circumferential direction extends three hundred sixty degrees (360°) around the axial centerline 12.

The turbomachine 16 includes a substantially tubular outer casing 18 that defines an annular inlet 20 to the turbomachine 16. The outer casing 18 encases or at least partially forms, in serial flow relationship, a compressor section having a booster or low pressure (LP) compressor 22, a high pressure (HP) compressor 24, a combustion section 26, an expansion section or turbine section including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 is connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the turbomachine 16.

It should be appreciated that the nacelle 44 is configured to be supported relative to the turbomachine 16 by a plurality of circumferentially-spaced outlet guide vanes or struts 46. Moreover, at least a portion of the nacelle 44 depicted extends over an outer portion of the turbomachine 16 so as to define a second stream, or fan flow passage 48, therebetween.

During operation of the engine 10, a flow of air, shown schematically by arrows 74, enters an inlet 76 of the engine 10 defined by the fan case or nacelle 44. A portion of air, shown schematically by arrows 80, enters the turbomachine 16 through the inlet 20 defined at least partially by the outer casing 18. The flow of air is provided in serial flow through the compressors, the combustion section 26, and the expansion section. In particular, for the embodiment shown, the turbomachine 16, and more specifically, the compressor section, the combustion section 26, and turbine section, together define at least in part a working gas flowpath 70, or second stream. The flow of air 80 is increasingly compressed as it flows across successive stages of the compressors 22, 24, such as shown schematically by arrows 82. The compressed air 82 enters the combustion section 26 and mixes with a liquid and/or gaseous fuel and is ignited to produce combustion gases 86. It should be appreciated that the combustion section 26 may include any appropriate system for generating combustion gases, including, but not limited to, deflagrative or detonative combustion systems, or combinations thereof. The combustion section 26 may include annular, can, can-annular, trapped vortex, involute or scroll, rich burn, lean burn, rotating detonation, or pulse detonation configurations, or combinations thereof.

The combustion gases 86 release energy to drive rotation of the HP turbine 28 and shaft 34 and the LP turbine 30 and shaft 36 before exhausting from the jet exhaust nozzle section 32. The release of energy from the combustion gases 86 further drives rotation of the fan assembly 14, including the fan blades 42. A portion of the air 74 bypasses the turbomachine 16 and flows across the fan flow passage 48, such as shown schematically by arrows 78. A ratio of the air 78 to the air 80 is referred to herein as a bypass ratio of the engine 10. During operation of the engine 100 in a high power operating condition, the bypass ratio may be between 2.9 and 45, such as at least 4.5, such as at least 6, such as at least 10, such as at least 12, such as up to 35, such as up to 25.

It should be appreciated that FIG. 1 depicts and describes a two-stream engine having the working gas flowpath 70 (first stream) and the fan flow passage 48 (second stream). The embodiment depicted in FIG. 1 has a nacelle 44 surrounding the fan blades 42, such as to provide noise attenuation, blade-out protection, and other benefits known for nacelles, and which may be referred to herein as a "ducted fan," or the entire engine 10 may be referred to as a "ducted engine."

Notably, in the embodiment depicted, the engine 10 further includes a heat exchanger 200 in the second stream/bypass passage 48. As will be appreciated, the bypass stream 48 is an annular flowpath relative to the centerline 12. The heat exchanger 200 is positioned in the bypass stream 48 and extends along the circumferential direction C within the bypass stream 48 (although only depicted schematically at the top portion for clarity).

In additional or alternative embodiments, however, the heat exchanger 200 may be positioned in any other annular or substantially annular passage, such as within the exhaust section 32, as is depicted in phantom, as, e.g., a waste heat recovery heat exchanger. The heat exchanger 200 in the exhaust section 32 may again be an annular heat exchanger, and may be configured to receive heat from the combustion gases 86.

In such a manner, it will be appreciated that in one or more of these example embodiments, the exchanger 200 may extend along the circumferential direction C within the flowpath for at least about 30 degrees of the annular or substantially annular passage, such as at least 90 degrees, such as at least 150 degrees, such as at least 180 degrees, such as at least 240 degrees, such as at least 300 degrees, such as at least 330 degrees. Additionally, or alternatively, in certain exemplary embodiments, the exchanger 200 may extend substantially continuously along the circumferential direction C within the flowpath (e.g., for at least about 345 degrees of the annular or substantially annular passage), or continuously along the circumferential direction C within the flowpath (e.g., for 360 degrees of the annular passage).

Referring now to FIG. 2, a schematic cross-sectional view of a gas turbine engine is provided according to another example embodiment of the present disclosure. Particularly, FIG. 2 provides an engine having a fan assembly with a single stage of unducted rotor blades. In such a manner, the fan assembly may be referred to herein as an "unducted fan," or the entire engine 100 may be referred to as an "unducted engine." In addition, the engine of FIG. 2 includes a third stream extending from the compressor section to a fan assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a fan assembly, also referred to a fan section 150, positioned upstream thereof. Generally, the turbomachine 120 includes, in serial flow order, a compressor section, a combustion section, a turbine section, and an exhaust section. Particularly, as shown in FIG. 2, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 128 drives the high pressure compressor 128 through a high pressure shaft 136. In this regard, the high pressure turbine 128 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 2, the fan 152 is an open rotor or unducted fan 152. As depicted, the fan 152 includes an array of fan blades 154 (only one shown in FIG. 2). The fan blades 154 are rotatable, e.g., about the longitudinal axis 112. As noted above, the fan 152 is drivingly coupled with the low pressure turbine 134 via the LP shaft 138. The fan 152 can be directly coupled with the LP shaft 138, e.g., in a direct-drive configuration. However, for the embodiments shown in FIG. 2, the fan 152 is coupled with the LP shaft 138 via a speed reduction gearbox 155, e.g., in an indirect-drive or geared-drive configuration.

Moreover, the fan blades 154 can be arranged in equal spacing around the longitudinal axis 112. Each blade 154 has a root and a tip and a span defined therebetween. Each blade 154 defines a central blade axis 156. For this embodiment, each blade 154 of the fan 152 is rotatable about their respective central blades axes 156, e.g., in unison with one another. One or more actuators 158 are provided to facilitate such rotation and therefore may be used to change a pitch of the blades 154 about their respective central blades axes 156.

The fan section 150 further includes a fan guide vane array 160 that includes fan guide vanes 162 (only one shown in FIG. 2) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 2 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about their respective central blades axes 164, e.g., in unison with one another. One or more actuators 166 are provided to facilitate such rotation and therefore may be used to change a pitch of the fan guide vane 162 about their respective central blades axes 164. However, in other embodiments, each fan guide vane 162 may be fixed or unable to be pitched about its central blade axis 164. The fan guide vanes 162 are mounted to a fan cowl 170.

As shown in FIG. 2, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., the HP compressor 128 and combustion section for the embodiment depicted). The ducted fan is shown at about the same axial location as the fan blade 154, and radially inward of the fan blade 154. The ducted fan 184 is, for the embodiment depicted, driven by the low pressure turbine 134 (e.g. coupled to the LP shaft 138).

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan flowpath or fan duct 172. The fan flowpath or fan duct 172 may be referred to as a third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 2). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from the leading edge 144 of the core cowl 122 and may partially co-extend generally axially on opposite radial sides of the core cowl.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the array of fan guide vanes 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

As will be appreciated, a first portion of air received by the fan 152 is provided through the engine inlet 182, and a second portion of the air received by the fan 152 is provided over the fan cowl 170 and core cowl 122. A ratio of the second portion of air to the first portion of air is referred to as a bypass ratio of the engine 100. During operation of the engine 100 in a high power operating condition, the bypass ratio may be between 2.9 and 45, such as at least 4.5, such as at least 6, such as at least 10, such as at least 12, such as up to 35, such as up to 25.

In exemplary embodiments, air passing through the fan duct 172 may be relatively cooler (e.g., lower temperature) than one or more fluids utilized in the turbomachine 120. In this way, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, in certain exemplary embodiments, the engine 100 may further include one or more heat exchangers 200 in other annular ducts or flowpath of the engine 100, such as in the inlet duct 180, in the turbomachinery flowpath/core duct 142, within the turbine section and/or turbomachine exhaust nozzle 140, etc.

In at least certain exemplary embodiments, the heat exchanger(s) 200 of FIG. 2 (and FIG. 1) may extend in the circumferential direction C as well as in the radial direction R across the annular duct or flowpath of the engine 100. For example, referring now briefly to FIG. 3, providing a partial cross-sectional view of the heat exchanger 200 of FIG. 2, it will be appreciated that the heat exchanger 200 may extend substantially continuously in the circumferential direction C and across an entirety of the annular duct or flowpath in the radial direction R.

With respect to extending substantially continuously in the circumferential direction C, the heat exchanger 200 may extend substantially 360 degrees in the circumferential direction C, about the longitudinal axis 112.

With respect to extending in the radial direction R, the exemplary heat exchanger 200 depicted extends completely across the annular duct or flowpath in the radial direction R. In particular, the heat exchanger 200 shown is positioned in the fan duct 172, defining a duct height, $H_D$, in the radial direction R at the location along the axial direction A. The heat exchanger 200 defines a heat exchanger height, $H_{HX}$, in the radial direction R also at the location along the axial direction A. The heat exchanger height, $H_{HX}$, is equal to the duct height, $H_D$, at the location along the axial direction A for the embodiment shown.

Notably, as used herein, the term "duct height, $H_D$" of an annular duct or flowpath refers to a length along the radial direction R from an inner wall of the duct or flowpath along the radial direction R to an outer wall or boundary of the duct or flowpath along the radial direction R, at a location along the axial direction A. For example, in the embodiment depicted, the duct height, $H_D$, of the fan duct 172 is a length along the radial direction R from the core cowl 122 to the fan cowl 170 at the location along the axial direction A. To the extent the length varies at different circumferential locations at the location along the axial direction A, the term duct height, $H_D$, refers to an average duct height, $H_D$, at the location along the axial direction A. Further the term, "heat exchanger height, $H_{HX}$" refers to a length of the heat exchanger 200 along the radial direction R at the location along the axial direction A within the duct or flowpath. Accordingly, in the embodiment shown, since the heat exchanger 200 extends completely across the fan duct 172, the heat exchanger height, $H_{HX}$, is equal to the duct height, $H_D$, at the location along the axial direction A.

In some embodiments the heat exchanger 200 extends between 10% and 100% of the duct height, such as between 12% and 30% of the duct height. For example, a heat exchanger height, $H_{HX}$, of a heat exchanger located downstream of the fan 184 and within the substantially annular fan duct 172, is greater than 10% of the duct height, $H_D$, at the location along the axial direction A, and less than 100% of the duct height, $H_D$ (see, e.g., heat exchanger height, $H_{HX}'$, depicted in phantom in FIG. 3). For example, the heat exchanger height, $H_{HX}$, may be greater than or equal to 15% of the duct height, $H_D$, such as greater than or equal to 20% of the duct height, $H_D$, greater than or equal to 30% of the duct height, $H_D$, or greater than or equal to 50% of the duct height, $H_D$, at the location along the axial direction A. In such a configuration, the heat exchanger 200 may be positioned on an inner wall of the duct (e.g., the core cowl 122), on an outer wall of the duct (e.g., the fan cowl 170), or suspended therebetween through one or more supports.

Figure 3:
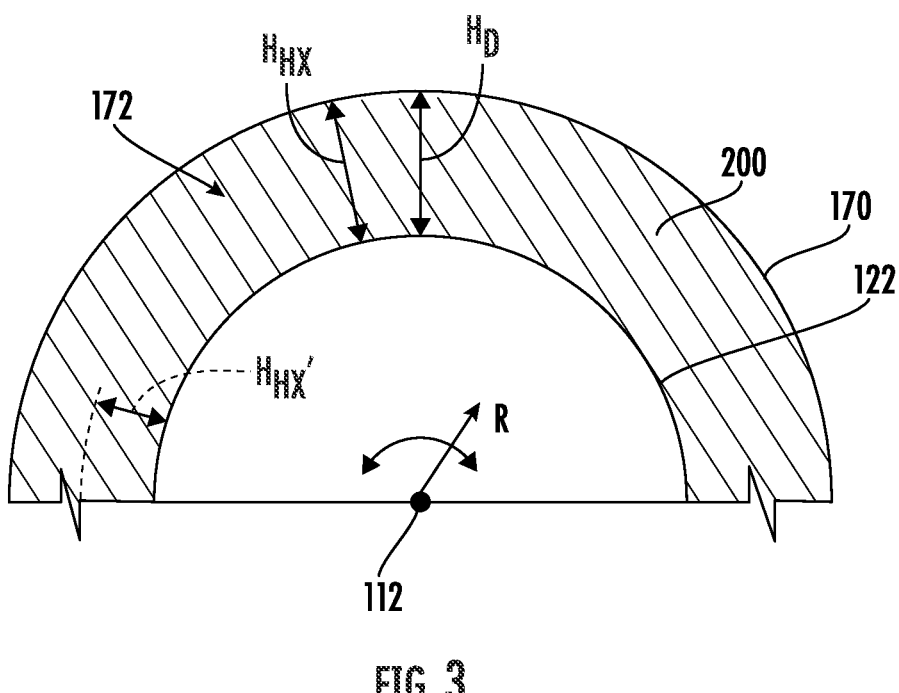
FIG. 3 is a schematic cross-sectional view of a heat exchanger and flowpath in accordance with an exemplary embodiment of the present disclosure.

Further, referring still to FIG. 3, it will be appreciated that, as noted above, the fan duct 172 in which the heat exchanger 200 is positioned is an annular duct, or rather a full annular duct, in that it extends continuously and uninterrupted in the circumferential direction C. In other embodiments, however, the fan duct 172, or a portion of the fan duct 172 in which the heat exchanger 200 is positioned, or another duct or flowpath in which the heat exchanger 200 is positioned, may be a partially annular duct.

Figure 4:
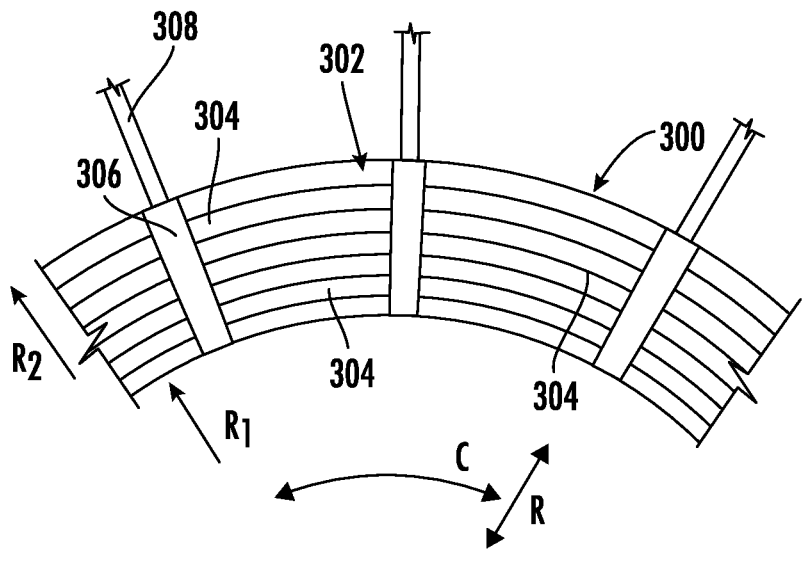
FIG. 4 is a schematic cross-sectional view of a heat exchanger and flowpath in accordance with another exemplary embodiment of the present disclosure.

More specifically, still, referring now also to FIG. 4, a close-up, cross-sectional view of a heat exchanger 300 positioned within a flowpath 302 is provided. In at least certain exemplary embodiments, the heat exchanger 300 and flowpath 302 may be configured in a similar manner as the exemplary heat exchanger 200 and flowpath (e.g., fan duct 172) described above with reference to FIG. 1 or 2.

For the embodiment of FIG. 4, the heat exchanger 300 is configured as a tube-based heat exchanger 300, including a plurality of channels or tubes 304 extending through the flowpath 302. The heat exchanger 300 further includes a plurality of manifolds 306, with each manifold 306 fluidly coupled to a thermal fluid line 308, which may be a supply line or return line. In such a manner, the heat exchanger 300 may be configured to exchange heat from a thermal fluid through the plurality of tubes 304 to an airflow through the flowpath 302.

It will be appreciated that the number, size, and configuration of the tubes 304, manifolds 306, etc. are provided by way of example only and that in other exemplary embodiments, the heat exchanger 300 may have any other suitable configuration. Further, although the exemplary heat exchanger 300 depicted in FIG. 4 extends continuously in the circumferential direction C, it will be appreciated that in other exemplary embodiments, the heat exchanger 300 may be a plurality of discrete heat exchangers 300 arranged in the circumferential direction C. The plurality of discrete heat exchangers 300 may collectively extend substantially continuously in the circumferential direction C, with only relatively small gaps or spacing between the adjacent heat exchangers 300. With such a configuration, the plurality of discrete heat exchanger 300 may collectively extend along the circumferential direction C within the flowpath for at least about 180 degrees, such as at least 240 degrees, such as at least 300 degrees, such as at least 330 degrees, such as at least about 345 degrees of the annular or substantially annular passage, or continuously along the circumferential direction C within the flowpath (e.g., for 360 degrees of the annular passage). Notably, the ranges of porosity described herein and provided below account for any small gaps or spacing between adjacent heat exchangers 300, as well as for arrangements where the heat exchanger 300 otherwise does not extend completely through the flowpath in the circumferential direction C.

Moreover, although for the embodiment of FIG. 4 a single row of channels or tubes 304 are depicted extending in the circumferential direction C, it will be appreciated that the heat exchanger 300 may include multiple channels or tubes 304 arranged along the axial direction A at each layer of tubes 304, e.g., for each of the three layers depicted in FIG. 4. Moreover, although the channels or tubes 304 are depicted extending generally in the circumferential direction C in FIG. 4, in other embodiments, the tubes 304 may additionally or alternatively extend along the axial direction A, such that the heat exchanger 300 includes a number of tubes arranged along the circumferential direction C at each layer. The number of axially-extending channels at a particular layer of the heat exchanger 300 may be referred to as the channel density of heat exchanger 300.

As will also be appreciated, the flowpath 302 defines a flowpath flow area Af. The flowpath flow area Af generally refers to a cross-sectional area of the flowpath 302, and more specifically refers to the cross-sectional area of the flowpath 302, excluding the heat exchanger 300, at a location where the heat exchanger 300 is located. For a perfectly annular flowpath 302, the flowpath flow area Af may be defined by $(R2^2-R1^2) \times \pi$, wherein R2 is an outer radius of the flowpath 302 and R1 is an inner radius of the flowpath 302. In addition, the heat exchanger 300 defines a heat exchanger flow area Ah. The heat exchanger flow area Ah may refer to a minimum cross-sectional area of an open path through the heat exchanger 300. For the embodiment shown, the heat exchanger flow area Ah may be calculated as the flowpath flow area Af minus a cross-sectional area of each of the tubes 304 and manifolds 306 of the heat exchanger 300 depicted in FIG. 4. A ratio of the heat exchanger flow area Ah to the flowpath flow area Af may generally be referred to as a porosity of the heat exchanger 300.

It will be appreciated, however, that in other exemplary embodiments, the heat exchanger 300 may have any other suitable configuration. For example, referring now to FIG. 5, a schematic perspective view of a heat exchanger 300 in accordance with another exemplary embodiment of the present disclosure is provided. The heat exchanger 300 defines an axial direction A, a radial direction R, and a circumferential direction C. When installed within a gas turbine engine, the axial, radial, and circumferential direction A, R, C of the heat exchanger may align with the axial, radial, and circumferential direction A, R, C of the gas turbine engine. As will be appreciated from the embodiment of FIG. 5, in other exemplary embodiments the heat exchanger 300 may be a fin-based heat exchanger 300. Specifically, for the embodiment of FIG. 5, the heat exchanger 300 includes a plurality of plates 310, a first plurality of fins 312 extending between adjacent plates 310, and a second plurality of fins 314 also extending between adjacent plates 310 and opposite one of the plates 310 from the first plurality of fins 312. A first fluid flow may travel through the first plurality of fins 312, and a second fluid flow may travel through the second plurality of fins 314. Heat may travel from the first fluid flow, through the first plurality of fins 312, through a plate 310 positioned between the first and second pluralities of fins 312, 214, to the second plurality of fins 314 and to the second fluid flow (or alternatively may flow in reverse). As is depicted, there may be several layers of first and second pluralities of fins 312, 314 and plates 210.

Figure 5:
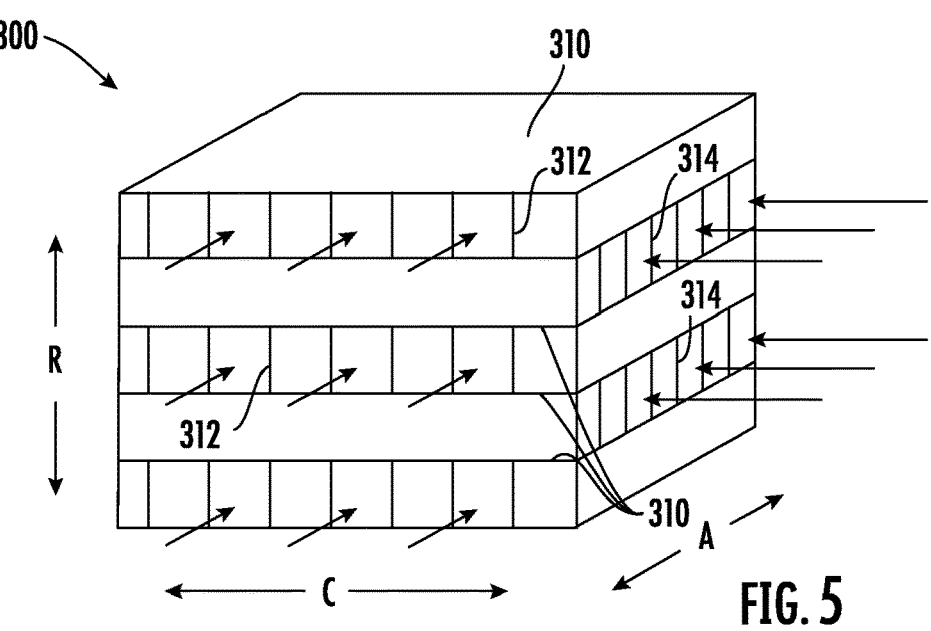
FIG. 5 is an exploded perspective view of a heat exchanger in accordance with another exemplary embodiment of the present disclosure.
Figure 6:
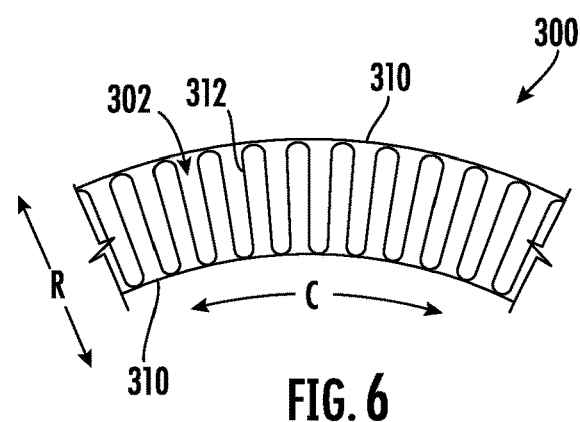
FIG. 6 is a schematic cross-sectional view of the exemplary heat exchanger of FIG. 5 in a flowpath in accordance with an exemplary embodiment of the present disclosure.

Referring now also briefly to FIG. 6, providing a schematic view of one layer the heat exchanger 300 of FIG. 5 positioned within the flowpath 302, as viewed along the centerline of the engine, it will be appreciated that heat exchanger 300 of FIG. 5 defines a relatively large heat exchanger flow area Ah (at least as compared to the exemplary heat exchanger 300 FIG. 4). The layer shown in FIG. 6 is the first plurality of fins 312. The heat exchanger 300 may further include a second plurality of fins 314 opposite plate 310 and, e.g., outside of the flowpath.

However, referring back to FIG. 5, it will also be appreciated that the fins of the first plurality of fins 312 may define a relatively long length in the flowpath direction, along the axial direction A for the embodiment shown. As the length of the fins 314 increases, an effectiveness E of the heat exchanger 300 may generally increase as well, as the increase in length provides greater surface area to facilitate heat exchange with the airflow through the flowpath 302.

The heat exchanger 300 of FIG. 5 may have an approximately constant cross-sectional area along its length (i.e., along the axial direction A for the embodiment depicted) or it may have two or more changes in this area over its length. When there are changes in its length, the heat exchanger has more than one heat transfer sections and associated acoustic lengths. This property of the heat exchanger offers opportunity in reducing noise attenuation for different flight conditions, as explained in greater detail, below.

It will be appreciated, however, that in still other exemplary embodiments, the heat exchanger 300 may have still other suitable configurations. For example, in other exemplary embodiments, the heat exchanger 300 may be one or more of a pin-fin heat exchanger, a tube-shell heat exchanger, a tube-sheet heat exchanger, or a counter-flow heat exchanger.

Figure 7:
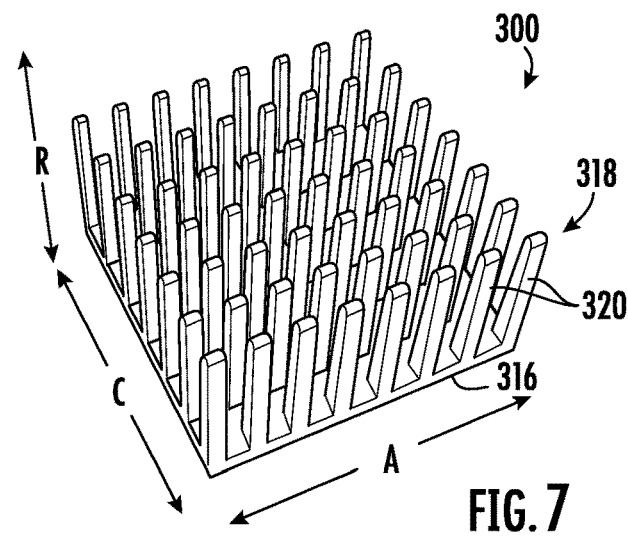
FIG. 7 is a schematic perspective view of a heat exchanger in accordance with yet another exemplary embodiment of the present disclosure.

More specifically, referring to FIG. 7, providing a perspective, partial view of a heat exchanger 300 in accordance with another exemplary embodiment of the present disclosure, in other exemplary embodiments the heat exchanger 300 may be a pin-fin heat exchanger 300. With such a configuration, the heat exchanger 300 includes a plate 316 and a plurality of fins 318 extending from the plate 316, the plurality of fins 318 are spaced along the circumferential direction C. However, for the exemplary heat exchanger 300 FIG. 7, the fins 318 are further separated into discrete "pins 320" spaced along the axial direction A. In such a manner, the fins 318 may create more turbulence in the airflow through the heat exchanger 300, increasing amount of heat exchange with the airflow through the heat exchanger 300.

Figures 8, 9, 10:
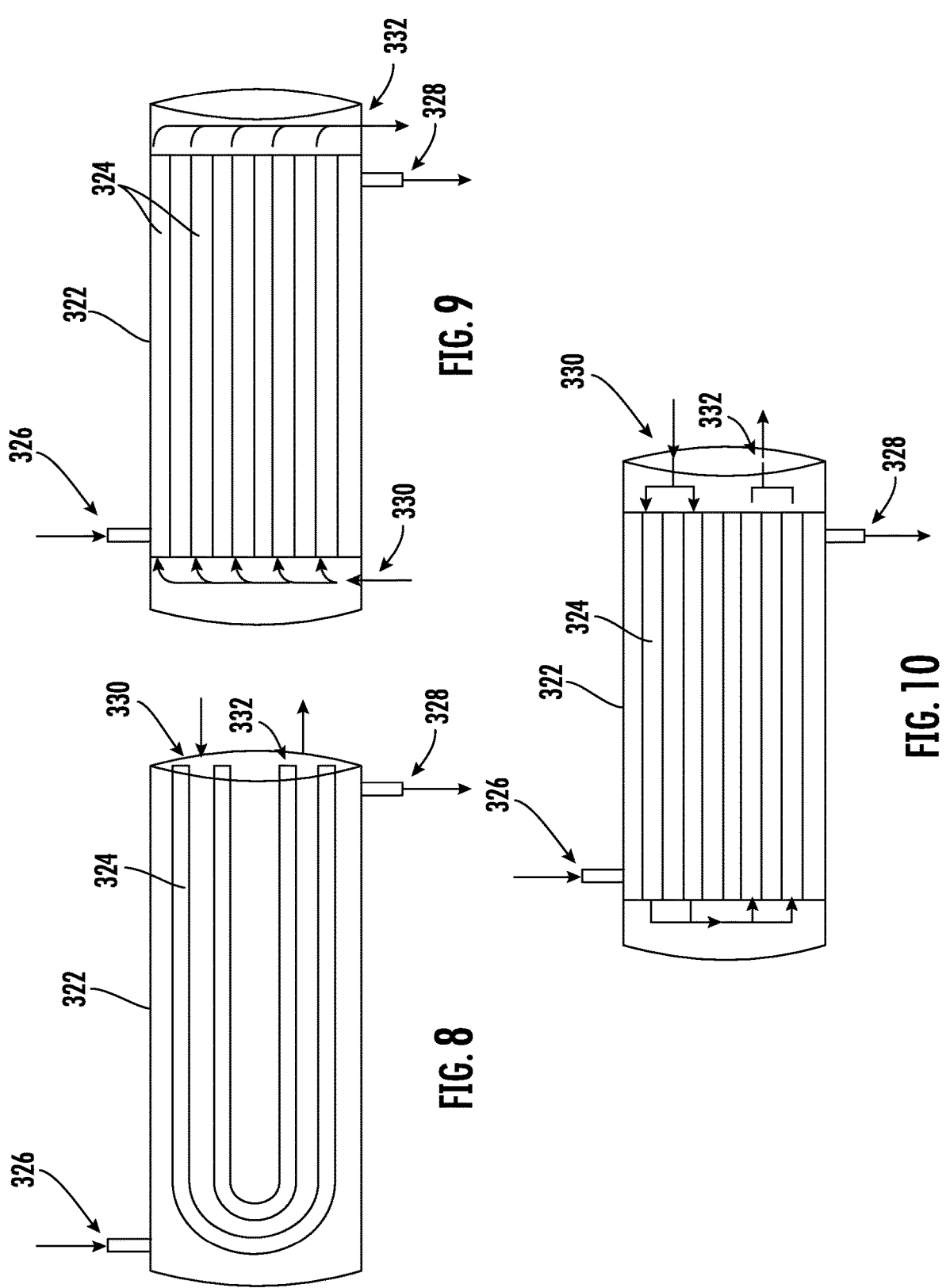
FIG. 8 is a schematic perspective view of a heat exchanger in accordance with yet another exemplary embodiment of the present disclosure.
FIG. 9 is a schematic perspective view of a heat exchanger in accordance with yet another exemplary embodiment of the present disclosure.
FIG. 10 is a schematic perspective view of a heat exchanger in accordance with yet another exemplary embodiment of the present disclosure.

Referring to FIGS. 8 through 10, schematic views of three separate heat exchangers are provided in accordance with various other exemplary embodiments of the present disclosure. More specifically, the heat exchangers 300 of FIGS. 8 through 10 are each configured as shell-and-tube heat exchangers. These heat exchangers 300 each include an outer shell 322 and one or more tubes 324 positioned within the outer shell 322. Further, the heat exchangers 300 each define a first fluid inlet 326 and a first fluid outlet 328 in flow communication with an interior of the outer shell 322, as well as a second fluid inlet 330 and a second fluid outlet 332 in flow communication with the one or more tubes 324. In FIG. 8, the heat exchanger 300 includes the one or more tubes 324 in a "U-tube" configuration. In FIG. 9, the heat exchanger 300 includes the one or more tubes 324 in a single pass configuration. In FIG. 10, the heat exchanger 300 includes the one or more tubes 324 in a double pass configuration.

Figure 11:
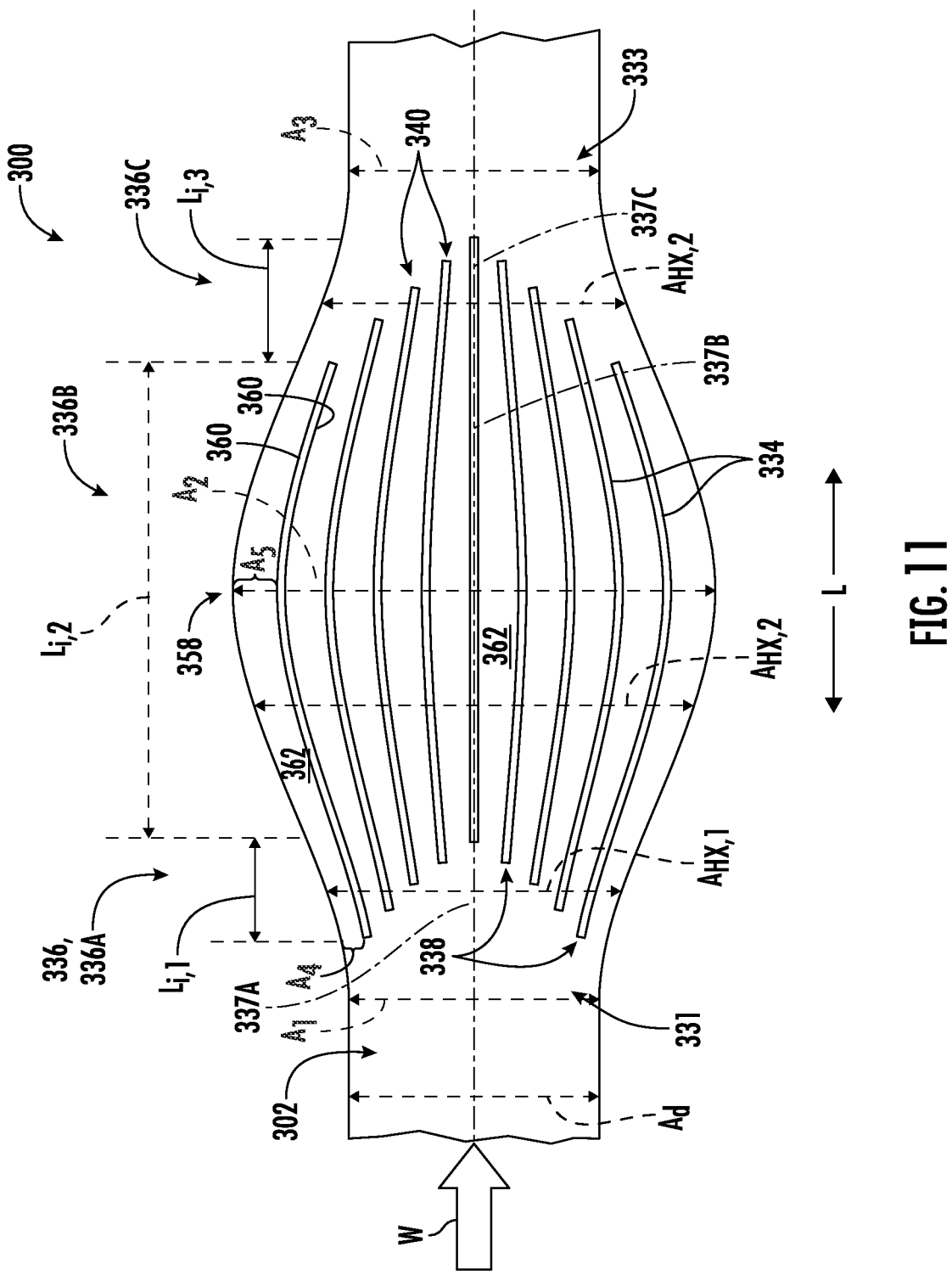
FIG. 11 is a schematic cross-sectional view of a heat exchanger in a flowpath in accordance with an exemplary embodiment of the present disclosure.

Referring now specifically to FIG. 11, a heat exchanger 300 in accordance with another exemplary embodiment of the present disclosure is provided. The view of FIG. 11 is a cross-sectional view of an "onion" heat exchanger 300 positioned in a flowpath 302. The heat exchanger 300 generally defines an inlet 330 at an upstream end and an outlet 333 at a downstream end. The heat exchanger 300 further includes a plurality of fins 334 extending generally lengthwise between the inlet 330 and the outlet 333.

Notably, the heat exchanger 300 of FIG. 11 differs from the heat exchangers 300 described hereinabove in that the heat exchanger 300 of FIG. 11 includes a plurality of discrete heat transfer sections 336 arranged in series. In particular, the heat exchanger 300 includes a first heat transfer section 336A, a second heat transfer section 336B, and a third heat transfer section 336C. As will be appreciated from the description herein, a heat transfer section refers to a portion of a heat exchanger having a unique heat transfer structural profile relative to an adjacent portion of the heat exchanger along a length of the heat exchanger, as well as a change in a cross-sectional area relative to the adjacent portion of the heat exchanger or an adjacent portion of a duct within which the heat exchanger is positioned.

The first heat transfer section 336A defines a first acoustic length $L_{i,1}$ in a lengthwise direction L of the heat exchanger 300 (and more specifically along a centerline 337A of the first heat transfer section 336A) and a first cross-sectional area, $A_{HX,1}$. The second heat transfer section 336B defines a second acoustic length $L_{i,2}$ in the lengthwise direction L of the heat exchanger 300 (and more specifically along a centerline 337B of the second heat transfer section 336B) and a second cross-sectional area, $A_{HX,2}$. The third heat transfer section 336C defines a third acoustic length $L_{i,3}$ in the lengthwise direction L of the heat exchanger 300 (and more specifically along a centerline 337C of the third heat transfer section 336C) and a third cross-sectional area, $A_{HX,3}$. The first cross-sectional area, $A_{HX,1}$ is an average (i.e., mean) cross-sectional area across the first acoustic length $L_{i,1}$. The second cross-sectional area, $A_{HX,2}$ is an average cross-section areal across the second acoustic length $L_{i,2}$. The third cross-sectional area, $A_{HX,3}$ is an average cross-section areal across the third acoustic length $L_{i,3}$. The first, second, and third cross-sectional areas at any given location may be calculated in the same manner as the heat exchanger flow area Ah described with reference to the embodiments above.

In the embodiment of FIG. 11, each of the fins 334 extend between an upstream end 338 and a downstream end 340. In the embodiment depicted, the upstream ends 338 of the fins 334 are staggered, such that the first heat transfer section 336A is characterized by a plurality of non-continuous fins 334 therethrough, in addition to an expanding cross-sectional area relative to a cross-sectional area of the flowpath 302 ("duct flow area", $A_d$) at a location immediately upstream of the inlet 330 to the heat exchanger 300.

The second heat transfer section 336B is characterized by continuous fins 334 therethrough, in addition to a diverging and converging cross-sectional area relative to the first cross-section area, $A_{HX,1}$.

Similar to the upstream ends 338, the downstream ends 340 of the fins 334 are also staggered, such that the third heat transfer section 336C is characterized by a plurality of non-continuous fins 334 therethrough, in addition to a converging cross-sectional area relative to the second cross-section area, $A_{HX,2}$ and a cross-sectional area of the flowpath 302 immediately downstream of the outlet 333 of the heat exchanger 300 (which is equal to the cross-sectional area of the flowpath 302 ($A_d$) at the location immediately upstream of the inlet 330 to the heat exchanger 300 for the embodiment depicted).

Figure 12:
FIG. 12 is a cross-sectional view of the heat exchanger of FIG. 12.

Referring briefly to FIG. 12, the heat exchanger 300 includes an inner peripheral wall 344 and an outer peripheral wall 346 along the radial direction R, and may be configured as one or more partially or wholly arcuate bodies, formed by partial or complete revolution about an axis exterior to the peripheral walls 344, 346, for example the axial centerline 12. A midline 348 represents an abstract surface that divides the flow-orthogonal area between the inner and outer peripheral walls 344, 346 into two parts, which may have approximately equal flow areas.

Figure 13:
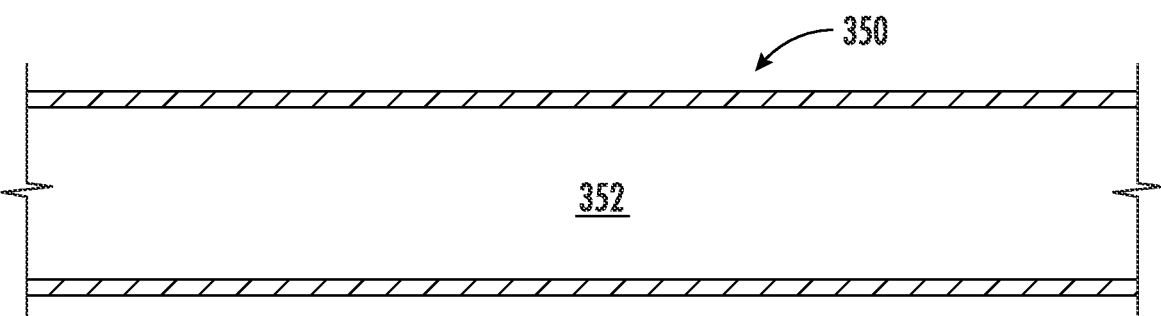
FIG. 13 is a partially sectioned view of a portion of a fin of the heat exchanger of FIG. 12.

Moreover, referring briefly also to FIG. 13, a heat transfer structure of the heat exchanger 300 may include one or more channels for conducting flow of a second fluid (e.g. oil, fuel or some other coolant). For example, FIG. 13 illustrates a small portion of a fin 334. The fin 334 incorporates a hollow inner passage 352 which can accommodate the flow of fluid. The inner passage 352 may be integral to the fin 334 or constructed as a separate component. It may take any of a number of shapes. FIG. 12 shows the fins 334 having the above-mentioned interior passages coupled to a circulating system which includes a reservoir 354, a pump 356, and appropriate interconnections such as pipes, manifolds, and/or valves (not labeled) to permit the circulation of the second fluid from the reservoir through the fins 334.

In operation, the first fluid flows through the flowpath 302 and over the fins 334. A second fluid circulates through the interior of the fins 334. For example, the second fluid may be supplied at a higher temperature than the first fluid. Depending upon the relative temperatures of the first and second fluids, heat is transferred either from the first fluid into the fins 334, then to the second fluid, or from the second fluid into the fins 334, then to the first fluid. As the first fluid flows from the inlet 331 to a belly 358 (FIG. 11; described below), it diffuses, reducing its velocity and increasing its static pressure. The fins 334 act as turning vanes, as well as diffuser walls, allowing the first fluid to diffuse without separating from the peripheral walls 344, 346. As the first fluid passes downstream, it is re-accelerated to an appropriate Mach number for the downstream flowpath. Analysis has shown that the heat exchanger 300 can achieve a pressure loss of less than 2% and a heat exchange rate equal to that of a prior art heat exchanger.

It will be appreciated that the inner passage 352 of each fin 334 may extend substantially along the length of the respective fin 334 in a fluid flow direction of the heat exchanger 300 (a fluid flow direction of the second fluid; e.g., the lengthwise direction L in FIGS. 11 through 13; as is indicated schematically with the hollow fins 334 in FIG. 11). For example, the inner passage 352 of each fin 334 may extend at least 70% of the length of the respective fin 334 in the fluid flow direction of the heat exchanger 300, such as at least 75%, such as at least 80%, such as at least 85%, such as at least 90%.

In addition, for the embodiment depicted, the fins 334 each extend continuously from their respective upstream ends 338 to their respective downstream ends 340. With such a configuration, the upstream ends 338 of one or more of the fins 334 may be positioned at a first location where flowpath begins to diverge (the flowpath 302 defining a constant height upstream of the first location) and the downstream ends 340 of one or more of the fins 334 may be positioned at a second location with the flowpath stops converging (the flowpath 302 defining a constant height downstream of the second location).

Referring back to FIG. 11, the heat exchanger 300 further defines a cross-sectional, flow area A1 at the inlet 331; a cross-sectional, flow area A2 at the belly 358; and a cross-sectional, flow area A3 at the outlet 333. The areas $A_1$, $A_2$, $A_3$ may be set to define a desired diffusion rate to suit a specific application. As one example, the flow area $A_2/A_1$ may be selected to achieve a desired Mach number at a belly 358 given a specific inlet Mach number. For example, the Mach number at the inlet 331 might be 0.5 (plus or minus 10%), and could be approximately for example 0.2 (plus or minus 10%) at the belly 358. The flow area $A_2$ may be greater than the flow area $A_1$. In one example, the flow area $A_2$ could be at least 30% greater than the flow area $A_1$. In another example, the flow area $A_2$ could be at least 50% greater than the flow area $A_1$. In yet another example, the flow area $A_2$ could be at least 100% greater than the flow area $A_1$, and up to 1000% greater.

In the illustrated example, the third flow area $A_3$ is less than the second flow area $A_2$, thus defining a nozzle or converging portion. The ratio of the flow areas $A_3/A_2$ and the rate of change between the two, that is, the profile shape of the peripheral walls 344, 346, may be selected to suit a specific application. For example, if the Mach number at the inlet 331 is 0.5, is for example 0.2 at the belly 358, the nozzle could be configured to re-accelerate the flow to Mach 0.5 (plus or minus 10%) at the outlet 333. As will be explained below relative to an alternative embodiment, the nozzle is desirable for certain applications, but is not required to achieve the functional benefit of the heat exchanger 300. Also, it is noted that a section of constant area (neither diffusing nor accelerating) may be positioned downstream of the belly 358).

Referring to the plurality of spaced-apart fins 334, each of the fins 334 has opposed side walls 360 extending between the upstream end 338 and the downstream end 340. The fins 334 subdivide the flowpath 302 into a plurality of generally parallel flow passages 362.

Each of the flow passages 362 has a flow area at its upstream end, designated "A4", and a flow area at the belly 358, designated "A5". The outermost passage is shown in the example in FIG. 11. The fins 334 are configured such that each flow passage 362 acts as a diffuser, or stated another way the flow area A5 is greater than the flow area A4. Analysis has shown that it is beneficial for reducing flow losses if the flow passages 362 are configured so as to have similar or equal diffusion ratios, or stated another way, for the ratio A5/A4 to be approximately equal for each flow passage 362. It is also beneficial for reducing flow losses if the flow passages 362 are configured so as to have similar or equal diffusion rates as defined above.

The fins 334 are shaped and sized so as to act as turning vanes, that is to turn the flow of the first fluid in an axial-radial plane (the plane depicted in FIG. 11) in a manner so as to prevent flow separation from the wall surfaces. The specific degree of flow turning will depend upon the shape of the mean line of the fins 334 and their angle of attack relative to the fluid flow.

Each of the fins 334 presents area blockage of the flow-path 302 equal to its frontal area. In order to mitigate the effect of the area blockage, the upstream ends 338 of the fins 334 may be arranged in a staggered configuration. In the illustrated example, the upstream ends 338 of the fins 334 adjacent the peripheral walls 344, 346 are positioned the most upstream or axially forward, with the upstream end 338 of each successive fin 334 proceeding towards the midline 348 being located downstream or axially aft from its outboard neighbor.

The staggered configuration may be arranged such that flow blockage of the fins 334 is introduced (considered from a flow point of view) at a rate similar to or less than the increase in flow area due to the divergence of the peripheral walls 344, 346.

For example, at the inlet 331, which is upstream of the upstream ends 338 of the outermost fins 334, the flow area is completely open (no fin blockage).

Downstream of the upstream ends 338 of the outermost fins 334, an increased flow area is defined between the peripheral walls 344, 346. At this downstream station, the flowpath 302 includes a blockage equivalent to the frontal area of the two most distal fins 334. The open flow area at this station is at least equal to the first flow area A1 plus the frontal area of the two most distal fins 334. A similar configuration is repeated at successive downstream locations to complete the staggered fin configuration. The illustrated stagger pattern is "V" shaped or chevron shaped, but other specific arrangements are possible.

The effect of the staggered fin location described above is that flow of the first fluid is always diffusing as it proceeds downstream from the inlet 331 to the belly 358.

In the illustrated example, the fins 334 are depicted as being arcuate, annular, or extending parallel to an axis. In essence, their shape variation is two-dimensional. It is physically possible to include fins which are oriented in a different direction than what is shown. For example, the fins could lie in an axial-radial plane. Alternatively, the fins could be oriented as shown but could additionally include stiffeners, supports, or dividers oriented in a different direction, such as an axial-radial plane. However, it will be understood that to achieve the maximum benefit of the concept described herein, the fins or other internal structure should be oriented generally parallel to the peripheral walls 344, 346 such that the diffuser effect can be maintained by manipulating the distance between the peripheral walls 344, 346 and the distance between the fins.

Optionally, structures such as waves, ripples, or ridges (not shown) along the exterior surfaces of the fins 334 could be included to create additional heat transfer surface area. If still more heat transfer surface area is required, secondary fins (not shown) running substantially perpendicular to the primary fin surfaces could be added to create passages with more heat transfer surface area.

The interior of at least one of the fins 334 includes a heat transfer structure. As used herein, the term "heat transfer structure" refers to a structure which functions to transfer heat energy from one area or region in contact with the heat transfer structure to another area or region which is also in contact with the heat transfer structure and which is spaced-away from the first area or region. Known heat transfer mechanisms include conduction, convection, and radiation. The heat transfer structure may use some or all of these heat transfer mechanisms.

In one example, the heat transfer structure may comprise a solid conduction element (not shown) disposed inside the fin 334 such as bars, rods, or plates having a high heat transfer coefficient. For example, a metal alloy such as copper or aluminum could be used for this purpose.

In another example, the heat transfer structure may comprise one or more heat pipes of a known type (not shown) disposed inside the fin 334.

It will be appreciated that in other exemplary embodiments, a heat exchanger may be provided having any suitable number of heat transfer sections defining respective acoustic lengths and cross-sectional areas. For example, the heat exchanger may define a single heat transfer section, two heat transfer sections (see, e.g., FIG. 20), three heat transfer sections, four heat transfer sections, five heat transfer sections (see, e.g., FIG. 21), etc.

In such a manner, it will be appreciated that the heat exchangers 300 of FIGS. 8 through 13 may be arranged in a parallel flow configuration where the second fluid flows in the same direction as the first fluid (see, e.g., FIG. 9), in a counter flow configuration where the second fluid flows in an opposite direction than the first fluid, or in a combination of parallel and counter-flow configurations (see, e.g., FIGS. 8 and 11).

As will also be appreciated, each of the heat exchangers 300 are configured to transfer heat from a heating fluid (e.g., the fluid rejecting heat) to a cooling fluid (e.g., the fluid accepting heat). By way of example, when the heat exchanger 300 is integrated into the engine 100 of FIG. 2, e.g., in the fan duct 172 as heat exchanger 200, the cooling fluid may be an airflow through the fan duct 172 and the heating fluid may be, e.g., compressor bleed air (an air-to-air heat exchanger), fuel (a fuel-to-air heat exchanger), or lubrication oil (an oil-to-air heat exchange).

As alluded to earlier, standard practice has been to optimize the heat exchanger for a flight idle (or other condition) then, after selecting an optimal heat exchanger, verifying whether it will operate in an acceptable manner across a flight envelop from a heat transfer perspective. Further, the inventors have found that it would also be beneficial to verify whether it will operate in an acceptable manner across a flight envelop from the perspective of noise produced when air flows through an annular duct. This can be a labor and time intensive process because the process is iterative and involves the selection of a heat exchanger designed for flight idle and embodying a heat effectiveness with acceptable pressure drop, then evaluating whether at other times in flight (non-flight idle) the annular duct location produces unacceptable levels of noise (or rather allows for an unacceptable level of noise to pass therethrough), thereby necessitating re-design of the heat exchanger to increase the acoustic transmission loss for air passing through the annular duct. That is, the heat exchanger is selected according to a size, type, etc. before a heat exchanger is found that satisfies all three key requirements: heat transfer, acceptable pressure drop, and acceptable noise generation across all flight conditions. It would be desirable to have a limited or narrowed range of embodiments defined for an engine architecture satisfying mission requirements, such requirements including heat transfer, pressure ratio, and noise transmission level requirements at the time a heat exchanger is selected and located within an engine.

The inventors discovered, unexpectedly during the course of engine design—i.e., designing heat exchangers and evaluating the impact that the heat exchangers would have on the acoustic environment at off-design points, which is the time-consuming iterative process just described-a relationship between an expected noise transmission loss for the heat exchanger and the heat transfer capabilities for a given level of pressure drop across the heat exchanger. The pressure drop is incorporated into the parameter UA, as it is a function of a porosity, which is a function of the area, A. Utilizing this relationship the inventors found that the number of suitable or feasible heat exchangers to be positioned in a substantially annular duct of an engine capable of meeting both the heat transfer requirements and acoustic requirements could be greatly diminished, thereby facilitating a more rapid down selection of designs to consider as an engine is being developed. Such benefit provides more insight to the requirements for a given engine well before specific technologies, integration and system requirements are developed fully. It avoids late-stage redesign. And it also provides heat exchanger design that integrates both acoustic and heat exchanger considerations for a gas turbine engine for an aircraft given its unique environments. The desired relationship is represented by an Effective Transmission Loss ("ETL"):

$$ETL = C_1 e^{-C_2\left(\frac{EOC-UA}{C_3}\right)}$$

Equation (1)

Where $C_1$, $C_2$, and $C_3$ are constants that depend on the mass flow rate through the annular duct. EOC accounts for factors influenced by engine sizing and operating conditions, explained in greater detail, below. Constants $C_1$, $C_2$, and $C_3$ and EOC each depend on the flight condition, and more specifically depend on a mass flow rate of an airflow through the annular duct occupied by the heat exchanger ("W"). The ETL represents a level of transmission loss (in units of decibels, dB) that can be expected from a heat exchanger for a given mass flow rate, W, and UA. A more detailed fluid model may also be desired at a later point to determine more exactly a transmission loss for a specific flight condition once the engine architecture is more fully defined. The mass flow rates of interest, for purposes of the ETL, are characterized as low, medium, and high mass flow rate conditions. The lowest mass flow rate may correspond to a low power operating condition of the engine (e.g., ground idle, flight idle), the medium mass flow rate may correspond to a medium power operating condition (e.g., cruise or descent), and the high mass flow rate may correspond to a high power operating condition (e.g., a takeoff operating condition or climb operating condition).

TABLE 1 provides values for $C_1$, $C_2$, and $C_3$ and EOC for three flight regimes, defined in terms of mass flow rates through the annular duct where the heat exchanger is located:

TABLE 1

|  | 0 < W < 50 lbm/s | 50 lbm/s < W < 150 lbm/s | 150 lbm/s < W < 300 lbm/s |
| --- | --- | --- | --- |
| $C_1$ | 19.22 | 19.64 | 21.02 |
| $C_2$ | 0.222 | 0.67 | 0.027 |
| $C_3$ | 956.3 | 298 | 107 |
| EOC | 41,467 to 19,965 | 52,809 to 16,677 | 50,347 to 12,587 |

$C_1$, $C_2$, and $C_3$ and EOC reflect the variation in the mass flow through the annular duct of the engine during a variety of operating conditions—generally the low power operating condition, the medium power operating condition, and the high power operating condition—as stated above. EOC additionally accounts for variability based on a specific engine operating condition within each of these flow regimes (low/med/high). EOC accounts for such factors as the specific engine type operating in the flow regime, expected variation in transient thrust, ambient conditions, tolerances and/or engine cycles or degradation, all of which may have some influence on the transmission loss for flow passing through a heat exchanger located in an annular duct. It will be realized, based on the teachings herein, ETL, for the ranges of EOC expressed, provides to a good approximation the available heat exchanger design options suited to meet mission requirements, both from a thermal management and acoustics perspective. More accurate knowledge on transmission loss may latter be gathered, if desired, by performing a full 3D CFD analysis of the acoustic field. This level of analysis may not be necessary, however, when the purpose is to assess the acoustic environment at an off-design point before proceeding with optimization of a heat exchanger. As alluded to above, ETL eliminates infeasible designs at an early stage, before the heat exchanger located in an annular duct is optimized. In one respect therefore ETL may be viewed as an alternative to performing a full-blown 3D CFD analysis of a flow field prior to heat exchanger optimization within an annular duct.

Moreover, it will be appreciated that transmission loss through a heat exchanger is further influenced by the length of the heat exchanger, the porosity of the heat exchanger, a pressure drop across the heat exchanger, the mass flow rate through the annular duct in which the heat exchanger is positioned, and the power spectral density (PSD) distribution of the air immediately upstream of the heat exchanger.

For example, in general as the length of the heat exchanger increases, the amount of acoustic transmission loss also increases. This factor influences the value for $C_2$. The length of the heat exchanger, sometimes also referred to as channel length, directly influences a volume (along with an area of the heat exchanger) for the fluid to pass through. With an increased volume, the amount of transmission loss generally also increases.

The pressure drop across the heat exchanger is incorporated into Equation 1 (ETL) through the UA parameter, as noted above. The ETL contemplates a maximum pressure drop of 15%, such as up to 10% and at least 1%. Generally, as the area of the heat exchanger increases (and as the porosity of the heat exchanger increases), a pressure drop will also increase. Typically, higher pressure drops are also associated with more heat transfer. However, a pressure drop above these levels may impact a thrust produced by the airflow through the duct too much to justify the thermal benefits.

More specifically, it was found that for low power operating conditions (e.g., for flow rates less than or equal to about 50 lbm/s), an ETL of between 1 and 5 dBs may be achieved with a relatively low pressure drop, such as a pressure drop of less than or equal to about 5%, such as less than or equal to about 2.5%. It was also found that for medium power operating conditions (e.g., for flow rates greater than or equal to about 50 lbm/s and less than or equal to about 150 lbm/s), an ETL of between 1 and 5 dBs may be achieved with a pressure drop within design limits, such as less than or equal to about 15% (and, e.g., greater than or equal to about 2%). It was further found that for high power operating conditions (e.g., for flow rates greater than or equal to about 150 lbm/s and less than or equal to about 300 lbm/s), an ETL of between 1 and 3 dBs can be achieved while maintaining the pressure drop less than about 15%. As described above, the pressure drop is a function of UA, as it is a function of the area of the heat exchanger. It was found that with the higher mass flow rates, the effect of heat exchanger area on pressure drop increases, resulting in more pressure drop for a given amount of ETL as compared to lower mass flow rate.

The PSD is determined from the upstream fan or turbine characteristics (e.g., the mid-fan 184 upstream of heat exchanger 200 in FIG. 2, or turbine 134 upstream of heat exchanger 140 in FIG. 2) and specifically, those upstream characteristics producing a PSD distribution over frequency bands where it has been found that a majority of the noise is typically produced during an engine mission segment, e.g., during takeoff. Noise characteristics associated with an upstream fan are expressed in terms of a blade passing frequency, which with respect to the upstream fan is defined as the rotations per second of an immediately upstream fan or turbine multiplied by a number of fan blades of the immediately upstream fan or rotor blades in an immediately upstream turbine stage, respectively. For example, referring to the embodiment shown in FIG. 2, the blade passing frequency for the noise source associated with the heat exchanger 200 located in the third stream annular duct, or rather the fan flow duct 172, would be found from the rotations per second of the fan 184 multiplied by the number of blades for the fan 184. In another example, referring still to the embodiment shown in FIG. 2, the blade passing frequency for the noise source associated with the heat exchanger 200 located in the aft frame would be found from the rotations per second of the low pressure turbine 134 multiplied by the number of turbine rotor blades associated with the aft-most stage of the lower pressure turbine 134.

Sound transmission through the heat exchanger is generally the byproduct of many complex interactions between sound waves and interior surfaces of the heat exchanger, which generally requires a detailed fluid modeling of air traveling through the heat exchanger to fully assess the sound transmission environment for a specific flight condition (e.g., takeoff or full power flight condition), as mentioned earlier. Moreover, the fan or rotor speed that produces the most noise may not necessarily occur when an engine is operating at full power. As such, noise environments are generally modeled for a variety of flight conditions, not merely at a full power condition. Nonetheless, the inventors discovered that there are indeed assumptions that can be made on the level of transmission loss that can be expected for a heat exchanger (optimized for flight idle conditions) during the other, non-flight idle periods of flight where the most noise is produced. As a result, feasible embodiments of a heat exchanger for given engine operating environments may be found, using the ETL, satisfying both thermal and acoustics requirements. These embodiments of a heat exchanger take into account the competing interests associated with transmission loss needs, maximum acceptable pressure drop and heat transfer efficiency. With embodiments defined in this manner, a substantial amount of heat exchanger re-design may be avoided, as alluded to earlier. For example, a heat exchanger located in an annular duct is optimized for engine performance during flight idle conditions. When the engine is later evaluated for its acoustic performance, e.g., using a 3D CFD analysis, it is discovered that the configuration does not produce an adequate amount of transmission loss when air passes through the annular duct. Such a heat exchanger would then need to be re-designed because there is too much noise generated ETL was found by evaluating the effects on transmission loss and overall heat exchanger effectiveness for different levels of pressure drop, the geometry of the heat exchanger and its relation to transmission loss. Based on these relationships it was discovered that the ETL for a heat exchanger can predict to a good approximation the transmission loss expected for a given mass flow rate through the heat exchanger, as a function of UA and the general properties of the heat exchanger, as set forth in TABLE 2, which define the operating environments and heat exchanger properties used to find the ETL. Thus, with a heat exchanger located in an annular duct and defined within these ranges, the ETL can predict the transmission loss from the heat exchanger for a prescribed mass flow rate and UA.

TABLE 2

| Symbol | Description | Ranges appropriate for using Eq. (1) |
|---|---|---|
| UA | Product of the overall heat transfer coefficient (U; in "Btu/( hr × ft² × ° F.)") for the heat exchanger and interior surface area (A; in "ft²") of the heat exchanger in units: Btu/(hr-° F.). | 7500 < UA < 45000, such as 10000 < UA < 35000 (low power); 14000 < UA < 45000 (medium power); and 15000 < UA < 44000 (high power). |
| Delta-P/P | Ratio of change in pressure to total pressure (%) representing maximum allowable pressure drop across heat exchanger | <15%, such as <10%, such as <8%, such as >1% |
| L | Length of heat exchanger (in) | 3 inches to 15 inches, such as 4 inches to 9 inches |
| Po | Porosity | 20% to 80%, such as 30% to 55% |
| F | Fan passing frequency (RPM/60 * number of blades) | 1 kHz to 5 kHz |
| W | Mass flow rate | See TABLE 1. |

It will be appreciated from, e.g., Equation (1) and the units provided for the parameters in TABLE 2, the units for $C_1$, $C_2$, and $C_3$ and EOC are such that ETL is provided in dB's (as noted above and discussed throughout). For example, the units for $C_1$ may be dB's, $C_2$ may be unitless, and $C_3$ and EOC may each be in the same units as UA (i.e., Btu/(hr–° F.)).

Figures 14, 15:
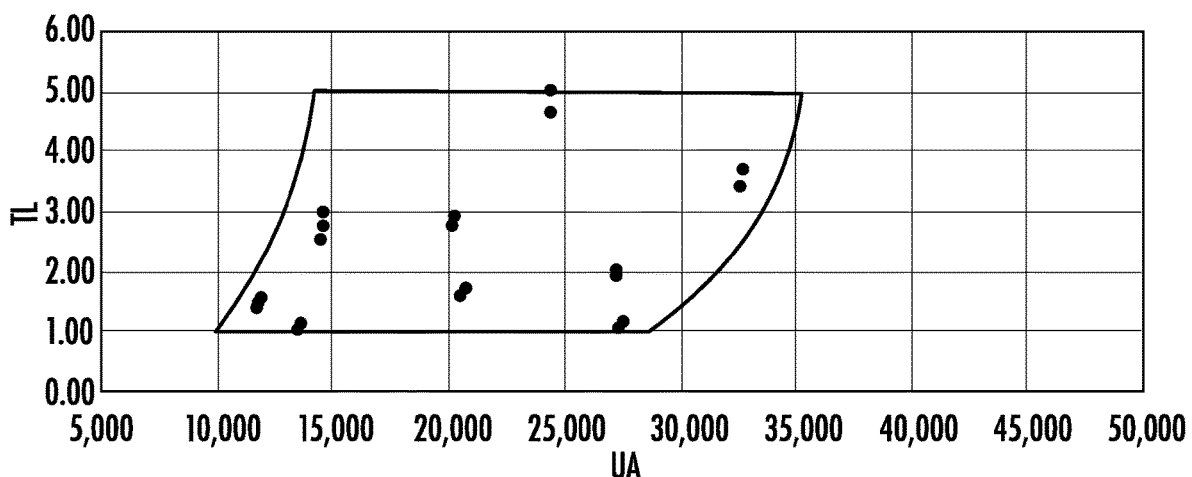
FIG. 14 is a plot of heat exchangers in accordance with one or more exemplary embodiments of the present disclosure, showing the relationships between the ETL and UA for a low mass flow rate.
FIG. 15 provides a table including numerical values corresponding to several of the plotted ETL values in FIG. 14.
Figures 16, 17:
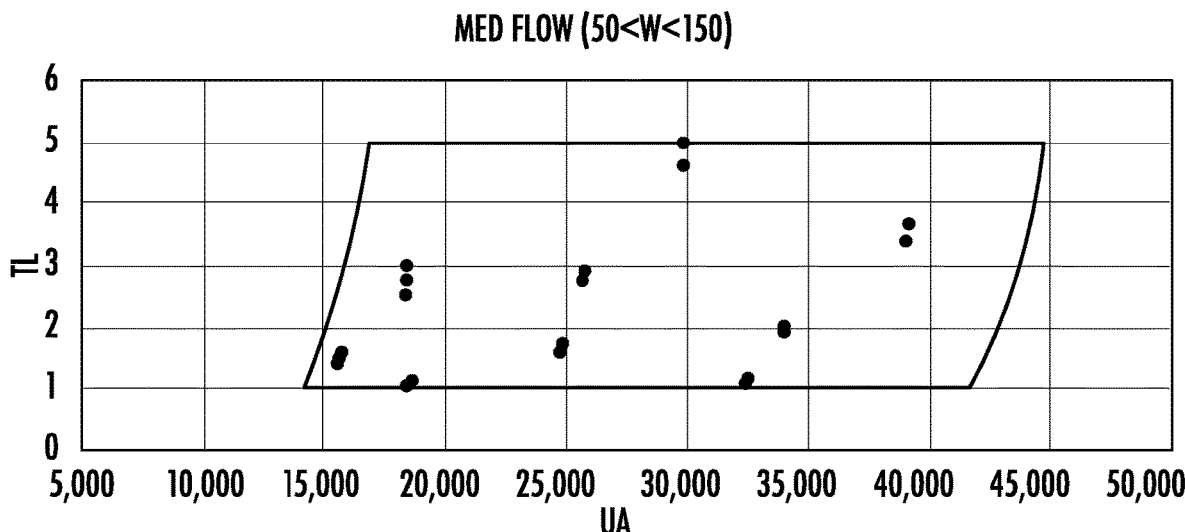
FIG. 16 is a plot of heat exchangers in accordance with one or more exemplary embodiments of the present disclosure, showing the relationships between the ETL and UA for a medium mass flow rate.
FIG. 17 provides a table including numerical values corresponding to several of the plotted ETL values in FIG. 16.
Figures 18, 19:
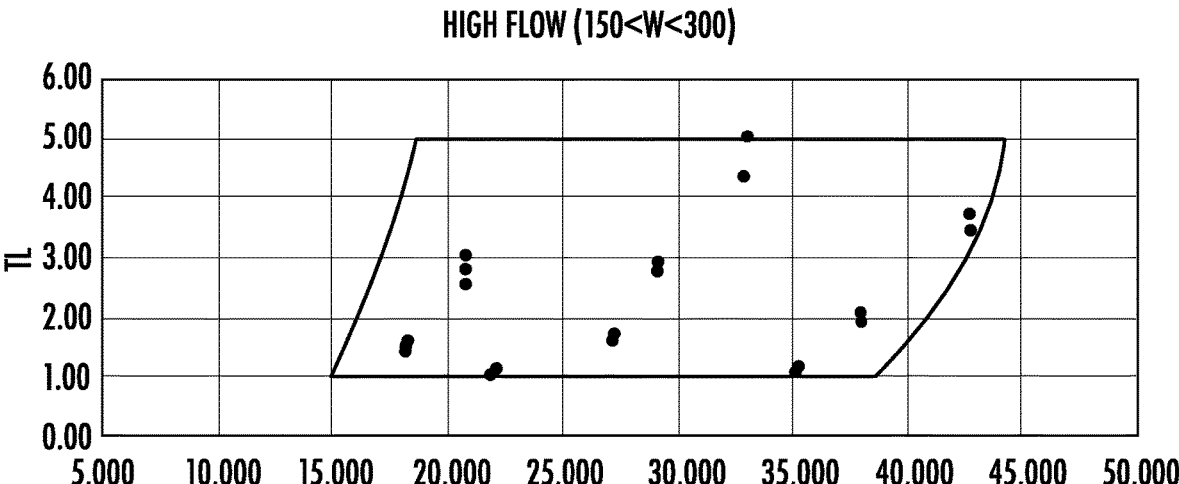
FIG. 18 is a plot of heat exchangers in accordance with one or more exemplary embodiments of the present disclosure, showing the relationships between the ETL and UA for a high mass flow rate.
FIG. 19 provides a table including numerical values corresponding to several of the plotted ETL values in FIG. 15.

FIGS. 14 through 19 illustrate heat exchangers in accordance with one or more exemplary embodiments of the present disclosure, showing the relationships between the ETL and UA. In particular, FIG. 14 is a plot of heat exchangers in accordance with one or more exemplary embodiments of the present disclosure, showing the relationships between the ETL and UA for a low mass flow rate and FIG. 15 provides a table including numerical values corresponding to several of the plotted ETL values in FIG. 14. FIG. 16 is a plot of heat exchangers in accordance with one or more exemplary embodiments of the present disclosure, showing the relationships between the ETL and UA for a medium mass flow rate and FIG. 17 provides a table including numerical values corresponding to several of the plotted ETL values in FIG. 16. And FIG. 18 is a plot of heat exchangers in accordance with one or more exemplary embodiments of the present disclosure, showing the relationships between the ETL and UA for a high mass flow rate and FIG. 19 provides a table including numerical values corresponding to several of the plotted ETL values in FIG. 18. In each of FIGS. 14, 16, and 18, the solid lines enveloping the embodiments express the ranges for TL and UA, as provided by the range of variable EOC. The TL range is 5 decibels down to 1 decibel. The UA range varies between the low, medium, and high mass flow rates, but is generally between 7,500 and 45,000 Btu/(hr–° F.). The embodiments within this range include embodiments of heat exchangers having lengths (measured in flow direction, which according to the embodiments corresponds to a cold-flow length property of the heat exchanger) between 3 inches and 9 inches, and heat exchanger porosity between 23% and 51%.

The present disclosure is not limited to heat exchangers within the ranges in the embodiment depicted in FIGS. 14 through 9. For example, in other embodiments, a heat exchanger of the present disclosure may be, e.g., up to 15 inches in length, and may define a porosity up to 80%.

This disclosure is directed to heat exchangers in annular ducts where an upstream fan, compressor or turbine generates gas flow through a duct leading to the heat exchanger.

For noise attenuation targeted operating conditions, i.e., flight segment where an undesired level of noise is generated, one may make modifications to one or more of the heat exchanger's "acoustic length" (as defined herein) to increase the ETL for that flight segment, that is, to specifically target noise attenuation for a specific flight segment. It was found, in connection with ETL, that this type of targeted noise attenuation may be achieved by selecting an acoustic length for a blade passing frequency associated with the flight segment. While this can result in less heat transfer efficiency due to the adjusted acoustic length, it was discovered unexpectedly that the impact was not significant. Utilizing the ETL in combination with this "tuning" of an acoustic length to a flight segment resulted in higher levels of attenuation for the targeted flight segment.

Utilizing this relationship the inventors found that an engine may be designed to utilize a heat exchanger in a substantially annular duct of the engine to achieve a desired noise level during a particular flight operation that may not otherwise be achievable absent other non-desirable structural or control changes to the engine, and while satisfying the heat transfer efficiencies needed from the heat exchanger. In addition, inventors found that utilizing this relationship, the number of suitable or feasible heat exchangers to be positioned in a substantially annular duct of an engine capable of meeting both the heat transfer requirements and acoustic requirements could be greatly diminished, thereby facilitating a more rapid down selection of designs to consider as an engine is being developed. Such a development may therefore avoid late-stage redesign. And it also provides heat exchanger design that integrates both acoustic and heat exchanger considerations for a gas turbine engine for an aircraft given its unique environments. The relationship between an acoustic length $L_i$ and the a given operating condition of the engine is represented by an Operational Acoustic Reduction Ratio (OARR), as follows:

$$\left(\sin\left(\frac{2 \times \pi \times f}{a} \times L_i\right)\right)^2$$

where f is the blade passing frequency at the operating condition in hertz, a is the speed of sound of the airflow through the heat transfer section of the heat exchanger in inches per second, and $L_i$ is the acoustic length of the heat transfer section of the heat exchanger in inches. The highest level of ETL for the targeted flight operating condition occurs when OARR is equal to 1. For a heat exchanger that has more than one heat transfer section and associated acoustic length, it was found that the influence on noise attenuation by the heat exchanger's other heat transfer sections having their own acoustic lengths (e.g., in the case of an onion heat exchanger) was minimal. As a consequence, it was concluded that the influence on downstream noise by the other heat transfer sections could be ignored.

For example, at the high power operating condition, the blade passing frequency f may be greater than or equal to 600 hertz and less than or equal to 12,500 hertz. Notably, the blade passing frequency may refer to a blade passing frequency of the primary fan of the engine (e.g., fan 152 in FIG. 2). Noise generated by a plurality of blades operating above this speed range may not be audible by humans and thus is of less concern. The speed of sound, a, at the various operating conditions and at various locations within the engine is provided in Table 3, below. Notably, in practice, the actual speed of sound may vary from the values listed in Table 3. However, the values listed in Table 3 for the respective operating conditions and respective locations represent expected conditions for the disclosed subject matter in which the engines and heat exchangers may operate. For the purposes of determining OARR for a heat exchanger that can achieve the benefits described herein, the speed of sound, a, may be considered a constant having the values listed in Table 3.

TABLE 3

|  | High Power Operating Condition | Low Power Operating Condition | Medium Power Operating Condition |
|---|---|---|---|
| $a_{Amb}$ | 13,200 inches per second (hereinafter, $a_{1,Amb}$) | 12,900 inches per second (hereinafter, $a_{2,Amb}$) | 11,640 inches per second (hereinafter, $a_{3,Amb}$) |
| $a_{Hot}$ | 25,360 inches per second (hereinafter, $a_{1,Hot}$) | 24,756 inches per second (hereinafter, $a_{2,Hot}$) | 30,924 inches per second (hereinafter, $a_{3,Hot}$) |
| $a_{Cold}$ | 24,528 inches per second (hereinafter, $a_{1,Cold}$) | 19,824 inches per second (hereinafter, $a_{2,Cold}$) | 22,440 inches per second (hereinafter, $a_{3,Cold}$) |

As will be appreciated, the speed of sound of the airflow through the heat transfer section of the heat exchanger is dependent at least in part on a location in which the heat exchanger is positioned within the engine. For example, the heat exchanger may be positioned at an ambient location, within a cold location of the engine, or within a hot location of the engine. The ambient location, having a speed of sound represented by "$a_{Amb}$" in Table 3 (and more specifically by $a_{1,Amb}$, $a_{2,Amb}$, $a_{3,Amb}$ for the high power, low power, and medium power operating conditions) refers to an engine location for a heat exchanger where the heat exchanger is exposed to ambient airflow or bypass airflow (e.g., bypass passage 48 in FIG. 1, or an airflow over fan cowl 170 in FIG. 2). The hot location, having a speed of sound represented by "$a_{Hot}$" in Table 3 (and more specifically by $a_{1,Hot}$, $a_{2,Hot}$, $a_{3,Hot}$ for the high power, low power, and medium power operating conditions) refers to an engine location for a heat exchanger where the heat exchanger is exposed to an airflow through a working gas flowpath of the engine at a location downstream of a combustion section of the engine (e.g., within an exhaust section of the engine, such as exhaust section 32 in FIG. 1). The cold location, having a speed of sound represented by "$a_{cold}$" in Table 3 (and more specifically by $a_{1,Cold}$, $a_{2,Cold}$, $a_{3,Cold}$ for the high power, low power, and medium power operating conditions) refers to an engine location for a heat exchanger where the heat exchanger is exposed to an airflow inward of a bypass passage of the engine and upstream of a combustion section of the engine (e.g., within a compressor section of the engine, or within a third stream (such as fan duct 172 of FIG. 2) of an engine).

The speed of sound of the airflow through the heat transfer section of the heat exchanger is further dependent at least in part on the operating temperature of the engine and the altitude of the engine. The variations in Table 3 in the different operating conditions, i.e., the high power, low power, and medium power operating conditions, accounts for these variables.

For example, referring back to FIG. 11, the first heat transfer section may be tuned to attenuate noise through the annular duct during the high power operating condition. As such, OARR may be greater than or equal to 0.75 during the high power operating condition. In particular, OARR may be greater than or equal to 0.85, such as greater than or equal to 0.9, such as greater than or equal to 0.95.

Notably, OARR may vary between 0 and 1. When the heat transfer section is perfectly tuned to attenuate noise at the operating condition, OARR is equal to 1. And when the heat transfer section is perfectly de-tuned from attenuating noise at the operating condition, OARR approaches 0. Accordingly, it will be appreciated that length $L_i$ of the heat transfer section may be chosen such that OARR may be maximized over the expected range of blade passing frequencies for the high power operating condition.

By contrast, however, it will be appreciated that the length $L_i$ of the first heat transfer section would be de-tuned for the other operating conditions, such as during a second operating condition. For example, the engine may be operable at a low power operating condition, wherein the blade passing frequency is greater than or equal to 300 hertz and less than or equal to 6,300 hertz. OARR for the heat transfer section having the length $L_i$ may be less than or equal to 0.25 when the engine is operated at the low power operating condition.

In such a manner, it will be appreciated that the heat transfer section of the heat exchanger may be tuned for noise attenuation at the first operating condition (e.g., high power operating condition) and de-tuned from attenuating noise at the second operating condition (e.g., low power operating condition). Such may allow the engine to target noise attenuation, e.g., at a takeoff operating condition to reduce community noise. In particular, with such a configuration the heat exchanger may be capable of achieving a desired ETL at the first operating condition.

An example of a heat exchanger having only one heat transfer section or acoustic length, for purposes of ETL and OARR, would be the heat exchanger of FIG. 5 where the acoustic length is the length of the heat exchanger in the flow direction, and the cross-sectional area change (relative to the upstream duct) is the cross sectional area that is approximately unchanged from inlet to outlet of the heat exchanger.

Notably, at least certain heat exchangers include multiple heat transfer sections (see, e.g., FIG. 11), with the different heat transfer sections tuned to different operating conditions. With such a configuration, the heat transfer section discussed above may be a first heat transfer section and the acoustic length $L_i$ discussed above may be a first acoustic length ($L_{i,1}$). The heat exchanger may further include a second heat transfer section defining a second acoustic length ($L_{i,2}$). The second heat transfer section may define an OARR greater than or equal to 0.75 during a second operating condition, different than the first operating condition, as follows:

$$\left(\sin\left(\frac{2 \times \pi \times f_2}{a_2} \times L_{i,2}\right)\right)^2$$

where $f_2$ is the blade passing frequency at the second operating condition, $L_{i,2}$ is the second acoustic length, as noted above, and $a_2$ is the speed of sound at the second operating condition. The second operating condition may be a low power operating condition, wherein the blade passing frequency is greater than or equal to 300 hertz and less than or equal to 6,300 hertz.

The OARR for the second heat transfer section during the second operating condition may be greater than or equal to 0.85, such as greater than or equal to 0.9, such as greater than or equal to 0.95.

With such a configuration, the heat exchanger may be capable of achieving a higher desired ETL for both the first operating condition and the second operating condition.

Notably, in still other exemplary embodiments, the heat exchanger may include a third heat transfer section tuned to a third operating condition. The third heat transfer section may define an OARR greater than or equal to 0.75 during the third operating condition, different than the first and second operating conditions, as follows:

$$\left(\sin\left(\frac{2 \times \pi \times f_3}{a_3} \times L_{i,3}\right)\right)^2$$

where $f_3$ is the blade passing frequency at the third operating condition, $L_{i,3}$ is the third acoustic length, as noted above, and $a_3$ is the speed of sound at the third operating condition. The third operating condition may be a medium power operating condition, wherein the blade passing frequency is greater than the blade passing frequency at the second operating condition and less than the blade passing frequency at the first operating condition, such as greater than or equal to 500 hertz and less than or equal to 12,500 hertz.

With such a configuration, the heat exchanger may be capable of achieving a desired ETL at the first, second, and third operating conditions.

As will be appreciated from the description herein, embodiments of a gas turbine engine, such as an unducted, single rotor gas turbine engine, are provided. Some embodiments of engines that include a heat exchanger located in an annular duct and considered within the scope of this disclosure, may further include one or more of the following characteristics. A threshold power or disk loading for the fan (e.g., fan 154) may range from 25 horsepower per square foot (hp/ft²) or greater at cruise altitude during a cruise operating mode. In particular embodiments of the engine, structures and methods provided herein generate power loading between 80 hp/ft² and 160 hp/ft² or higher at cruise altitude during a cruise operating mode, depending on whether the engine is an open rotor or ducted engine. In various embodiments, the engine is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

Further, in certain exemplary embodiments, the fan assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet. Additionally, with respect to the embodiment of FIG. 2, a ratio R1/R2 may be between about 1 and 6, or 2 and 4, or about 1.5 to 3 where R1 is the span from root to tip for fan blade 154 and R2 is the span from root to tip for fan 184 in FIG. 2.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps).

Still further, certain embodiments of the engine provided herein may allow for normal subsonic aircraft cruise altitude operation at or above Mach 0.5, or above Mach 0.75, based on structures provided herein. In certain embodiments, the engine allows for normal aircraft operation between Mach 0.55 and Mach 0.85, or between Mach 0.75 to Mach 0.85 at cruise altitude. In certain embodiments, the engine allows for rotor blade tip speeds at or less than 750 feet per second (fps). Still particular embodiments may provide such benefits with reduced interaction noise between the blade assembly and the vane assembly and/or decreased overall noise generated by the engine by virtue of structures located in an annular duct of the engine. Additionally, it should be appreciated that ranges of power loading and/or rotor blade tip speed may correspond to certain structures, core sizes, thrust outputs, etc., or other structures at the core engine and the fan assembly. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Moreover, it will be appreciated that the exemplary heat exchangers described above are provided by way of example only. In other exemplary embodiments, a heat exchanger of the present disclosure may have other suitable configurations.

Figure 20:
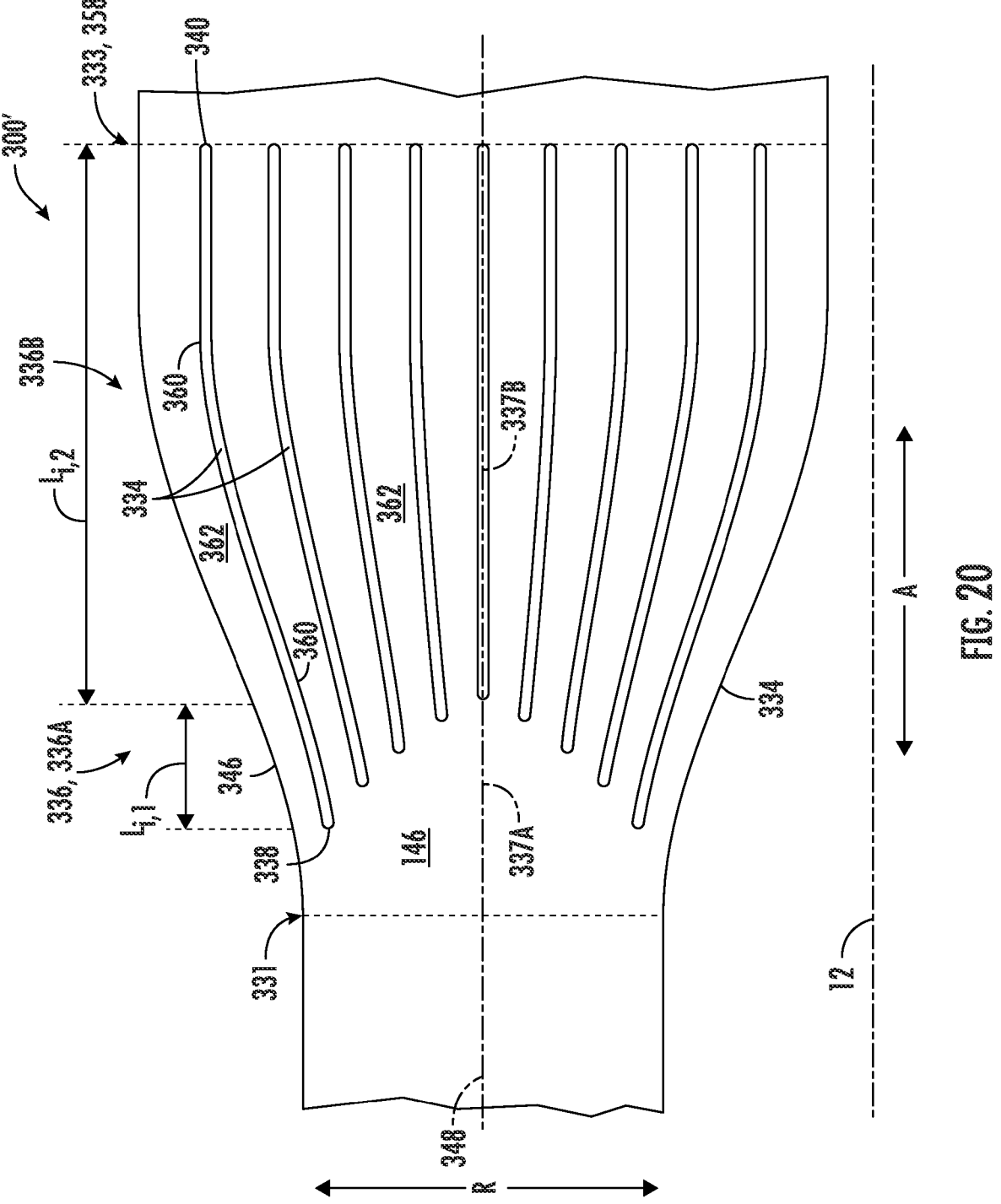
FIG. 20 is a schematic cross-sectional view of a heat exchanger in accordance with another exemplary embodiment of the present disclosure.

FIG. 20 illustrates an alternative heat exchanger 300', similar to the heat exchanger 300 described above with reference to FIG. 11. Elements of the heat exchanger 300' not specifically described may be taken to be identical to those of one or more of the heat exchangers 300, 300' described above. The heat exchanger 300" includes a pair of spaced-apart inner and outer peripheral walls 344 and 346, respectively, which between them define a flowpath 302 for a first fluid. The flowpath 302 has an inlet 331 at an upstream end, and an outlet 333 at a downstream end. A midline 348 represents an abstract surface that divides the flow-orthogonal area between the inner and outer peripheral walls 344 and 346 into two parts, which may have approximately equal flow areas. In the illustrated example, the heat exchanger 300" is a partially or wholly arcuate body formed by partial or complete revolution about an axis, for example the axial centerline 12.

The flowpath 302 includes a diverging portion downstream of the inlet 331. Within the diverging portion, the peripheral walls 344, 346 diverge so that they are laterally farther from the midline 348 then they are at the inlet 331. A location downstream of the inlet 331 where the peripheral walls reach their maximum dimension is referred to herein as a "belly" 358. In this embodiment, the belly 358 is coincident with the outlet 333.

A plurality of spaced-apart fins 334 are disposed in the flowpath 302. Each of the fins 334 has opposed side walls 360 extending between an upstream end 338 and a downstream end 340. The fins 334 subdivide the flowpath 302 into a plurality of generally parallel flow passages 362.

The aerodynamic features of the heat exchanger 300', such as the equal diffusion ratios and/or rates of the flow passages 362, shaping of the fins 334 to act as turning vanes, and staggering of the fins 334, may be implemented as described for the heat exchanger 300 described above with reference to FIG. 11. The operation and functional advantages of the heat exchanger 300' are substantially the same as for the heat exchanger 300, with the exception that flow is not re-accelerated prior to the outlet 333.

Figure 21:
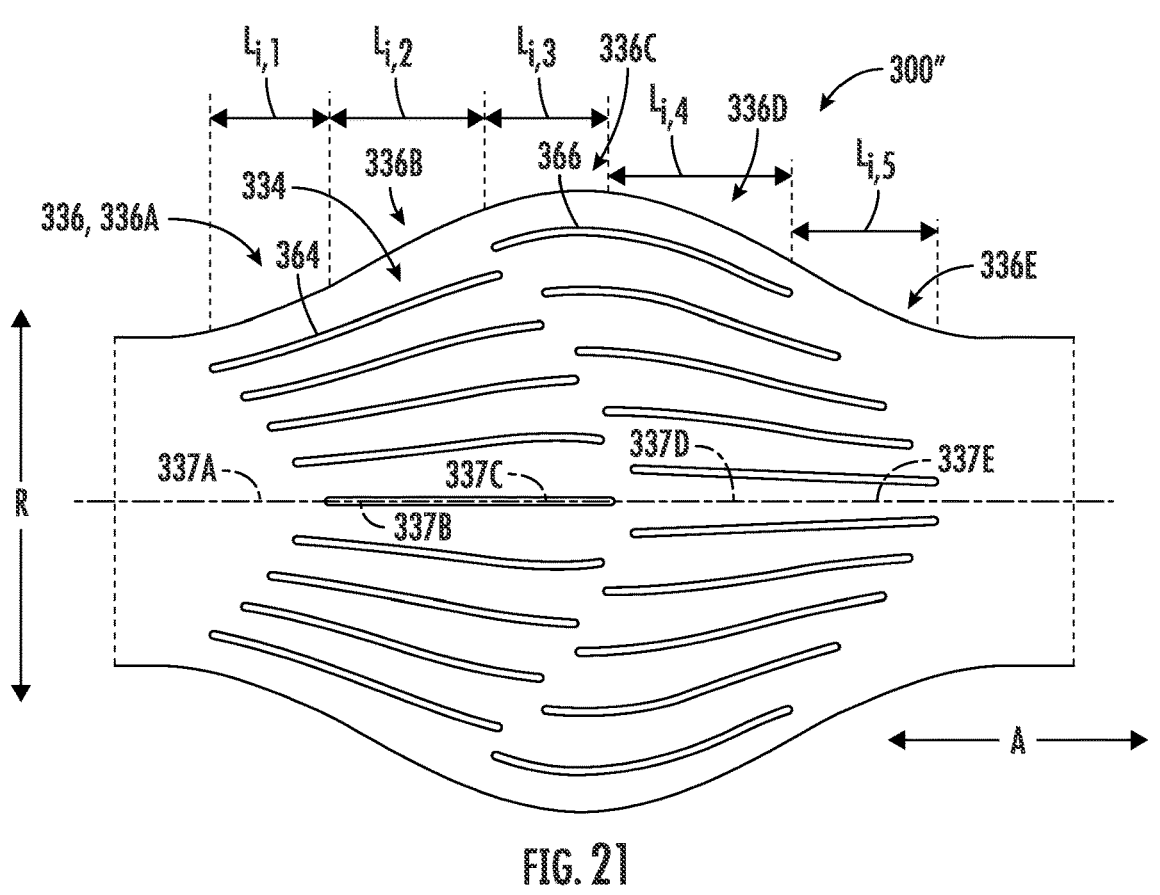
FIG. 21 is a schematic cross-sectional view of a heat exchanger in accordance with yet another exemplary embodiment of the present disclosure.

Further, it will be appreciated that other fin configurations are possible. For example, FIG. 21 illustrates a heat exchanger 300" having fins 334 which are split, each fin 334 having an upstream portion 364 and a separate downstream portion 366.

Figure 22:
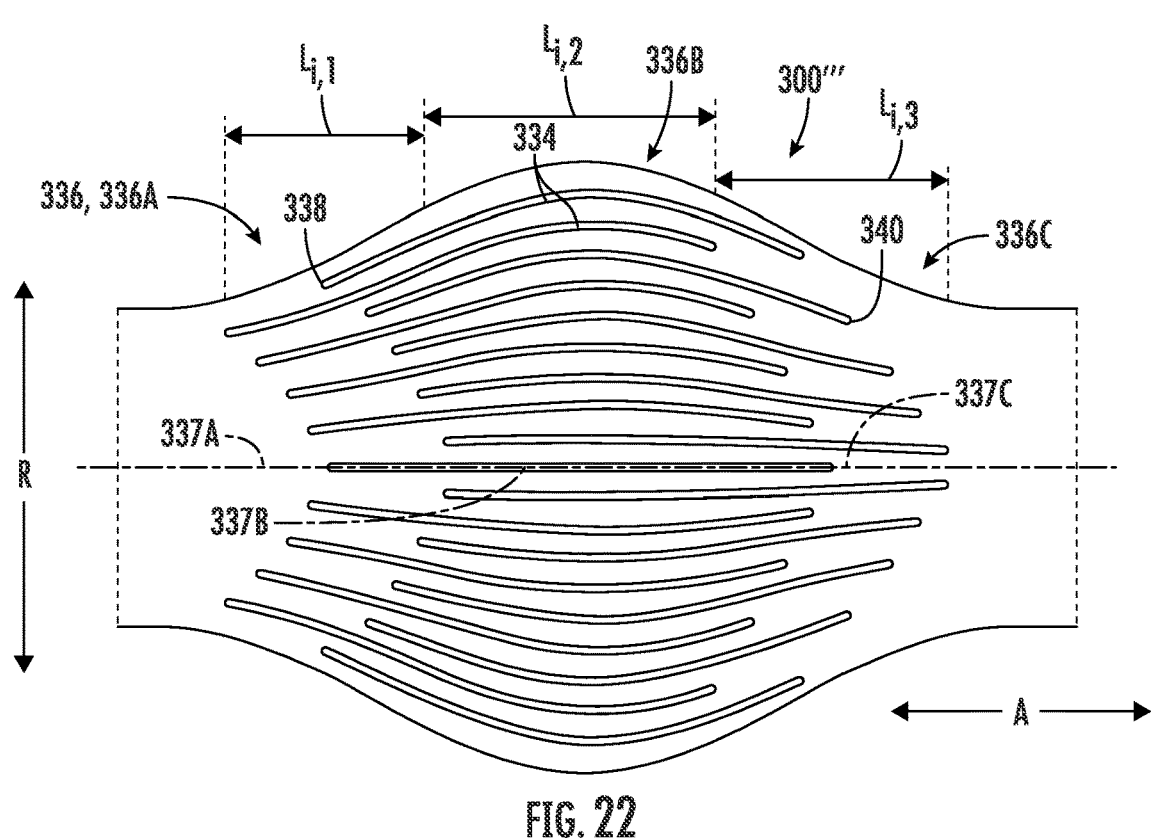
FIG. 22 is a schematic cross-sectional view of a heat exchanger in accordance with still another exemplary embodiment of the present disclosure.

As another example, FIG. 22 illustrates a heat exchanger 300''' having fins 334 which are overlapped in an axial direction A. The term "overlapped in the axial direction A" in this context refers to a configuration in which alternate fins 334 are offset axially from each other in opposite directions, such that the middle portions of adjacent fins 334 are coextensive in the axial direction A, and each fin 334 includes a forward portion extending axially forward of an upstream end 338 of the adjacent fin 334, or an aft portion extending axially aft of a downstream end 340 of the adjacent fin 334.

Figure 23:
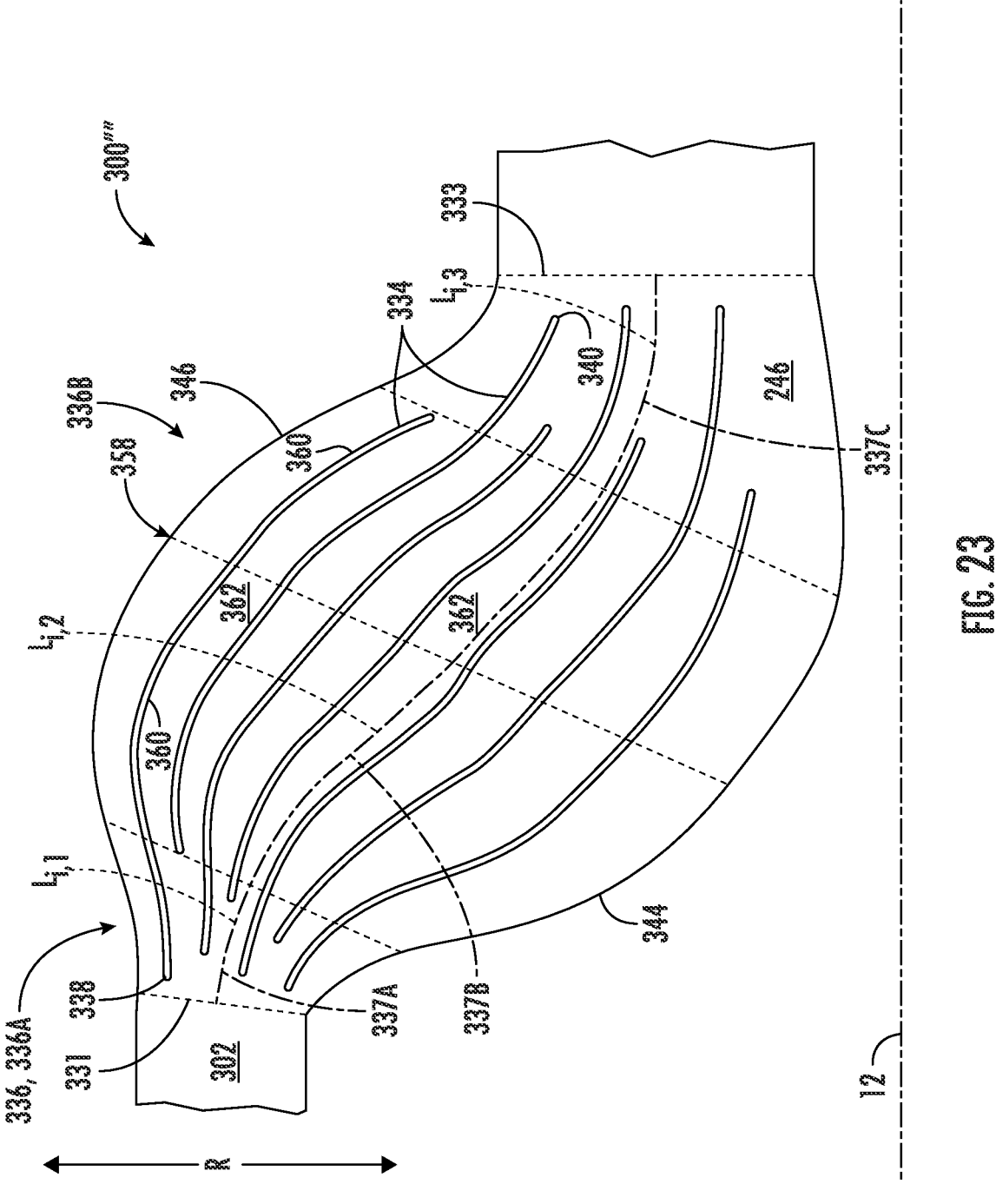
FIG. 23 is a schematic cross-sectional view of a heat exchanger in accordance with yet another exemplary embodiment of the present disclosure.

FIG. 23 illustrates an alternative heat exchanger 300"", similar to the heat exchangers 300, 300', 300", 300''' described above. Elements of the heat exchanger 300"" not specifically described may be taken to be identical to those of the heat exchanger 300 described above. The heat exchanger 300"" includes a pair of spaced-apart inner and outer peripheral walls 344 and 346, respectively, which between them define a flowpath 302 for a first fluid. The flowpath 302 has an inlet 248 at an upstream end, and an outlet 250 at a downstream end. In the illustrated example, the heat exchanger 300"" is a partially or wholly arcuate body formed by partial or complete revolution about an axis, for example the axial centerline 12. A significant difference between the heat exchanger 300"" and the heat exchanger 300 is that the heat exchanger 300"" is not symmetrical about a midline.

The flowpath 302 includes a diverging portion downstream of the inlet 248. Within the diverging portion, the peripheral walls 344, 346 diverge so that they are laterally farther apart from each other than they are at the inlet 248. A location downstream of the inlet 248 where the peripheral walls reach their maximum dimension is referred to herein as a "belly" 256. In the illustrated example, the peripheral walls 344, 346 reconverge downstream of the belly 256, thus defining a nozzle, but as noted above, this feature is optional.

A plurality of spaced-apart fins 334 are disposed in the flowpath 302. Each of the fins 334 has opposed side walls 360 extending between an upstream end 338 and a downstream end 340. The fins 334 subdivide the flowpath 302 into a plurality of side-by-side flow passages 362.

The aerodynamic features of the heat exchanger 300"", such as the equal diffusion ratios and/or rates of the flow passages 266, shaping of the fins 334 to act as turning vanes, and staggering of the fins 334, may be implemented as described for the heat exchanger 300 described above. The operation and functional advantages of the heat exchanger 300"" are substantially the same as for the heat exchanger 300.

Referring collectively to FIGS. 20 through 23, each of the heat exchangers depicted includes a plurality of heat transfer sections 336. For example, the embodiment of FIG. 20 includes two heat transfer sections 336A, 336B, defining respective lengths $L_{i,1}$, $L_{i,2}$ (along respective centerlines 337A, 337B); the embodiment of FIG. 21 includes five heat transfer sections 336A, 336B, 336C, 336D, 336E, defining respective lengths $L_{i,1}$, $L_{i,2}$, $L_{i,3}$, $L_{i,4}$, $L_{i,5}$ (along respective centerlines 337A, 337B, 337C, 337D, 337E); the embodiment of FIG. 22 includes three heat transfer sections 336A, 336B, 336C, defining respective lengths $L_{i,1}$, $L_{i,2}$, $L_{i,3}$ (along respective centerlines 337A, 337B, 337C); and the embodiment of FIG. 23 also includes three heat transfer sections 336A, 336B, 336C, defining respective lengths $L_{i,1}$, $L_{i,2}$, $L_{i,3}$ (along respective centerlines 337A, 337B, 337C). Notably, however, the embodiment of FIG. 23 defines a mean flow direction that is non-parallel to a longitudinal axis 112 of the engine, and as such, the lengths $L_{i,1}$, $L_{i,2}$, $L_{i,3}$ are defined in a direction non-parallel to the longitudinal axis 112 of the engine.

In particular, for the embodiment of FIG. 23, the centerlines 337A, 337B, 337C are each curved as the flowpath 302 through the heat exchanger 300"" curves and the centerlines 337A, 337B, 337C are geometric centerlines of the respective heat transfer sections 336A, 336B, 336C. The lengths $L_{i,1}$, $L_{i,2}$, $L_{i,3}$ are equal to the lengths of the respective centerlines 337A, 337B, 337C.

Figure 24:
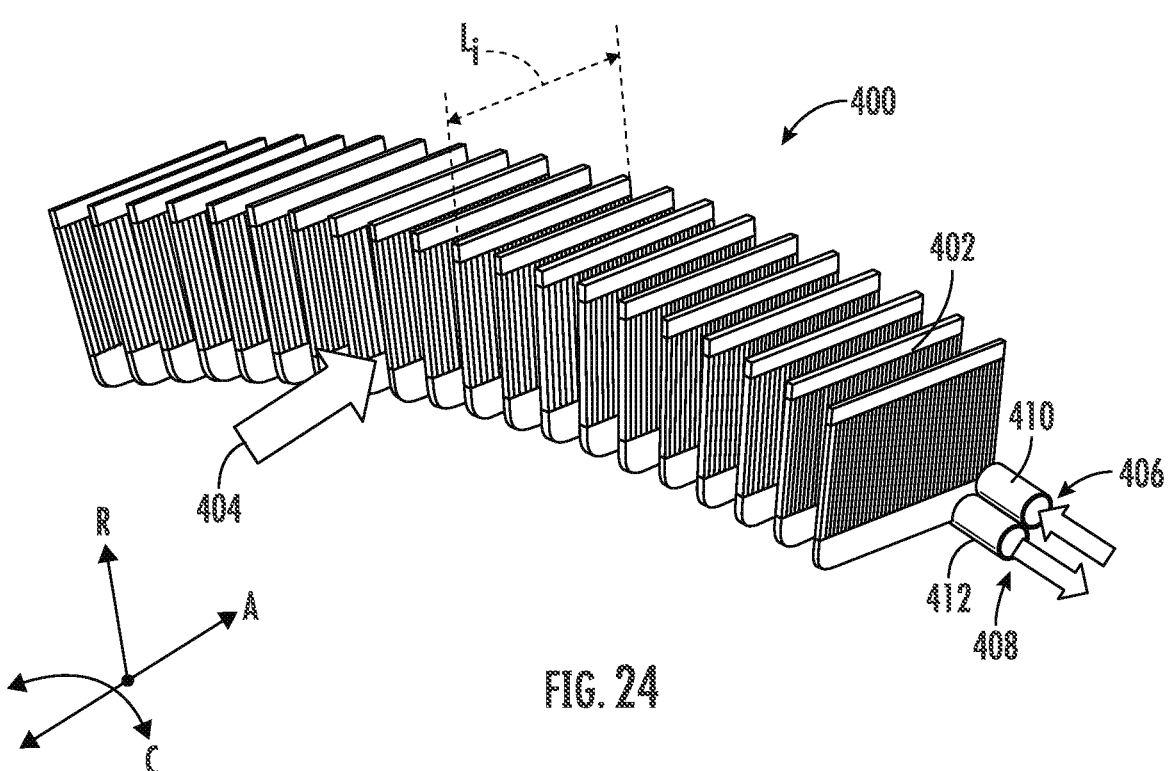
FIG. 24 is a perspective view of a heat exchanger in accordance with yet another exemplary embodiment of the present disclosure.
Figure 25:
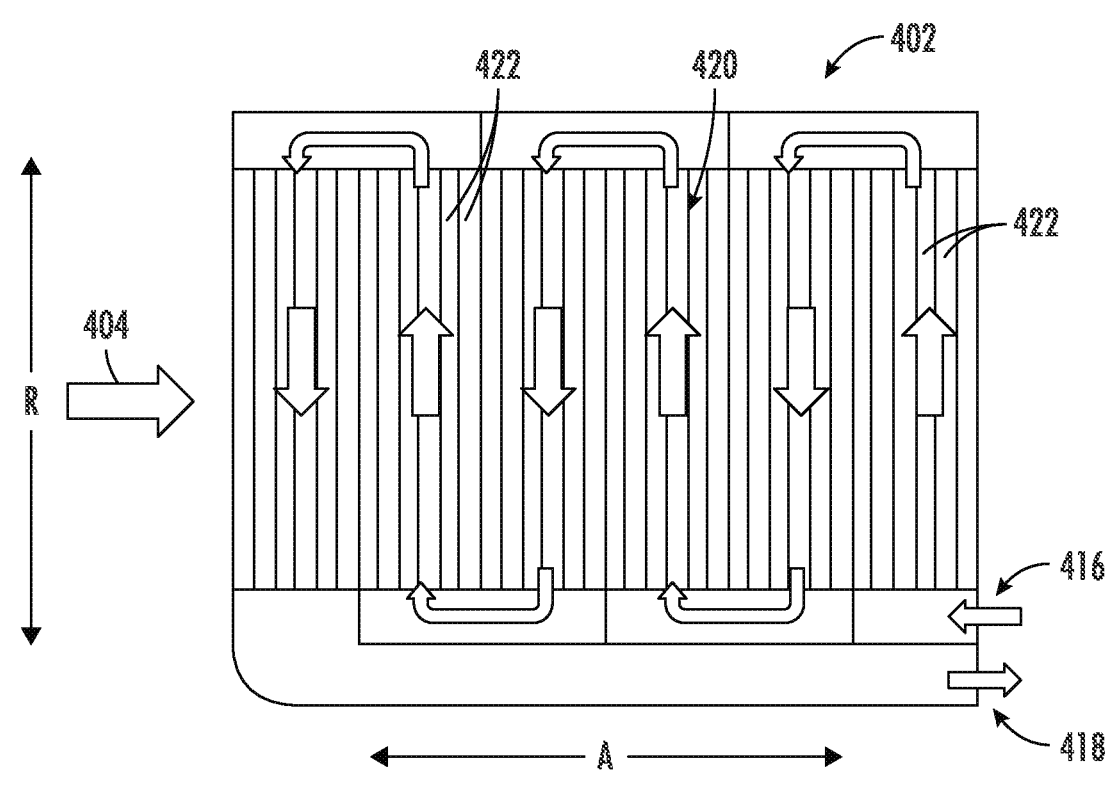
FIG. 25 is a cross-sectional view of a vane of the exemplary heat exchanger of FIG. 24.

Referring now to FIGS. 24 and 25, a heat exchanger 400 in accordance with another exemplary embodiment of the present disclosure is provided. FIG. 24 depicts a perspective view of a section of the heat exchanger 400 that may be positioned in a substantially annular duct, and FIG. 25 provides a cross-sectional view of a vane 402 of the heat exchanger 400 of FIG. 24. In certain exemplary embodiments, the heat exchanger 400 of FIGS. 24 and 25 may be incorporated into one or more substantially annular ducts or flowpaths of the present disclosure, such as into one or more of the substantially annular ducts or flowpaths of the engines 10, 100 of FIGS. 1, 2, or both.

For example, heat exchanger 400 includes a plurality of vanes 402 arranged along a circumferential direction C (FIG. 24), each extending along an axial direction A and a radial direction R. The heat exchanger 400 is configured to transfer heat with a first fluid that flows over the vanes 402 (indicated at arrow 404), and defines a second fluid inlet 406 and a second fluid outlet 408 that provides a second fluid to/from a group of the vanes 402 of the heat exchanger 400

(e.g., to each of the vanes 402 shown in FIG. 24). The flow of the first fluid (arrow 404) is the flow of fluid through the substantially annular duct. Although not fully depicted, the heat exchanger 400 includes an inlet manifold 410 defining the second fluid inlet 406 and an outlet manifold 412 defining the second fluid outlet 408 (FIG. 24). The inlet manifold 410 and outlet manifold 412 may each extend in the circumferential direction C and may each be in fluid communication with each of the vanes 402 of a section of the heat exchanger 400.

Further, referring specifically to FIG. 25, each vane 402 defines a vane fluid inlet 416 and a vane fluid outlet 418, along with a serpentine second fluid flowpath 420 between the vane fluid inlet 416 and the vane fluid outlet 418. The vane fluid inlet 416 is in fluid communication with the inlet manifold 410 for receiving the second fluid from the inlet manifold 410, and the vane fluid outlet 418 is in fluid communication with the outlet manifold 412 for providing the second fluid to the outlet manifold 412. The vane 402 further includes a plurality of channels 422 extending along the radial direction R along the serpentine second fluid flowpath 420 so as to extend a length of the serpentine second fluid flowpath 420 through the vane 402 and increase a heat transfer with the first fluid.

Briefly, referring back specifically to FIG. 24, the heat exchanger 400 includes a single heat transfer section, and a length $L_i$ of the heat exchanger 400 is the length of the single heat transfer section.

Notably, in other exemplary embodiments, the heat exchanger 400 of FIGS. 24 and 25 may have other configurations, such as one or more of the configurations of FIGS. 1 to 12 and 13 to 14 in U.S. Pat. No. 10,443,436 (see exemplary heat exchanger 100 described throughout); of FIGS. 1 to 12 in U.S. Pat. No. 10,184,400 (see exemplary annular heat exchanger 12 described throughout); of FIGS. 1-3, 6-8, and 10 in U.S. Pat. No. 9,777,963 (see duct heat exchangers 60 FIG. 1 and described with respect thereto, segments 106 in FIGS. 2-3 and 6-8 and described with respect thereto, segment 800 in FIG. 10 and described with respect thereto), or combinations thereof. Each of the above patents is incorporated herein by reference fully for all purposes.

In an extension of the concepts disclosed hereinabove, also provided herein is a thermal management system for a gas turbine engine and vehicle that can improve overall gas turbine engine and vehicle efficiency. The thermal management system can more fully utilize a relatively high pressure fluid from a compressor section of the gas turbine engine without the need for a pressure regulator and without releasing the high pressure fluid to e.g., an ambient location. As such, work extracted from the high pressure fluid may be maximized. The thermal management system provided hereinbelow can further improve heat transfer from lubricant in a lubricant system, as well as from one or more load devices, such as computing systems, environmental control systems, electric machines, or combinations thereof.

Exemplary aspects of the thermal management system include a turbine for receiving at least a portion of the high pressure fluid, the turbine expanding the portion of the high pressure fluid and extracting work from the portion of the high pressure fluid. The thermal management system further includes a thermal load and a heat exchanger located downstream of the turbine. The heat exchanger is positioned within a substantially annular flowpath of the gas turbine engine for heat rejection to an airflow through the substantially annular flowpath (e.g., a bypass passage or third stream of the gas turbine engine). In certain exemplary aspects, the thermal management system can include the heat exchanger within a secondary turbomachine, between a compressor and a turbine of the secondary turbomachine to compress, cool, and expand the high pressure fluid provided through the thermal management system (extracted from the gas turbine engine and optionally expanded through the turbine) prior to providing the high pressure fluid to the thermal load.

Notably, the high pressure fluid through a fluid circuit connecting (and optionally bypassing) the above discussed components of the thermal management system can be independently adjustable, such as through use of one or more flow control devices. In such a manner, the high pressure fluid provided to certain components of the thermal management system can have a desired pressure parameter during operation. For example, the thermal management system may control an amount of the high pressure fluid provided through the turbine and an amount of the high pressure fluid bypassing the turbine, to result in a high pressure fluid having the desired pressure parameter. In such a manner, any excess pressure within the extracted high pressure fluid can be converted to useful work by the turbine.

The design of the above system, however, also needs to take into account noise transmission levels, such as required by airport regulations or requirements limiting the amount of noise transmitted through a passenger cabin. Desirably, the need is to achieve the right balance between converting the high pressure fluid into useful work while avoiding excessive sound transmission levels requiring re-design. It is desirable to have both the noise transmission characteristics accounted for while designing a heat exchanger to take best advantage of high pressure levels in the fluid. By applying the principles of the Operational Acoustic Reduction Ratio (OARR) discussed hereinabove to a heat transfer section of the heat exchanger of the thermal management system presently introduced and described further hereinbelow, acoustic transmission loss properties are improved during certain operating conditions of the gas turbine engine incorporating such a heat exchanger, concomitantly with designing the thermal management system to convert the fluid's kinetic energy into useful work. In particular, the thermal management system lends itself to having the heat exchanger be adapted to include a heat transfer section with a desired acoustic length to achieve the desired acoustic transmission loss during the operating condition of interest, such as high power operating condition like takeoff and climb where community noise is of particular concern. For example, the variability built into the thermal management system can allow for the heat exchanger to be designed with the heat transfer section having an acoustic length that provides for a desired acoustic transmission loss, and operations of the thermal management system may accommodate the resulting amount of heat transfer facilitated by the size of heat exchanger needed (e.g., adjusting an amount of high pressure fluid being expanded through the turbine, a size of the secondary turbomachine, etc.).

In addition to resulting in a thermal management system providing improved overall efficiency for the gas turbine engine and a heat exchanger having desired noise attenuation properties, incorporating these considerations into the initial design phase of the heat exchanger of the thermal management system, as suggested hereinabove, reduces the need for iterative redesigns and aligns with the objective of establishing design requirements that account for engine architecture constraints, including thermal management needs, desired acoustic transmission loss, and other heat transfer requirements.

Figure 26:
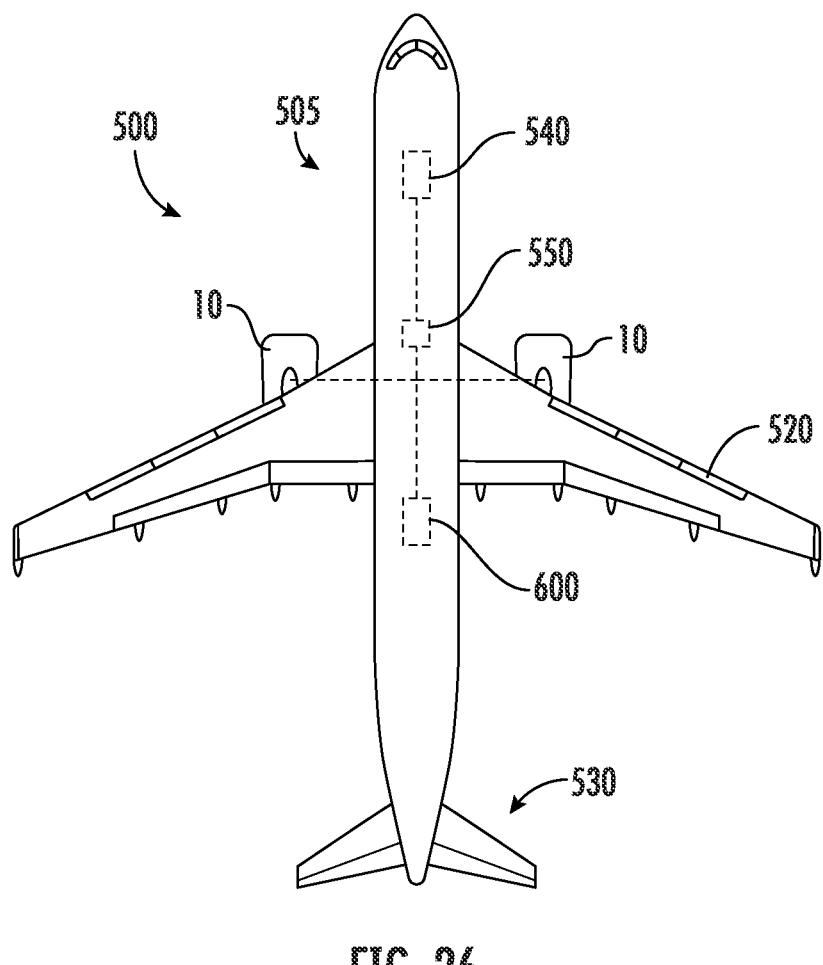
FIG. 26 is an exemplary embodiment of a vehicle including a gas turbine engine and thermal management system according to aspects of the present disclosure.

Referring now to FIG. 26, an exemplary embodiment of a vehicle 500 including a propulsion system, or rather a gas turbine engine 10, and a thermal management system 600 according to aspects of the present disclosure is provided. In an embodiment, the vehicle 500 is an aircraft including an aircraft structure or airframe 505. The airframe 505 includes a fuselage 110 to which wings 520 and an empennage 530 are attached. The gas turbine engine 10 according to aspects of the present disclosure is attached to one or more portions of the airframe. In various embodiments, the thermal management system 600 is a system configured to desirably distribute thermal loads, such as to add or remove heat from one or more fluids or structures, such as, but not limited to, oxidizer at the propulsion system, fuel, lubricant, hydraulic fluid, pneumatic fluid, or cooling fluid for an electric machine, electronics, computing system, environmental control system, gear assembly, or other system or structure.

In certain instances, the gas turbine engine 10 is attached to an aft portion of the fuselage 110. In certain other instances, the gas turbine engine 10 is attached underneath, above, or through the wing 520 and/or portion of the empennage 530. In various embodiments, the gas turbine engine 10 is attached to the airframe 505 via a pylon or other mounting structure. In still other embodiments, the gas turbine engine 10 is housed within the airframe, such as may be exemplified in certain supersonic military or commercial aircraft.

Various embodiments of the vehicle 500 include a computing system 540, such as avionics or other electronics or computing devices configured to control the vehicle 500 or the gas turbine engine 10. The vehicle 500 may further include an environmental control system (ECS) 550, such as to provide thermally conditioned air to a cabin of the vehicle, the computing system 540, a vehicle surface anti-icing system 560, a propulsion system anti-icing system, or other system of the vehicle 500 or gas turbine engine 10. In various embodiments such as described herein, the thermal management system 600 may be configured to provide thermally conditioned fluid to one or more of the systems described herein.

Referring now to FIGS. 27-30 exemplary schematic embodiments of the gas turbine engine 10 and thermal management system 600 of the vehicle 500 (FIG. 26) are provided. The gas turbine engine 10 may generally be configured as a Brayton cycle machine. Particular embodiments of the gas turbine engine 10 may be configured as a turbofan engine (e.g., configured in a similar manner as the exemplary gas turbine engine 10 of FIG. 1), an open rotor engine (e.g., configured in a similar manner as the exemplary engine 100 of FIG. 2), a turboprop engine, a turbojet engine, a turboshaft engine, a propfan engine, a ramjet engine, or a scramjet engine.

In particular, the exemplary embodiment of the gas turbine engine 10 depicted is may be configured in a similar manner as the exemplary engine 100 of FIG. 1, and accordingly the same or similar numbers refer to the same or similar parts. For example, the gas turbine engine 10 generally includes a fan section 14, a compressor section 22,24, a combustion section 26, a turbine section 28,30, and an exhaust section 32 in serial flow arrangement. One or more fan streams (such as a bypass passage 48) is positioned downstream of the fan section 14. The fan stream may alternatively be configured as a third stream (see, e.g., fan duct 172 of FIG. 2).

Referring still to FIGS. 27-30, the thermal management system 600 includes walled conduits 605, such as pipes, manifolds, or other appropriate structures, forming a fluid circuit 610 configured in fluid communication to receive a fluid from the compressor section 22,24 of the gas turbine engine 10. The fluid is generally an oxidizer, such as compressed air, from the gas turbine engine 10. In certain embodiments, the fluid is extracted from the primary or core flowpath of the gas turbine engine 10. In a particular embodiment, the fluid is extracted from one or more stages at or aft of a high pressure compressor of the compressor section 22,24.

The thermal management system 600 further includes a flow control device 620 positioned at the fluid circuit 610 downstream of the compressor section 22,24. A turbine 630 is positioned at the fluid circuit 610 downstream of the compressor section 22,24. In particular embodiments, the flow control device 620 and the turbine 630 are integrated as a variable area turbine nozzle (VATN). The flow control device 620 and the turbine 630 together defining the VATN are together configured to control mass flow into or through the turbine 630. In one embodiment, the flow control device 620 is a variable area structure, such as a variable area nozzle, at an inlet of the turbine 630. However, in other embodiments, the flow control device 620 is a separate flow control structure configured to adjust mass flow through the turbine 630. In certain embodiments, the turbine 630 is downstream of the flow control device 620.

In certain embodiments, a flow device 640 is positioned at the fluid circuit 610 downstream of the flow control device 620 and the turbine 630. The flow control device 620 is configured to provide a first portion 611 of fluid to the turbine 630 in parallel with a second portion 612 of fluid provided from the flow control device 620 to the flow device 640. The flow device 640 is configured to combine, mix, or draw together the flows from the first portion 611 and the second portion 612. In various embodiments, the flow device 640 is a fluid mixer, ejector, or other appropriate device configured to allow the relatively higher-pressure stream of fluid at the second portion 612 to draw the relatively lower-pressure stream from first portion 611 together through the fluid circuit 610 as the combined flow of fluid depicted schematically at 613. The fluid circuit 610 is configured to provide the first portion 611 of fluid from the turbine 630 to the flow device 640. A thermal load 650 is positioned in thermal communication with the fluid circuit 610 downstream of the turbine 630.

Figure 27:
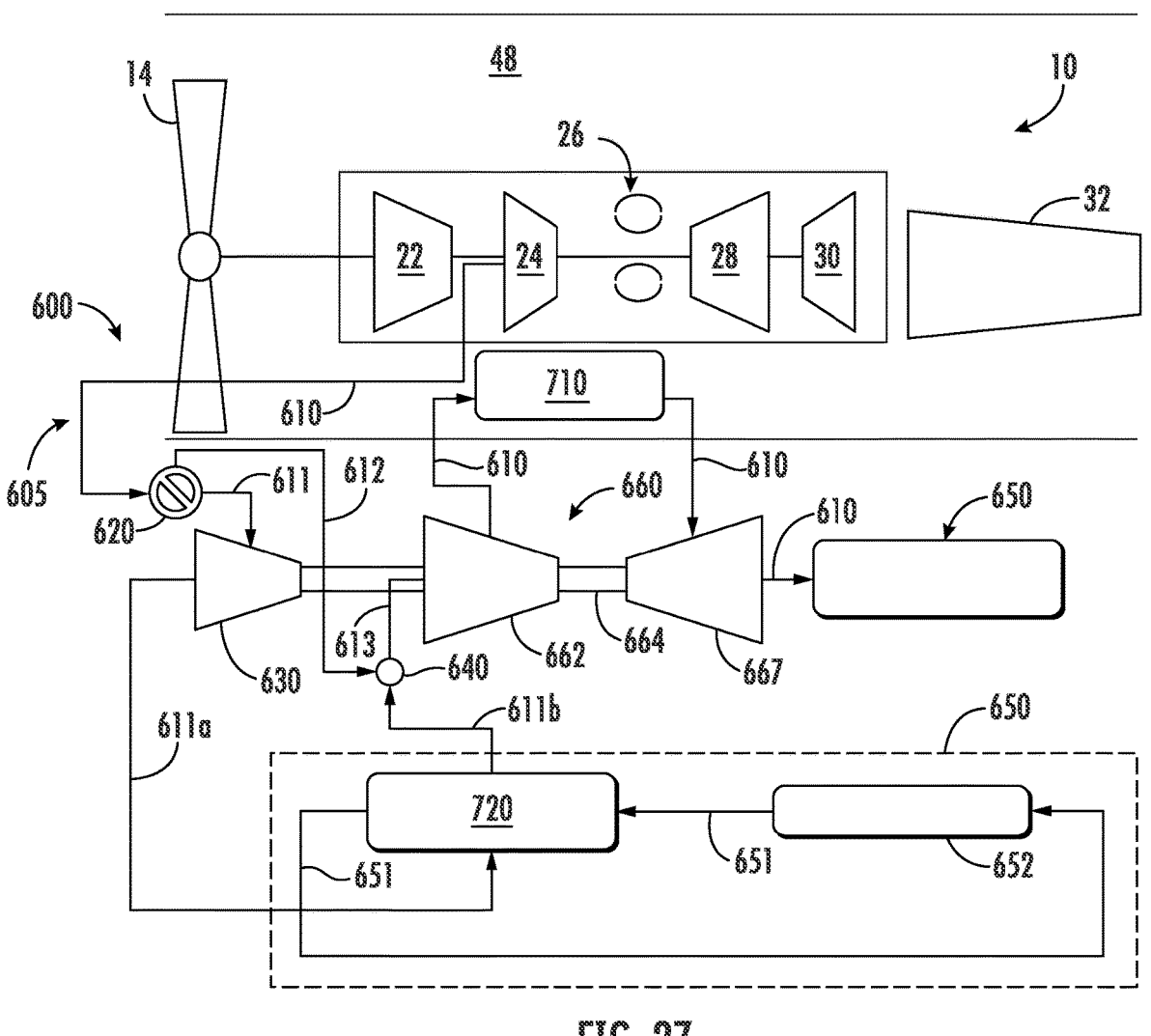
FIG. 27 is a schematic embodiment of a propulsion system and thermal management system according to an exemplary aspect of the present disclosure.
Figure 28:
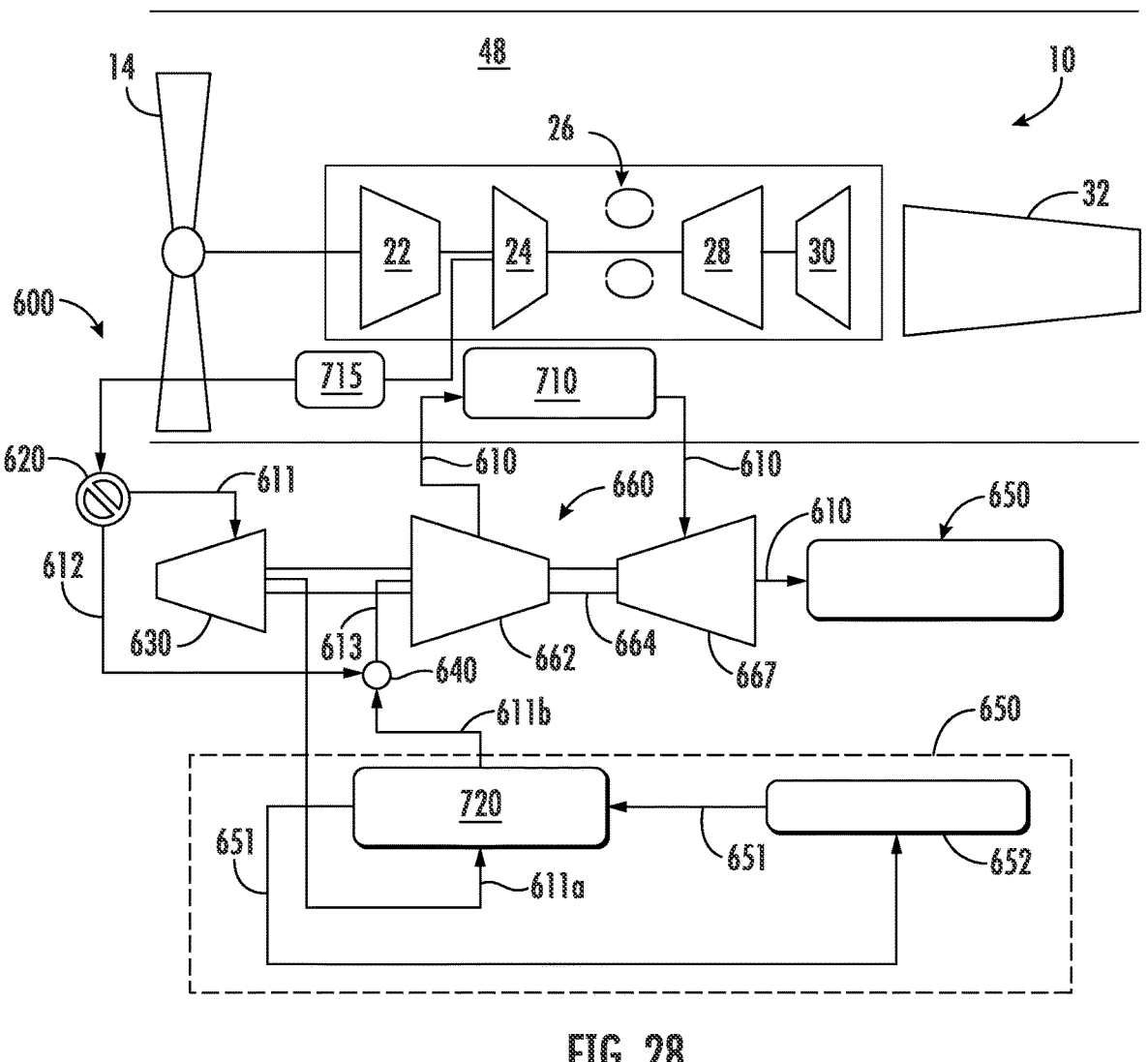
FIG. 28 is a schematic embodiment of a propulsion system and thermal management system according to another exemplary aspect of the present disclosure.
Figure 29:
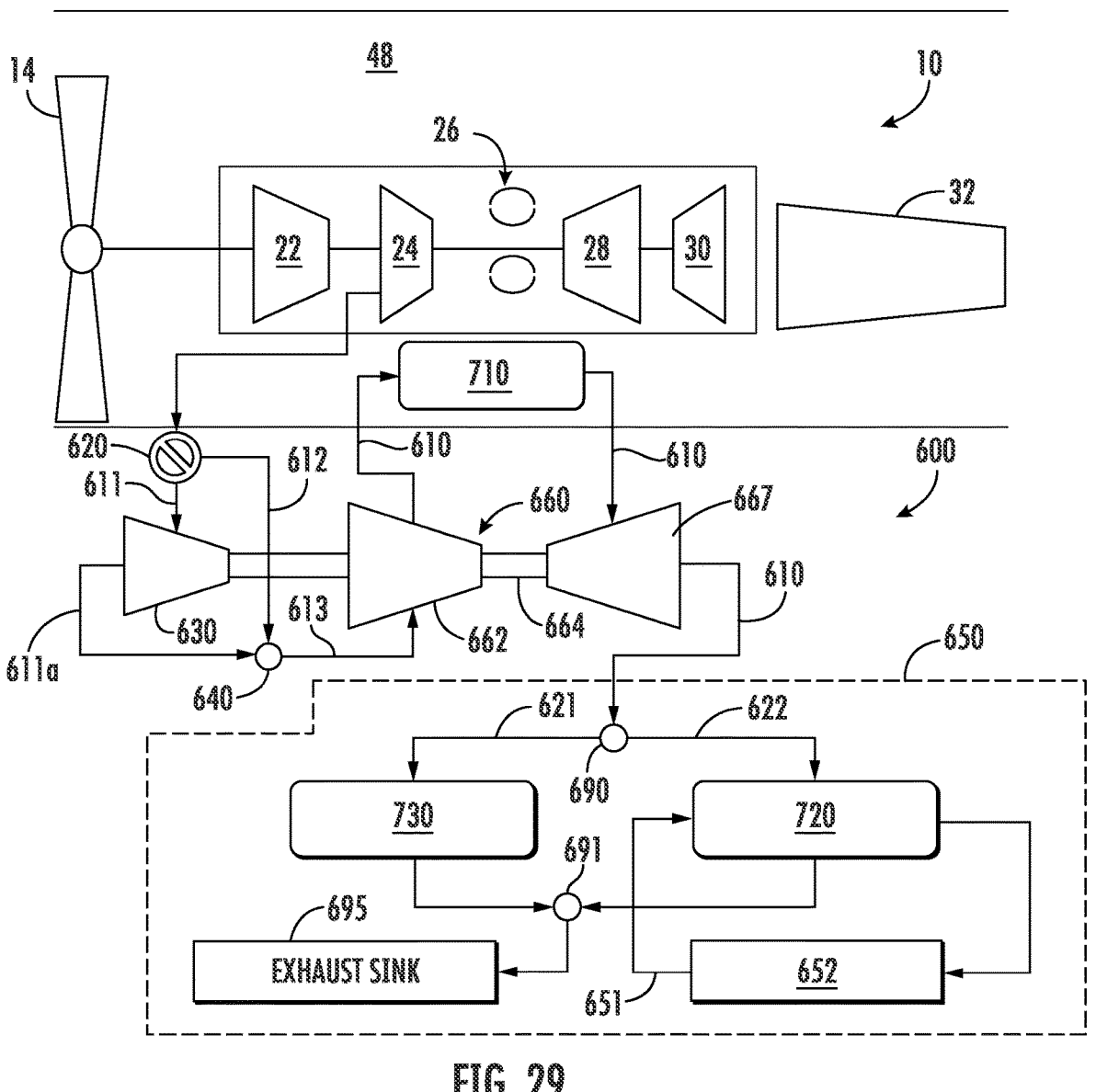
FIG. 29 is a schematic embodiment of a propulsion system and thermal management system according to yet another exemplary aspect of the present disclosure.

In various embodiments, the flow control device 620 is a diverter valve or other appropriate mechanism configured to direct ratios or proportions of the first portion 611 and the second portion 612 to the turbine 630 and the flow device 640, respectively. The pressurized flow of fluid from the compressor section 22,24 is utilized to drive the turbine 630, such as depicted at first portion 611. In certain embodiments, such as depicted in FIGS. 27-29, the expanded, decreased-pressure fluid, depicted schematically at 611a, is then routed along the fluid circuit 610 from the turbine 630 to the flow device 640. In still certain embodiments, the expanded, decreased-pressure fluid 611a is routed along the fluid circuit 610 from the turbine 630 to thermal communication with a thermal load 720. After thermal communication with the thermal load 720, the fluid, depicted schematically via arrows 611b, may be provided to the flow device 640, such as depicted in FIGS. 27 and 28.

Figure 30:
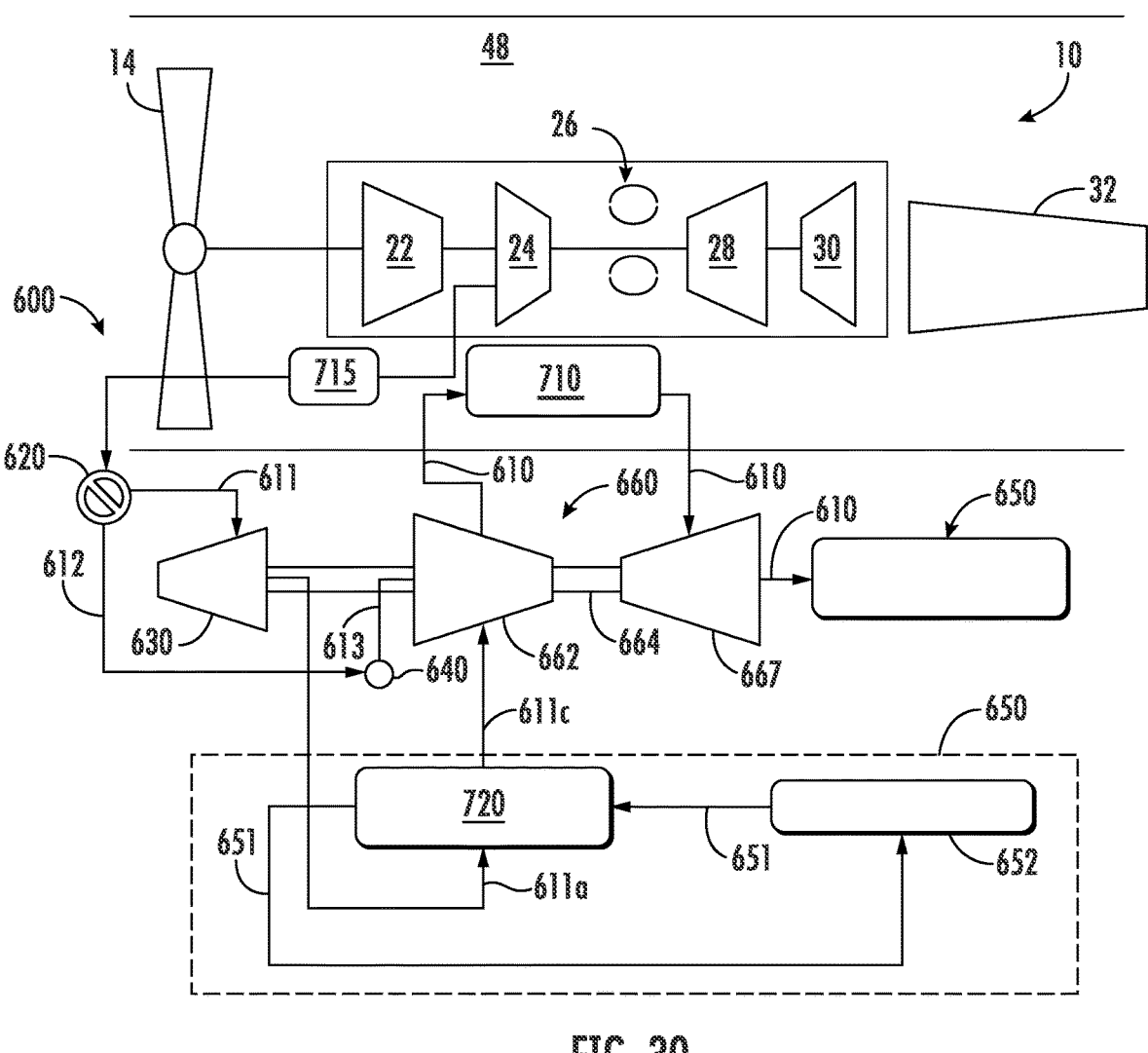
FIG. 30 is a schematic embodiment of a propulsion system and thermal management system according to still another exemplary aspect of the present disclosure.

In another embodiment, the fluid 611b may be discharged or dumped, such as to an engine bay, under engine cowl, or to atmosphere, such as depicted in FIG. 30 at 611c.

The flow device 640 is configured to receive the first portion 611 of fluid from the flow control device 620 and the second portion 612 of fluid from the turbine 630. In certain embodiments, the flow control device 620 is configured to provide the first portion 611 of fluid to the turbine 630 in parallel with the second portion 612 of fluid to the flow device 640, while the second portion 612 of fluid bypasses the turbine 630.

It should be appreciated that conventional thermal management systems generally utilize a valve to restrict or regulate flow from an engine compressor to an air cycle machine compressor. Such systems typically result in relatively large pressure losses across the valve. Such pressure losses result in substantial inefficiencies for the engine and thermal management systems by compressing the air at the engine compressor then dumping the excessive pressure to control or regulate the flow to the air cycle machine compressor. By contrast, however, embodiments of the present disclosure utilize the excessive pressure at the turbine 630 to produce useful work, such as provided herein.

The first portion 611 of fluid may generally include a first fluid characteristic different from the second portion 612 of fluid having a second fluid characteristic. In various embodiments, the first fluid characteristic includes a higher pressure or flow rate of the fluid than the second fluid characteristic. The flow device 640 is configured to receive the respective portions 611, 612 of fluid and provide the desired fluid (e.g., having a third fluid characteristic, depicted at fluid 613 of the fluid circuit 610, different from the first and second fluid characteristics of fluid 611 and fluid 612, respectively) downstream along the fluid circuit 610.

Referring to FIGS. 27-30, in various embodiments, the turbine 630 is operably coupled to a turbomachine 660 positioned at the fluid circuit 610. The turbomachine 660 includes a compressor 662 coupled by a driveshaft 664 with a turbine 667. In a particular embodiment, the turbomachine 660 is part of an air cycle system. The compressor 662 is positioned at the fluid circuit 610 downstream of the flow device 640. In a particular embodiment, the turbine 630 is operably coupled to the driveshaft 664 to provide energy to drive the compressor 662. In a still particular embodiment, the turbine 630 and the turbine 667 of the turbomachine 660 together provide energy to drive the compressor 662.

It should be appreciated that the flow control device 620 allows the fluid circuit 610 to selectively modulate a ratio or proportion of the first portion 611 and the second portion 612 to the turbine 630 and the flow device 640, respectively. In contrast to a pressure regulator configured to decrease pressure, resulting in work or energy loss for the gas turbine engine 10 and the thermal management system 600, the flow control device 620, such as defining a diverter valve or other appropriate device for selectively modulating a proportion of fluid flows to two or more circuits (e.g., first portion 611 and second portion 612), allows the turbine 630 to utilize the relatively high pressure fluid from the compressor section 22,24 to at least partially drive the turbomachine 660. The turbine 630 may correspond to a desired fluid characteristic (e.g., a desired second fluid characteristic) for the fluid egressing the turbine 630 to the flow device 640. Additionally, or alternatively, the turbine 630 may correspond to a desired energy output to the turbomachine 660 to which the turbine 630 is operably coupled.

Referring still to FIGS. 27-30, in various embodiments, the vehicle 500, gas turbine engine 10, and thermal management system 600 include a heat exchanger 710 positioned at the fluid circuit 610 downstream of the compressor 662 and upstream of the turbine 667 of the turbomachine

660. In various embodiments, the heat exchanger 710 is positioned in thermal communication with one or more fan streams of the gas turbine engine 10. As described above, the one or more fan streams may include a fan bypass stream (e.g., bypass passage 48), or a third stream positioned between the fan stream and a working gas flowpath (e.g., fan duct 172 in FIG. 2). It should be appreciated that the third stream refers to an air stream configured to recover fluid energy to produce a portion of total thrust of the propulsion system. In one embodiment, the portion of total thrust produced through the third stream may include a dedicated exhaust nozzle at an outlet end. In another embodiment, the portion of total thrust produced through the third stream may be mixed with the fan bypass stream. In still another embodiment, the portion of total thrust produced through the third stream may be mixed with the core flowpath downstream of the heat addition system, and egressed through the exhaust section. Various embodiments of the third stream are configured to generate less than 50% of the total thrust of the propulsion system.

The heat exchanger 710 is configured to expel thermal energy or heat from the fluid circuit 610. In certain embodiments, the heat exchanger 710 is configured to input thermal energy or heat to a fuel circuit, such as to heat a flow of fuel prior to injecting the fuel at the heat addition or combustion section. In still certain embodiments, the heat exchanger 710 is configured to input thermal energy or heat to a stream of air passing through one or more fan streams 48. In still various embodiments, the heat exchanger 710 includes a fuel circuit positioned in thermal communication with the fluid circuit 610.

In particular, the heat exchanger 710 can be configured in a similar manner as one or more of the heat exchangers discussed above with respect to FIGS. 1 through 25. For example, the heat exchanger 710 is positioned within a substantially annular duct of the gas turbine engine (e.g., of the fan assembly (such as a bypass flowpath), of the turbomachine (such as a third stream)) and extends substantially continuously along a circumferential direction of the gas turbine engine. The heat exchanger 710 will include a heat transfer section defining an acoustic length (not shown) such that an Operational Acoustic Reduction Ratio (OARR) is greater than or equal to 0.75 to achieve a desired effective transmission loss at an operating condition. In such a manner, the thermal management system 600 shown can achieve the desired effective transmission loss at the operating condition while also providing an improved efficiency for the thermal management system discussed herein.

Referring now to FIG. 28 and FIG. 30, in certain embodiments, the vehicle 500, gas turbine engine 10, and thermal management system 600 include a heat exchanger 715 positioned at the fluid circuit 610 downstream of the compressor section 22,24 and upstream of the flow control device 620. In various embodiments, the heat exchanger 715 is positioned in thermal communication with one or more fan streams 48 of the gas turbine engine 10, such as described herein. The heat exchanger 715 is configured to expel thermal energy or heat from the fluid circuit 610. In still certain embodiments, the heat exchanger 715 is configured to input thermal energy or heat to a stream of fluid passing through one or more fan streams 48. In a particular embodiment, the heat exchanger 715 is a precooler positioned at the fluid circuit 610 to remove thermal energy or heat from the fluid prior to providing the fluid to the flow control device 620 and turbine 630. Although depicted in regard to FIG. 28 and FIG. 30, it should be appreciated that other embodiments depicted and described herein may include the heat exchanger 715 defining a precooler positioned at the fluid circuit 610 upstream of the flow control device 620.

Notably, with such an exemplary embodiment, the heat exchanger 715 can additionally or alternatively be configured in a similar manner as one or more of the heat exchangers discussed above with respect to FIGS. 1 through 25. For example, the heat exchanger 715 can be positioned within a substantially annular duct of the gas turbine engine (e.g., of the fan assembly (such as a bypass flowpath), of the turbomachine (such as a third stream)) and extends substantially continuously along a circumferential direction of the gas turbine engine. The heat exchanger 715 can include a heat transfer section defining an acoustic length (not shown) such that an Operational Acoustic Reduction Ratio (OARR) is greater than or equal to 0.75 to achieve a desired effective transmission loss at an operating condition. In such a manner, the thermal management system 600 shown can achieve the desired effective transmission loss at the operating condition while also providing an improved efficiency for the thermal management system discussed herein.

Referring again to FIGS. 27-30, in various embodiments, the thermal load 650 includes a lubricant heat exchanger 720 positioned at the fluid circuit 610 downstream of the turbine 630. In still various embodiments, the thermal load 650 includes a lubricant circuit 651 positioned in thermal communication with the fluid circuit 610. The lubricant circuit 651 includes oil or oil-based fluid from a lubricant system 652. The lubricant system 652 may include any appropriate system including pumps, scavenges, and heat exchangers configured to provide lubricant to one or more bearing assemblies, gear assemblies, actuators, or other systems of the gas turbine engine 10 or vehicle 500. The lubricant circuit 651 is provided in heat exchanger relationship with the fluid circuit 610 at the lubricant heat exchanger 720.

In certain embodiments, the lubricant heat exchanger 720 is configured to receive or remove heat or thermal energy from the lubricant circuit 651 and provide heat or thermal energy to the fluid circuit 610, or particularly the first portion 611 of fluid downstream of the turbine 630. The flow control device 620 may be configured to adjust an amount of the first portion 611 of fluid provided to the turbine 630 and the thermal load 650 based on a desired heat transfer between the fluid circuit 610 and the lubricant circuit 651.

In certain embodiments, such as depicted in FIGS. 27-30, the thermal load 650 is positioned in thermal communication with the fluid circuit 610 downstream of the turbine 630. In particular embodiments, the thermal load 650 including the lubricant system 652 is positioned in thermal communication with the fluid circuit 610 downstream of the turbine 630. In still particular embodiments, such as depicted in FIGS. 27-30, the thermal load 650 including the lubricant system 652 is positioned in thermal communication with the fluid circuit 610 downstream of the turbine 630 and upstream of the flow device 640.

Referring now to FIG. 29, in various embodiments, the thermal load 650 is positioned in thermal communication with the fluid circuit 610 downstream of the turbomachine 660. In certain embodiments, such as described above, the thermal load 650 includes the lubricant system 652 positioned in thermal communication with the fluid circuit 610 downstream of the turbomachine 660. In still various embodiments, the thermal load 650 includes a load heat exchanger 730 positioned in thermal communication with the fluid circuit 610 downstream of the turbomachine 660. In certain embodiments, the load heat exchanger 730 includes one or more of a heat exchanger for an electric machine, for a computing system, or for an environmental control system (ECS) (e.g., the computing system 540 and/or the ECS system 550 described in regard to FIG. 26). The load heat exchanger 730 may be configured to provide the fluid from the fluid circuit 610 as a cooling fluid in thermal communication with the electric machine, the computing system, or the environmental control system, or one or fluids thereof. Various embodiments of the electric machine may include a motor and/or generator, a hybrid-electric device, etc. In still various embodiments, the computing system may include avionics, engine controls, vehicle control systems, or other electronics including one or more processors, memory devices, communications devices, circuitry, or other electrical or electronic systems. In still yet various embodiments, the ECS may include a fluid configured for one or more of the cabin of the vehicle, heat transfer fluid for the vehicle, or other fluid device.

Embodiments of the thermal load 650 may include a first thermal load positioned in thermal communication with the fluid circuit 610 downstream of the turbomachine 660 and a second thermal load positioned in thermal communication with the fluid circuit 610 downstream of the turbine 630 and upstream of the flow device 640. In certain embodiments, the first thermal load includes the load heat exchanger 730 such as described herein. In still certain embodiments, the second thermal load includes the lubricant heat exchanger 720 and lubricant system 652.

Still various embodiments of the thermal management system 600 may include one or more valves 690 to divide the fluid at the fluid circuit 610 into a first flow 621 and a second flow 622, such as depicted in FIG. 29. The system 600 may further include one or more second valves 691 to reconnect the flows 621, 622. The valve 690 is positioned upstream of the lubricant heat exchanger 720 and the load heat exchanger 730. The second valve 691 is positioned downstream of the lubricant heat exchanger 720 and the load heat exchanger 730. In certain embodiments, the system 600 includes an exhaust sink 695 at which the fluid from the fluid circuit 610 may be disposed. The exhaust sink 695 may include one or more of an exhaust sink at the turbomachine 660, at the gas turbine engine 10, or another exhaust sink or ambient environment.

A method for thermal management for a vehicle is provided herein. The method may be executed via the vehicle 500, the gas turbine engine 10, the thermal management 600, or combinations thereof, such as depicted and described in FIGS. 26-30. The method may provide one or more benefits such as described herein with regard to the particular positioning, arrangement, fluid communication, and thermal communication provided in the various embodiments.

The method includes extracting a flow of compressed fluid from a compressor section of a propulsion system, such as described with regard to flow of fluid extracted from the compressor section 22,24 to the fluid circuit 610. The flow of compressed fluid includes a pressure parameter. The pressure parameter is a measurement, calculation, or signal indicative of the pressure of the compressed fluid. The method further includes generating an output torque via expanding at least a portion of the flow of compressed fluid across a turbine operably connected to a driveshaft, such as described with regard to first portion 611 of the flow of fluid expanded via the turbine 630. The turbine is positioned downstream of the compressor section and upstream of a thermal management system, such as described with regard to the turbomachine 660.

In an embodiment, the method includes determining a pressure requirement of the flow of compressed fluid at the thermal management system and flowing or otherwise providing the flow of compressed fluid to the thermal management system. Referring to FIGS. 27-30, the thermal management system, such as the turbomachine 660, is configured to operate from the flow of compressed fluid having the value corresponding to the pressure requirement. In one embodiment, the pressure requirement is a range of pressure at which the thermal management system, such as the turbomachine 660, is operable. A minimum pressure may be required for operating the thermal management system. A maximum pressure may be required for maintaining desired operability, performance, efficiency, or structural life and durability.

In various embodiments, generating the output torque via expanding at least the portion of the flow of compressed fluid across the turbine includes flowing or otherwise providing, from upstream of the turbine, a first portion of the flow of compressed fluid to the thermal management system and providing a second portion of the flow of compressed fluid to the turbine, such as described with regard to the flow control device 620 splitting, diverting, or otherwise apportioning the first portion 611 of fluid to the turbine 630 and providing the second portion 612 of fluid to a flow device 640 such as described herein. In one embodiment, the second portion of the flow of compressed fluid corresponds to the pressure requirement at the thermal management system. For instance, referring to FIGS. 27-30, the flow control device 620 may divert the flow of fluid as the second portion 612 having substantially the required pressure for operating the turbomachine 660. In still another embodiment, the first portion of the flow of compressed fluid corresponds to a difference between the pressure requirement at the thermal management system and the pressure parameter of the flow of compressed fluid from the compressor section. As such, the first portion 611 of the flow of compressed fluid corresponding to a magnitude of pressure in excess of the pressure requirement may be routed to the turbine 630, and the second portion 612 of the flow of compressed fluid corresponding to a magnitude of pressure required for operating the turbomachine 660 is routed to the turbomachine 660. The method may further include combining the first portion and the second portion of the flow of compressed air, such as described with regard to the flow device 640, and providing the combined flow of compressed air to the thermal management system.

In still various embodiments, the method includes generating the output torque via expanding at least the portion of the flow of compressed fluid across the turbine includes converting excess pressure of the flow of compressed fluid from the compressor section into the output torque at the driveshaft, such as described with regard to the thermal management system 600. In an embodiment, converting excess pressure of the flow of compressed fluid corresponds to a difference between a pressure requirement of the flow of compressed fluid at the thermal management system and the pressure parameter of the flow of compressed fluid at the compressor section.

In still yet various embodiments, the method includes operating a turbomachine at the thermal management system via the output torque from the turbine, such as described with regard to the turbomachine 660 in FIGS. 27-30. In certain embodiments, operating the turbomachine at the thermal management system includes flowing or otherwise providing, in serial flow arrangement, the flow of compressed fluid to a compressor at the turbomachine, a heat exchanger positioned downstream of the compressor, and an expander positioned downstream of the compressor. In a particular embodiment, the method includes flowing or otherwise providing the flow of compressed fluid to a thermal load positioned downstream of the expander, such as thermal load 650 described in FIGS. 27-30.

In some embodiments, the method further includes modulating mass flowrate of the flow of compressed fluid to the turbine based at least on a flow control device (e.g., flow control device 620) upstream of the turbine (e.g., turbine 630) and downstream of the compressor section (e.g., compressor section 22,24 at the gas turbine engine 10). In an embodiment, modulating mass flowrate of the flow of compressed fluid to the turbine includes flowing or otherwise providing, from the flow control device, a first portion of the flow of compressed fluid to the turbine then expanding the second portion of the flow of compressed fluid across the turbine, and providing, from the flow control device, a second portion of the flow of compressed fluid to the thermal management system, such as described with regard to FIGS. 27-30. In still various embodiments, modulating mass flowrate of the flow of compressed fluid to the turbine includes flowing or otherwise providing, from the flow control device, a first portion of the flow of compressed fluid to the turbine, in which the first portion of the flow of compressed fluid corresponds to a difference between the pressure requirement at the thermal management system and the pressure parameter of the flow of compressed fluid from the compressor section, and flowing or otherwise providing, from the flow control device, a second portion of the flow of compressed fluid to the thermal management system, wherein the second portion of the flow of compressed fluid corresponds to a pressure requirement at the thermal management system. In a particular embodiment, modulating mass flowrate of the flow of compressed fluid to the turbine includes adjusting an area of a variable area turbine nozzle of the turbine.

In various embodiments, extracting the flow of compressed fluid from the compressor section of the propulsion system includes extracting the flow of compressed fluid from two or more stations at the compressor section. Each station provides a respective pressure parameter different from one another. In one embodiment, the method includes modulating from which station at the compressor section the flow of compressed fluid is extracted. Modulating from which station at the compressor section the flow of compressed fluid is extracted may be based at least on a pressure requirement at the thermal management system and an operating mode of the propulsion system.

In one exemplary aspect, for example, the present disclosure provides for a method 800 of operating a gas turbine engine. In particular, referring now to FIG. 31, a flow diagram of the method 800 is provided. The method 800 may be utilized with one or more of the exemplary gas turbine engines 10 and thermal management system 600 described above with reference to FIGS. 26 through 30, and heat exchangers described above with reference to FIGS. 1 through 25. Alternatively, the method 800 may be utilized with any other suitable gas turbine engine and thermal management system.

The method 800 includes at (802) operating a rotor assembly of the gas turbine engine at a blade passing frequency (f) greater than or equal to 300 hertz and less than or equal to 12,500 hertz during an operating condition, the rotor assembly, the turbomachine, or both comprising a substantially annular duct relative to the centerline of the gas turbine engine, the substantially annular duct defining a flowpath and a duct height along the radial direction.

Further, the method 800 includes at (804) using a heat exchanger, the heat exchanger being positioned within the substantially annular duct and having an effective transmission loss (ETL) between 5 decibels and 1 decibels while operating the rotor assembly at the blade passing frequency, wherein the heat exchanger extends substantially continuously along a circumferential direction of the gas turbine engine and defines a heat exchanger height equal to at least 10% of the duct height, wherein the heat exchanger comprises a heat transfer section defining an acoustic length (Li), and wherein an Operational Acoustic Reduction Ratio (OARR) is greater than or equal to 0.75 to achieve the ETL at the operating condition, the OARR equal to:

$$\left( \sin\left( \frac{2 \times \pi \times f}{a} \times L_i \right) \right)^2$$

wherein a is greater than or equal to 11,600 inches per second and less than or equal to 30,924 inches per second during the operating condition.

Moreover, the method 800 includes at (806) extracting a flow of compressed fluid having a pressure parameter from a compressor section of a turbomachine of the gas turbine engine; and at (808) generating an output torque by expanding at least a portion of the flow of compressed fluid across a turbine positioned downstream of the compressor section and upstream of a thermal management system.

In certain exemplary aspects, generating the output torque by expanding at least the portion of the flow of compressed fluid across the turbine at (808) includes at (810) providing a first portion of the flow of compressed fluid to the turbine; and at (812) providing, from upstream of the turbine, a second portion of the flow of compressed fluid to the thermal management system. The second portion of the flow of compressed fluid may correspond to a pressure requirement at the thermal management system.

In further exemplary aspects, generating the output torque by expanding at least the portion of the flow of compressed fluid across the turbine at (808) additionally or alternatively includes at (814) converting excess pressure of the flow of compressed fluid from the compressor section into the output torque at the driveshaft.

Referring still to FIG. 31, certain exemplary aspects of the method 800 further include at (816) determining a pressure requirement of the flow of compressed fluid at the thermal management system; and at (818) providing the flow of compressed fluid to the thermal management system, wherein the flow of compressed fluid comprises the pressure requirement.

Embodiments of the gas turbine engine 10, vehicle 500, and thermal management system 600 provided herein, as well as exemplary methods described herein, may improve system efficiency, such as through utilizing the pressure of the fluid from the compressor section of the propulsion system, or particularly from a high pressure compressor, rather than utilizing a pressure regulator or releasing fluid to e.g., an atmospheric condition. Embodiments provided herein may further improve heat transfer from lubricant at a lubricant system. Still further, embodiments provided herein may improve heat transfer from lubricant and additionally from one or more load devices, such as the load heat exchanger. Additionally, or alternatively, cooling fluid at the fluid circuit 610 may be independently adjustable relative to operating condition at the gas turbine engine 10, such as via the flow control device 620 and/or the flow device 640.

One or more components of the gas turbine engine 10 and thermal management system 600 described herein may be manufactured or formed using any suitable process, such as an additive manufacturing process, such as a 3-D printing process. The use of such a process may allow such components to be formed integrally, as a single monolithic component, or as any suitable number of sub-components, or at scales and intricacies not previously allowed or conceived in the art. In particular, the additive manufacturing process may allow such component to be integrally formed and include a variety of features not possible when using prior manufacturing methods. For example, the additive manufacturing methods described herein may allow for the manufacture of the turbine 630 and the flow control device 620 as a single, integral component. In further embodiments, the additive manufacturing methods described herein allow for the manufacture of the turbine 630, the flow control device 620, and at least a portion of the conduit 605 having unique features, configurations, thicknesses, materials, densities, fluid passageways, headers, and mounting structures that may not have been possible or practical using prior manufacturing methods.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes. Suitable powder materials for the manufacture of the structures provided herein as integral, unitary, structures, or at scales and intricacies provided herein, include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known as "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine defining a centerline and a circumferential direction, the gas turbine engine comprising: a turbomachine comprising a compressor section, a combustion section, and a turbine section arranged in serial flow order; a rotor assembly driven by the turbomachine and operable at a first blade passing frequency ($f_1$) greater than or equal to 600 hertz and less than or equal to 12,500 hertz during a high power operating condition, the rotor assembly, the turbomachine, or both comprising a substantially annular duct relative to the centerline of the gas turbine engine, the substantially annular duct defining a flowpath; a heat exchanger positioned within the annular duct and extending substantially continuously along the circumferential direction, the heat exchanger comprising a first material defining a heat exchange surface exposed to the flowpath, wherein the first material defines a heat exchange coefficient and wherein the heat exchange surface defines a surface area (A), wherein a product of the heat exchange coefficient and the surface area, UA, is between 7500 British thermal units per hour per degrees Fahrenheit (Btu/(hr-° F.)) and 45000 Btu/(hr-° F.); wherein an effective transmission loss (ETL) for the heat exchanger positioned within the annular duct is between 5 decibels and 1 decibels for a high power operating condition, wherein ETL equals $$C_1 e^{-C_2\left(\frac{EOC-UA}{C_3}\right)}$$

wherein when the operating condition is the high power operating condition, C equals 21.02, $C_2$ equals 0.027, $C_3$ equals 107, and EOC is between 50,347 and 12,587; wherein the heat exchanger comprises a heat transfer section defining an acoustic length (Li), and wherein an Operational Acoustic Reduction Ratio (OARR) is greater than or equal to 0.75 to achieve the ETL at the high power operating condition, the OARR equal to:

$$\left(\sin\left(\frac{2\times\pi\times f_1}{a_1}\times L_i\right)\right)^2$$

wherein $a_1$ is equal to 13,200 inches per second during the high power operating condition.

The gas turbine engine of one or more of these clauses, wherein $$\left(\sin\left(\frac{2\times\pi\times f_1}{a_1}\times L_i\right)\right)^2$$

is equal to 1.

The gas turbine engine of one or more of these clauses, wherein the heat transfer section defines a HX flow area ($A_{HX}$), wherein the annular duct defines a duct flow area ($A_d$) upstream of the heat exchanger, and wherein a ratio of the HX flow area ($A_{HX}$) to the duct flow area ($A_d$) is greater than 1.

The gas turbine engine of one or more of these clauses, wherein the rotor assembly is operable at a second blade passing frequency ($f_2$) during a low power operating condition, wherein the heat transfer section is a first heat transfer section and the acoustic length is a first acoustic length, wherein the heat exchanger further comprises a second heat transfer section defining a second acoustic length ($L_{i,2}$), wherein $$\left(\sin\left(\frac{2\times\pi\times f_2}{a_2}\times L_{i,2}\right)\right)^2$$

is greater than or equal to 0.75, and $a_2$ is equal to 12,900 inches per second during the low power operating condition.

The gas turbine engine of one or more of these clauses, wherein the second blade passing frequency ($f_2$) is greater than or equal to 300 hertz and less than or equal to 6,300 hertz.

The gas turbine engine of one or more of these clauses, wherein the rotor assembly is operable at a third blade passing frequency ($f_3$) during a medium power operating condition, wherein the heat exchanger further comprises a third heat transfer section defining a third acoustic length ($L_{i,3}$), wherein $$\left(\sin\left(\frac{2\times\pi\times f_3}{a_2}\times L_{i,3}\right)\right)^2$$

is greater than or equal to 0.75, and $a_3$ is equal to 11,640 inches per second during the medium power operating condition.

The gas turbine engine of one or more of these clauses, wherein the third blade passing frequency ($f_3$) is greater than the second blade passing frequency ($f_2$) and less than the first blade passing frequency ($f_1$).

The gas turbine engine of one or more of these clauses, wherein when the operating condition is a low power operating condition, $C_1$ equals 19.22, $C_2$ equals 0.222, $C_3$ equals 956.3, and EOC is between 41,467 and 19,965.

The gas turbine engine of one or more of these clauses, wherein the gas turbine engine defines a mass flowrate through the heat exchanger during the low power operating condition less than or equal to 50 lbm/s, and wherein ETL equals:

$$19.22e^{-0.222\left(\frac{EOC-UA}{956.3}\right)};$$

wherein EOC is between 41,467 and 19,965.

The gas turbine engine of one or more of these clauses, wherein when the operating condition is a medium power operating condition, $C_1$ equals 19.64, $C_2$ equals 0.67, $C_3$ equals 298, and EOC is between 52,809 and 16,677.

The gas turbine engine of one or more of these clauses, wherein the gas turbine engine defines a mass flowrate through the heat exchanger during the high power operating condition greater than or equal to 150 pound mass per second (lbm/s) and less than or equal to 300 lbm/s, and wherein ETL equals:

$$21.02e^{-0.027\left(\frac{EOC-UA}{107}\right)};$$

wherein EOC is between 50,347 and 12,587.

The gas turbine engine of one or more of these clauses, wherein the heat exchanger defines an overall length between 3 inches and 15 inches and a porosity between 20% and 80%.

The gas turbine engine of one or more of these clauses, wherein the overall length of the heat exchanger is between 4 inches and 9 inches.

The gas turbine engine of one or more of these clauses, wherein the heat exchanger defines a pressure drop of 15% or less during operation of the gas turbine engine.

The gas turbine engine of one or more of these clauses, wherein the annular duct is a third stream defined by the turbomachine and including an inlet, wherein the compressor section comprises a fan located upstream of the inlet of the third stream, wherein the blade passing frequency is of the mid-fan, and wherein the heat exchanger is positioned within the third stream.

The gas turbine engine of one or more of these clauses, wherein the rotor assembly of the gas turbine engine is configured as an unducted rotor assembly comprising a single stage of rotor blades.

The gas turbine engine of one or more of these clauses, wherein the rotor assembly of the gas turbine engine is configured as a ducted rotor assembly.

The gas turbine engine of one or more of these clauses, wherein the heat exchanger extends substantially continuously within the flowpath.

The gas turbine engine of one or more of these clauses, wherein the flowpath is a turbomachine flowpath, and wherein the duct is positioned at least in part in the compressor section, the combustion section, the turbine section, or a combination thereof.

The gas turbine engine of one or more of these clauses, wherein $$\left(\sin\left(\frac{2\times\pi\times f_1}{a_1}\times L_{i,2}\right)\right)^2$$

is less than or equal to 0.25.

A gas turbine engine defining a centerline and a circumferential direction, the gas turbine engine comprising: a turbomachine comprising a compressor section, a combustion section, and a turbine section arranged in serial flow order; a rotor assembly driven by the turbomachine and operable at a first blade passing frequency (f₁) greater than or equal to 600 hertz and less than or equal to 12,500 hertz during a high power operating condition, the rotor assembly, the turbomachine, or both comprising a substantially annular duct relative to the centerline of the gas turbine engine, the substantially annular duct defining a flowpath; a heat exchanger positioned within the annular duct and extending substantially continuously along the circumferential direction, wherein an effective transmission loss (ETL) for the heat exchanger positioned within the annular duct is between 5 decibels and 1 decibels for a high power operating condition, and wherein the heat exchanger comprises a heat transfer section defining an acoustic length (Li), and wherein an Operational Acoustic Reduction Ratio (OARR) is greater than or equal to 0.75 to achieve the ETL at the high power operating condition, the OARR equal to:

$$\left(\sin\left(\frac{2\times\pi\times f_1}{a_1}\times L_i\right)\right)^2$$

wherein a₁ is equal to 13,200 inches per second during the high power operating condition.

A method of operating a gas turbine engine gas turbine engine defining a centerline and a circumferential direction, the method comprising:

operating a rotor assembly of the gas turbine engine driven by a turbomachine gas turbine engine and at a first blade passing frequency (f₁) greater than or equal to 600 hertz and less than or equal to 12,500 hertz during a high power operating condition; the rotor assembly, the turbomachine, or both comprising a substantially annular duct relative to the centerline of the gas turbine engine, the substantially annular duct defining a flowpath;

operating a heat exchanger positioned within the annular duct and extending substantially continuously along the circumferential direction, the heat exchanger comprising a first material defining a heat exchange surface exposed to the flowpath, wherein the first material defines a heat exchange coefficient and wherein the heat exchange surface defines a surface area (A), wherein a product of the heat exchange coefficient and the surface area, UA, is between 7500 British thermal units per hour per degrees Fahrenheit (Btu/(hr-° F.)) and 45000 Btu/(hr-° F.);

providing an effective transmission loss (ETL) for the heat exchanger positioned within the annular duct between 5 decibels and 1 decibels for the high power operating condition, wherein ETL equals $$C_1 e^{-C_2\left(\frac{EOC-UA}{C_3}\right)};$$

wherein when the operating condition is the high power operating condition, C equals 21.02, C₂ equals 0.027, C₃ equals 107, and EOC is between 50,347 and 12,587; wherein the heat exchanger comprises a heat transfer section defining an acoustic length (Li), and wherein an Operational Acoustic Reduction Ratio (OARR) is greater than or equal to 0.75 to achieve the ETL at the high power operating condition, the OARR equal to:

$$\left(\sin\left(\frac{2\times\pi\times f_1}{a_1}\times L_i\right)\right)^2$$

wherein a₁ is equal to 13,200 inches per second during the high power operating condition.

A gas turbine engine defining a centerline and a circumferential direction, the gas turbine engine comprising: a turbomachine comprising a compressor section, a combustion section, and a turbine section arranged in serial flow order; a rotor assembly driven by the turbomachine, the rotor assembly, the turbomachine, or both comprising a substantially annular duct relative to the centerline of the gas turbine engine, the substantially annular duct defining a flowpath; a heat exchanger positioned within the annular duct and extending substantially continuously along the circumferential direction, the heat exchanger comprising a first material defining a heat exchange surface exposed to the flowpath, wherein the first material defines a heat exchange coefficient and wherein the heat exchange surface defines a surface area (A), wherein a product of the heat exchange coefficient and the surface area, UA, is between 7500 British thermal units per hour per degrees Fahrenheit (Btu/(hr-° F.)) and 45000 Btu/(hr-° F.); wherein an effective transmission loss (ETL) for the heat exchanger positioned within the annular duct is between 5 decibels and 1 decibels for an operating condition, the operating condition being one of a low power operating condition, a medium power operating condition, or a high power operating condition, wherein ETL equals $$C_1 e^{-C_2\left(\frac{EOC-UA}{C_3}\right)};$$

wherein when the operating condition is the low power operating condition, $C_1$ equals 19.22, $C_2$ equals 0.222, $C_3$ equals 956.3, and EOC is between 41,467 and 19,965; wherein when the operating condition is the medium power operating condition, $C_1$ equals 19.64, $C_2$ equals 0.67, $C_3$ equals 298, and EOC is between 52,809 and 16,677; and wherein when the operating condition is the high power operating condition, $C_1$ equals 21.02, $C_2$ equals 0.027, $C_3$ equals 107, and EOC is between 50,347 and 12,587.

The gas turbine engine of one or more of these clauses, wherein the heat exchanger defines a length between 3 inches and 15 inches and a porosity between 20% and 80%, wherein the gas turbine engine defines a blade passing frequency within the turbomachine, the rotor assembly, or both between 600 Hz and 12.5 Khz during the operating condition.

The gas turbine engine of one or more of these clauses, wherein the length of the heat exchanger is between 4 inches and 9 inches.

The gas turbine engine of one or more of these clauses, wherein the heat exchanger defines a pressure drop of 15% or less during operation of the gas turbine engine.

The gas turbine engine of one or more of these clauses, wherein the gas turbine engine defines a mass flowrate through the heat exchanger during the low power operating condition less than or equal to 50 lbm/s, and wherein ETL equals:

$$19.22 e^{-0.222\left(\frac{EOC-UA}{956.3}\right)};$$

wherein EOC is between 41,467 and 19,965.

The gas turbine engine of one or more of these clauses, wherein the gas turbine engine defines a mass flowrate through the heat exchanger during the medium power operating condition greater than or equal to 50 pound mass per second (lbm/s) and less than or equal to 150 lbm/s, and wherein ETL equals:

$$19.64 e^{-0.67\left(\frac{EOC-UA}{298}\right)};$$

wherein EOC is between 52,809 and 16,677.

The gas turbine engine of one or more of these clauses, wherein the gas turbine engine defines a mass flowrate through the heat exchanger during the high power operating condition greater than or equal to 150 pound mass per second (lbm/s) and less than or equal to 300 lbm/s, and wherein ETL equals:

$$21.02 e^{-0.027\left(\frac{EOC-UA}{107}\right)};$$

wherein EOC is between 50,347 and 12,587.

The gas turbine engine of one or more of these clauses, wherein the annular duct is a third stream defined by the turbomachine and including an inlet, wherein the compressor section comprises a fan located upstream of the inlet of the third stream, wherein the gas turbine engine defines a blade passing frequency within the turbomachine, wherein the blade passing frequency is of the mid-fan, and wherein the heat exchanger is positioned within the third stream.

The gas turbine engine of one or more of these clauses, wherein the rotor assembly of the gas turbine engine is configured as an unducted rotor assembly comprising a single stage of rotor blades.

The gas turbine engine of one or more of these clauses, wherein the single stage of rotor blades defines a blade diameter greater than or equal to 10 feet and less than or equal to 28 feet, optionally less than 18 feet, optionally less than 15 feet.

The gas turbine engine of one or more of these clauses, wherein the heat exchanger has one of the following architectures: fin-based, pin-fin, tube, tube-shell, tube-sheet, counter-flow, or a combination thereof.

The gas turbine engine of one or more of these clauses, wherein the rotor assembly of the gas turbine engine is configured as a ducted rotor assembly.

The gas turbine engine of one or more of these clauses, wherein the heat exchanger extends substantially continuously within the flowpath.

The gas turbine engine of one or more of these clauses, wherein the flowpath is a turbomachine flowpath, and wherein the duct is positioned at least in part in the compressor section, the combustion section, the turbine section, or a combination thereof.

The gas turbine engine of one or more of these clauses, wherein the heat exchanger is a waste heat recovery heat exchanger.

The gas turbine engine of one or more of these clauses, wherein the rotor assembly defines a blade passing frequency between 600 Hz and 12.5 Khz during the operating condition, and wherein the heat exchanger is located downstream of the rotor assembly.

The gas turbine engine of one or more of these clauses, wherein the gas turbine engine defines a blade passing frequency within the turbomachine between 600 Hz and 12.5 Khz during the operating condition, and wherein the heat exchanger is located within the turbomachine.

The gas turbine engine of one or more of these clauses, wherein the heat exchanger has the ETL of between 5 decibels and 1 decibel during the operating condition.

A gas turbine engine defining a centerline and a circumferential direction, the gas turbine engine comprising: a turbomachine comprising a compressor section, a combustion section, and a turbine section arranged in serial flow order; a rotor assembly driven by the turbomachine, the rotor assembly, the turbomachine, or both comprising a substantially annular duct relative to the centerline of the gas turbine engine, the annular duct defining a flowpath; a heat exchanger positioned within the annular duct and extending substantially continuously along the circumferential direction, the heat exchanger defining a length between 3 inches and 15 inches and a porosity between 20% and 80%, the heat exchanger comprising a first material defining a heat exchange surface exposed to the flowpath, wherein the first material defines a heat exchange coefficient and wherein the heat exchange surface defines a surface area (A), wherein a product of the heat exchange coefficient and the surface area, UA, is between 7500 British thermal units per hour per degrees Fahrenheit (Btu/(hr-° F.)) and 45000 Btu/(hr-° F.), wherein the gas turbine engine defines a blade passing frequency within the turbomachine, the rotor assembly, or both between 600 kHz and 12.5 Khz during an operating condition, and wherein the heat exchanger has an effective transmission loss (ETL) of between 5 decibels and 1 decibel for the operating condition.

The gas turbine engine of one or more of these clauses, wherein ETL equals:

$$C_1 e^{-C_2\left(\frac{X-UA}{C_3}\right)};$$

wherein when the operating condition is a low power operating condition, $C_1$ equals 19.22, $C_2$ equals 0.222, $C_3$ equals 956.3, and EOC is between 41,467 and 19,965; wherein when the operating condition is a medium power operating condition, $C_1$ equals 19.64, $C_2$ equals 0.67, $C_3$ equals 298, and EOC is between 52,809 and 16,677; and wherein when the operating condition is a high power operating condition, $C_1$ equals 21.02, $C_2$ equals 0.027, $C_3$ equals 107, and EOC is between 50,347 and 12,587.

The gas turbine engine of one or more of these clauses, wherein UA is greater than 7500 Btu/(hr-° F.) and less than 45000 Btu/(hr-° F.), such as greater than 10000 Btu/(hr-° F.) and less than 35000 Btu/(hr-° F.) when the operating condition is a low power operating condition, such as greater than 14000 Btu/(hr-° F.) and less than 5000 Btu/(hr-° F.) when the operating condition is a medium power operating condition, or greater than 15000 Btu/(hr-° F.) and less than 44000 Btu/(hr-° F.) when the operating condition is a high power operating condition.

The gas turbine engine of one or more of these clauses, wherein the pressure drop is less than 15%, such as less than 10%, such as less than 8%, such as greater than 1%.

The gas turbine engine of one or more of these clauses, wherein the pressure drop is less than or equal to about 5%, such as less than or equal to about 2.5% when the operating condition is a low power operating condition.

The gas turbine engine of one or more of these clauses, wherein the pressure drop is less than or equal to about 15% when the operating condition is a medium power operating condition.

The gas turbine engine of one or more of these clauses, wherein the pressure drop is less than or equal to about 15%, wherein the ETL is between 1 and 3 dB, and wherein the operating condition is a high power operating condition.

The gas turbine engine of one or more of these clauses, wherein the length of the heat exchanger is between 3 inches and 15 inches, such as between 4 inches and 9 inches.

The gas turbine engine of one or more of these clauses, wherein the porosity of the heat exchanger is 20% to 80%, such as 30% to 55%.

A gas turbine engine defining a centerline, a radial direction, and a circumferential direction, the gas turbine engine comprising: a turbomachine comprising a compressor section, a combustion section, and a turbine section arranged in serial flow order; a rotor assembly driven by or incorporated into the turbomachine and operable at a blade passing frequency (f) greater than or equal to 300 hertz and less than or equal to 12,500 hertz during an operating condition, the gas turbine engine comprising a substantially annular duct relative to the centerline, the substantially annular duct defining a flowpath and a duct height along the radial direction; and a heat exchanger positioned within the substantially annular duct and extending substantially continuously along the circumferential direction, the heat exchanger defining a heat exchanger height equal to at least 10% of the duct height; wherein an effective transmission loss (ETL) for the heat exchanger positioned within the substantially annular duct is between 5 decibels and 1 decibels for the operating condition; wherein the heat exchanger comprises a heat transfer section defining an acoustic length (Li), and wherein an Operational Acoustic Reduction Ratio (OARR) is greater than or equal to 0.75 to achieve the ETL at the operating condition, the OARR equal to:

$$\left(\sin\left(\frac{2\times\pi\times f}{a}\times L_i\right)\right)^2$$

wherein a is greater than or equal to 11,600 inches per second and less than or equal to 30,924 inches per second during the operating condition.

The gas turbine engine of one or more of these clauses, wherein the operating condition is a high power operating condition, wherein the blade passing frequency (f) is a first blade passing frequency ($f_1$) greater than or equal to 600 hertz and less than or equal to 12,500 hertz during the high power operating condition, and wherein a is a first speed of sound $a_1$ greater than or equal to 13,200 inches per second and less than or equal to 25,360 inches per second during the high power operating condition, and wherein OARR is equal to:

$$\left(\sin\left(\frac{2\times\pi\times f_1}{a_1}\times L_i\right)\right)^2.$$

The gas turbine engine of one or more of these clauses, wherein the heat exchanger is positioned in a cold location of the gas turbine engine, and wherein $a_1$ is $a_{1,Cold}$ and is equal to 24,528 inches per second.

The gas turbine engine of one or more of these clauses, wherein the rotor assembly is operable at a second blade passing frequency ($f_2$) during a low power operating condition, wherein the heat transfer section is a first heat transfer section and the acoustic length is a first acoustic length, wherein the heat exchanger further comprises a second heat transfer section defining a second acoustic length ($L_{i,2}$), wherein $$\left(\sin\left(\frac{2\times\pi\times f_2}{a_2}\times L_{i,2}\right)\right)^2$$

is greater than or equal to 0.75, and $a_2$ is greater than or equal to 12,900 inches per second and less than or equal to 24,756 inches per second during the low power operating condition.

The gas turbine engine of one or more of these clauses, wherein the second blade passing frequency ($f_2$) is greater than or equal to 300 hertz and less than or equal to 6,300 hertz.

The gas turbine engine of one or more of these clauses, wherein the rotor assembly is operable at a third blade passing frequency ($f_3$) during a medium power operating condition, wherein the heat exchanger further comprises a third heat transfer section defining a third acoustic length ($L_{i,3}$), wherein $$\left(\sin\left(\frac{2\times\pi\times f_3}{a_3}\times L_{i,3}\right)\right)^2$$

is greater than or equal to 0.75, and $a_3$ is greater than or equal to 11,640 inches per second and less than or equal to 30,924 inches per second during the medium power operating condition.

The gas turbine engine of one or more of these clauses, wherein the third blade passing frequency ($f_3$) is greater than or equal to 500 hertz and less than or equal to 12,500 hertz, wherein the third blade passing frequency ($f_3$) is greater than the second blade passing frequency ($f_2$) and less than the first blade passing frequency ($f_1$).

The gas turbine engine of one or more of these clauses, wherein $$\left(\sin\left(\frac{2\times\pi\times f}{a}\times L_i\right)\right)^2$$

is equal to 1.

The gas turbine engine of one or more of these clauses, wherein the heat transfer section defines a HX flow area ($A_{HX}$), wherein the substantially annular defines a duct flow area ($A_d$) upstream of the heat exchanger, and wherein a ratio of the HX flow area ($A_{HX}$) to the duct flow area ($A_d$) is greater than 1.

The gas turbine engine of one or more of these clauses, wherein the substantially annular duct comprises spaced-apart peripheral walls extending between an inlet and an outlet and defining a flowpath, wherein the flowpath includes a diverging portion downstream of the inlet, in which a flow area is greater than a flow area at the inlet, and wherein the heat exchanger comprises: a plurality of spaced-apart fins disposed in the flowpath, each of the fins having opposed side walls extending between an upstream leading edge and a downstream trailing edge, wherein the fins divide at least the diverging portion of the flowpath into a plurality of side-by-side flow passages; and a heat transfer structure disposed within at least one of the fins.

The gas turbine engine of one or more of these clauses, wherein the leading edges of the fins are staggered relative to a direction of flow through the flowpath such that a flow area blockage attributable to frontal area of the fins is offset by a corresponding increase of flow area in the flowpath within the divergent portion.

The gas turbine engine of one or more of these clauses, wherein the peripheral walls define a belly downstream of the inlet at which a flow area of the flowpath is at a maximum, and wherein the flowpath includes a converging portion downstream of the diverging portion.

The gas turbine engine of one or more of these clauses, wherein the peripheral walls and the fins are configured such that a total open flow area between the peripheral walls continuously increases from the inlet to the belly.

The gas turbine engine of one or more of these clauses, wherein a flow area of each of flow passages increases in a downstream direction, and the flow passages have equal diffusion rates.

The gas turbine engine of one or more of these clauses, wherein the fins are configured to turn a flow passing through the flowpath in at least one plane.

The gas turbine engine of one or more of these clauses, wherein the heat exchanger defines an overall length between 3 inches and 15 inches and a porosity between 20% and 80%.

The gas turbine engine of one or more of these clauses, wherein the heat exchanger defines a pressure drop of 15% or less during operation of the gas turbine engine.

The gas turbine engine of one or more of these clauses, wherein the substantially annular duct is a third stream defined by the turbomachine and including an inlet, wherein the compressor section comprises a mid-fan located upstream of the inlet of the third stream, wherein the blade passing frequency is of the mid-fan, and wherein the heat exchanger is positioned within the third stream.

The gas turbine engine of one or more of these clauses, wherein the rotor assembly of the gas turbine engine is configured as an unducted rotor assembly comprising a single stage of rotor blades.

The gas turbine engine of one or more of these clauses, wherein the blade passing frequency (f) greater than or equal to 2,500 hertz and less than or equal to 5,000 hertz during the operating condition, wherein the operating condition is a high power operating condition, and wherein a is equal to 13,200 inches per second during the high power operating condition.

A gas turbine engine defining a centerline, a radial direction, and a circumferential direction, the gas turbine engine comprising: a turbomachine comprising a compressor section, a combustion section, and a turbine section arranged in serial flow order; a thermal load; a thermal management system comprising a turbine and a fluid circuit providing a flow of bleed air from the compressor section to the turbine and from the turbine to the thermal load; a rotor assembly driven by or incorporated into the turbomachine and operable at a blade passing frequency (f) greater than or equal to 300 hertz and less than or equal to 12,500 hertz during an operating condition, the gas turbine engine comprising a substantially annular duct relative to the centerline of the gas turbine engine, the substantially annular duct defining a flowpath and a duct height along the radial direction, the rotor assembly being separate from the turbomachine or integrated into the turbomachine; and a heat exchanger positioned within the substantially annular duct and extending substantially continuously along the circumferential direction, the heat exchanger defining a heat exchanger height equal to at least 10% of the duct height and being in thermal communication with the fluid circuit of the thermal management system at a location downstream of the turbine; wherein an effective transmission loss (ETL) for the heat exchanger positioned within the substantially annular duct is between 5 decibels and 1 decibels for the operating condition; wherein the heat exchanger comprises a heat transfer section defining an acoustic length (Li), and wherein an Operational Acoustic Reduction Ratio (OARR) is greater than or equal to 0.75 to achieve the ETL at the operating condition, the OARR equal to:

$$\left(\sin\left(\frac{2\times\pi\times f}{a}\times L_i\right)\right)^2$$

wherein a is greater than or equal to 11,600 inches per second and less than or equal to 30,924 inches per second during the operating condition.

The gas turbine engine of one or more of these clauses, wherein the thermal management system comprises a secondary turbomachine.

The gas turbine engine of one or more of these clauses, wherein the turbine of the thermal management system is mechanically coupled to the secondary turbomachine for adding torque to the secondary turbomachine.

The gas turbine engine of one or more of these clauses, wherein the secondary turbomachine comprises a compressor and a turbine, wherein the heat exchanger is in flow communication with the secondary turbomachine at a location downstream of the compressor and upstream of the turbine.

The gas turbine engine of one or more of these clauses, wherein the fluid circuit is configured to provide the flow of bleed air from the turbine to the secondary turbomachine and from the secondary turbomachine to the thermal load.

The gas turbine engine of one or more of these clauses, wherein the thermal load comprises a load heat exchanger, wherein the load heat exchanger is a heat exchanger for an electric machine, for a computing system, for an environmental control system, for a lubrication system, or a combination thereof.

A method of operating a gas turbine engine, the method comprising operating a rotor assembly of the gas turbine engine at a blade passing frequency (f) greater than or equal to 300 hertz and less than or equal to 12,500 hertz during an operating condition, the gas turbine engine comprising a substantially annular duct relative to a centerline of the gas turbine engine, the substantially annular duct defining a flowpath and a duct height along a radial direction of the gas turbine engine; using a heat exchanger, the heat exchanger being positioned within the substantially annular duct and having an effective transmission loss (ETL) between 5 decibels and 1 decibels while operating the rotor assembly at the blade passing frequency, wherein the heat exchanger extends substantially continuously along a circumferential direction of the gas turbine engine and defines a heat exchanger height equal to at least 10% of the duct height, wherein the heat exchanger comprises a heat transfer section defining an acoustic length (Li), and wherein an Operational Acoustic Reduction Ratio (OARR) is greater than or equal to 0.75 to achieve the ETL at the operating condition, the OARR equal to:

$$\left(\sin\left(\frac{2\times\pi\times f}{a}\times L_i\right)\right)^2$$

wherein a is greater than or equal to 11,600 inches per second and less than or equal to 30,924 inches per second during the operating condition; extracting a flow of compressed fluid having a pressure parameter from a compressor section of a turbomachine of the gas turbine engine; and generating an output torque by expanding at least a portion of the flow of compressed fluid across a turbine positioned downstream of the compressor section and upstream of a thermal management system.

The method of one or more of these clauses, wherein the heat exchanger is in thermal communication with a fluid circuit of the thermal management system at a location downstream of the turbine.

The method of one or more of these clauses, further comprising: determining a pressure requirement of the flow of compressed fluid at the thermal management system; and providing the flow of compressed fluid to the thermal management system, wherein the flow of compressed fluid comprises the pressure requirement.

The method of one or more of these clauses, wherein generating the output torque by expanding at least the portion of the flow of compressed fluid across the turbine comprises: providing a first portion of the flow of compressed fluid to the turbine; and providing, from upstream of the turbine, a second portion of the flow of compressed fluid to the thermal management system.

The method of one or more of these clauses, wherein the second portion of the flow of compressed fluid corresponds to a pressure requirement at the thermal management system.

The method of one or more of these clauses, wherein generating the output torque by expanding at least the portion of the flow of compressed fluid across the turbine comprises converting excess pressure of the flow of compressed fluid from the compressor section into the output torque at a driveshaft.

We claim:

1. A gas turbine engine defining a centerline, a radial direction, and a circumferential direction, the gas turbine engine comprising:
   a turbomachine comprising a compressor section, a combustion section, and a turbine section arranged in serial flow order;
   a thermal load;
   a thermal management system comprising a turbine and a fluid circuit providing a flow of bleed air from the compressor section to the turbine and from the turbine to the thermal load;
   a rotor assembly driven by or incorporated into the turbomachine and operable at a blade passing frequency (f) greater than or equal to 300 hertz and less than or equal to 12,500 hertz during an operating condition of the gas turbine engine, the gas turbine engine comprising a substantially annular duct relative to the centerline of the gas turbine engine, the substantially annular duct defining a flowpath and a duct height along the radial direction, the rotor assembly being separate from the turbomachine or integrated into the turbomachine; and
   a heat exchanger positioned at a location within the substantially annular duct and extending substantially continuously along the circumferential direction, the heat exchanger defining a heat exchanger height equal to at least 10% of the duct height and being in thermal communication with the fluid circuit of the thermal management system at a location downstream of the turbine;
   wherein an effective transmission loss (ETL) for the heat exchanger positioned within the substantially annular duct is between 5 decibels and 1 decibels for the operating condition;
   wherein the heat exchanger comprises a heat transfer section defining an acoustic length (Li), and wherein an Operational Acoustic Reduction Ratio (OARR) is greater than or equal to 0.75 to achieve the ETL at the operating condition, the OARR equal to:

$$\left(\sin\left(\frac{2\times\pi\times f}{a}\times L_i\right)\right)^2$$

wherein a is representative of a speed of sound through the location of the gas turbine engine at the operating condition and is greater than or equal to 11,600 inches per second and less than or equal to 30,924 inches per second during the operating condition.

2. The gas turbine engine of claim 1, wherein the operating condition is a high power operating condition, wherein the blade passing frequency (f) is a first blade passing frequency ($f_1$) greater than or equal to 600 hertz and less than or equal to 12,500 hertz during the high power operating condition, and wherein $a_{Hot}$ is a first speed of sound $a_{1,Hot}$ equal to 25,360 inches per second during the high power operating condition, and wherein OARR is equal to:

$$\left(\sin\left(\frac{2 \times \pi \times f_1}{a_{1,Hot}} \times L_i\right)\right)^2.$$

3. The gas turbine engine of claim 2, wherein the rotor assembly is operable at a second blade passing frequency ($f_2$) during a low power operating condition, wherein the heat transfer section is a first heat transfer section and the acoustic length is a first acoustic length, wherein the heat exchanger further comprises a second heat transfer section defining a second acoustic length ($L_{i,2}$), wherein $$\left(\sin\left(\frac{2 \times \pi \times f_2}{a_{2,Hot}} \times L_{i,2}\right)\right)^2$$

is greater than or equal to 0.75, and $a_{2,Hot}$ is equal to 24,756 inches per second during the low power operating condition.

4. The gas turbine engine of claim 3, wherein the second blade passing frequency ($f_2$) is greater than or equal to 300 hertz and less than or equal to 6,300 hertz.

5. The gas turbine engine of claim 3, wherein the rotor assembly is operable at a third blade passing frequency ($f_3$) during a medium power operating condition, wherein the heat exchanger further comprises a third heat transfer section defining a third acoustic length ($L_{i,3}$), wherein $$\left(\sin\left(\frac{2 \times \pi \times f_3}{a_{3,Hot}} \times L_{i,3}\right)\right)^2$$

is greater than or equal to 0.75, and $a_{3,Hot}$ is equal to 30,924 inches per second during the medium power operating condition.

6. The gas turbine engine of claim 5, wherein the third blade passing frequency ($f_3$) is greater than or equal to 500 hertz and less than or equal to 12,500 hertz, wherein the third blade passing frequency ($f_3$) is greater than the second blade passing frequency ($f_2$) and less than the first blade passing frequency ($f_1$).

7. The gas turbine engine of claim 1, wherein $$\left(\sin\left(\frac{2 \times \pi \times f}{a_{Hot}} \times L_i\right)\right)^2$$

is equal to 1.

8. The gas turbine engine of claim 1, wherein the heat exchanger defines an overall length between 3 inches and 15 inches and a porosity between 20% and 80%.

9. The gas turbine engine of claim 8, wherein the overall length of the heat exchanger is between 4 inches and 9 inches.

10. The gas turbine engine of claim 1, wherein the thermal management system comprises a secondary turbomachine.

11. The gas turbine engine of claim 10, wherein the turbine of the thermal management system is mechanically coupled to the secondary turbomachine for adding torque to the secondary turbomachine.

12. The gas turbine engine of claim 10, wherein the secondary turbomachine comprises a compressor and a turbine, wherein the heat exchanger is in flow communication with the secondary turbomachine at a location downstream of the compressor and upstream of the turbine.

13. The gas turbine engine of claim 10, wherein the fluid circuit is configured to provide the flow of bleed air from the turbine to the secondary turbomachine and from the secondary turbomachine to the thermal load.

14. The gas turbine engine of claim 1, wherein the thermal load comprises a load heat exchanger, wherein the load heat exchanger is a heat exchanger for an electric machine, for a computing system, for an environmental control system, for a lubrication system, or a combination thereof.

15. A method of operating a gas turbine engine, the method comprising operating a rotor assembly of the gas turbine engine at a blade passing frequency (f) greater than or equal to 300 hertz and less than or equal to 12,500 hertz during an operating condition of the gas turbine engine, the gas turbine engine comprising a substantially annular duct relative to a centerline of the gas turbine engine, the substantially annular duct defining a flowpath and a duct height along a radial direction of the gas turbine engine;

using a heat exchanger, the heat exchanger being positioned at a location within the substantially annular duct and having an effective transmission loss (ETL) between 5 decibels and 1 decibels while operating the rotor assembly at the blade passing frequency, wherein the heat exchanger extends substantially continuously along a circumferential direction of the gas turbine engine and defines a heat exchanger height equal to at least 10% of the duct height, wherein the heat exchanger comprises a heat transfer section defining an acoustic length (Li), and wherein an Operational Acoustic Reduction Ratio (OARR) is greater than or equal to 0.75 to achieve the ETL at the operating condition, the OARR equal to:

$$\left(\sin\left(\frac{2 \times \pi \times f}{a} \times L_i\right)\right)^2$$

wherein a is representative of a speed of sound through the location of the gas turbine engine at the operating condition and is greater than or equal to 11,600 inches per second and less than or equal to 30,924 inches per second during the operating condition;

extracting a flow of compressed fluid having a pressure parameter from a compressor section of a turbomachine of the gas turbine engine; and generating an output torque by expanding at least a portion of the flow of compressed fluid across a turbine positioned downstream of the compressor section and upstream of a thermal management system.

16. The method of claim 15, wherein the heat exchanger is in thermal communication with a fluid circuit of the thermal management system at a location downstream of the turbine.

17. The method of claim 15, further comprising:

determining a pressure requirement of the flow of compressed fluid at the thermal management system; and providing the flow of compressed fluid to the thermal management system, wherein the flow of compressed fluid comprises the pressure requirement.

18. The method of claim 15, wherein generating the output torque by expanding at least the portion of the flow of compressed fluid across the turbine comprises:

providing a first portion of the flow of compressed fluid to the turbine; and providing, from upstream of the turbine, a second portion of the flow of compressed fluid to the thermal management system.

19. The method of claim 15, wherein generating the output torque by expanding at least the portion of the flow of compressed fluid across the turbine comprises converting excess pressure of the flow of compressed fluid from the compressor section into the output torque at a driveshaft.

\* \* \* \* \*